United States Patent
Karis et al.

(10) Patent No.: US 12,222,840 B1
(45) Date of Patent: *Feb. 11, 2025

(54) GENERATING SPAN RELATED METRIC DATA STREAMS BY AN ANALYTIC ENGINE

(71) Applicant: SPLUNK Inc., San Francisco, CA (US)

(72) Inventors: Steven Karis, Redwood City, CA (US); Maxime Petazzoni, San Mateo, CA (US); Matthew William Pound, Palo Alto, CA (US); Joseph Ari Ross, Redwood City, CA (US); Charles Smith, Morrisville, NC (US); Scott Stewart, Pflugerville, TX (US)

(73) Assignee: SPLUNK Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/974,262

(22) Filed: Oct. 26, 2022

Related U.S. Application Data

(63) Continuation of application No. 16/835,179, filed on Mar. 30, 2020, now Pat. No. 11,526,425.

(51) Int. Cl.
*G06F 11/36* (2006.01)
*G06F 9/54* (2006.01)
(Continued)

(52) U.S. Cl.
CPC .......... *G06F 11/3636* (2013.01); *G06F 9/547* (2013.01); *G06F 11/3612* (2013.01); *G06F 11/3644* (2013.01); *G06F 16/24568* (2019.01)

(58) Field of Classification Search
CPC .. G06F 11/3636; G06F 9/547; G06F 11/3612; G06F 11/3644; G06F 16/24568
See application file for complete search history.

(56) References Cited

U.S. PATENT DOCUMENTS 7,937,344 B2   5/2011   Baum et al.
8,112,425 B2   2/2012   Baum et al.
(Continued)

FOREIGN PATENT DOCUMENTS

WO   WO-2020087082 A1 *  4/2020   .......... G06F 11/3006

OTHER PUBLICATIONS

Splunk Enterprise 8.0.0 Overview, available online, retrieved May 20, 2020 from docs.splunk.com.
(Continued)

*Primary Examiner* — Daxin Wu
(74) *Attorney, Agent, or Firm* — Kilpatrick Townsend & Stockton LLP

(57) ABSTRACT

A method of generating metrics data associated with a microservices-based application comprises ingesting a plurality of spans and mapping an ingested span of the plurality of spans to a span identity, wherein the span identity comprises a tuple of information identifying a type of span associated with the span identity, wherein the tuple of information comprises user-configured dimensions. The method further comprises grouping the ingested span by the span identity, wherein the ingested span is grouped with other spans from the plurality of spans comprising a same span identity. The method also comprises computing metrics associated with the span identity and using the metrics to generate a stream of metric data associated with the span identity.

18 Claims, 30 Drawing Sheets

(51) Int. Cl.
    *G06F 16/24*     (2019.01)
    *G06F 16/2455*   (2019.01)

(56) References Cited

U.S. PATENT DOCUMENTS

| | | | |
|---|---|---|---|
| 8,751,529 | B2 | 6/2014 | Zhang et al. |
| 8,788,525 | B2 | 7/2014 | Neels et al. |
| 9,215,240 | B2 | 12/2015 | Merza et al. |
| 9,286,413 | B1 | 3/2016 | Coates et al. |
| 10,880,191 | B1* | 12/2020 | Kant ................... H04L 43/022 |
| 11,516,269 | B1 | 11/2022 | Chang, Jr. et al. |
| 11,526,425 | B1 | 12/2022 | Karis et al. |
| 2013/0283281 | A1* | 10/2013 | Krajec ................ G06F 11/3636 718/102 |
| 2014/0019879 | A1* | 1/2014 | Krajec .................. G06F 3/0481 715/753 |
| 2018/0088813 | A1* | 3/2018 | Agrawal ........... G06F 16/24561 |
| 2020/0257670 | A1* | 8/2020 | Masson .............. G06F 16/2272 |
| 2020/0328952 | A1* | 10/2020 | Makwarth ........... H04L 41/5051 |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carraso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Henschen, "Why all the Hadoopla", InformationWeek, 2011.

Hua, et al., "Correlated Data Gathering in Wireless Sensor Networks Based on Distributed Source Coding", International Journal of Sensor Networks, vol. 4, Issue 1/2, 2008.

Kefalakis, et al., "A Configurable Distributed Data Analytics Infrastructure for the Industrial Internet of Things", 15th International Conference on Distributed Computing in Sensor Systems, 2019.

Morshed, et al., "Open Source Initiatives and Frameworks Addressing Distributed Real-time Data Analytics", IEEE International Parallel and Distributed Processing Symposium Workshops, 2016, pp. 1481-1484.

\* cited by examiner

| from service name | to service name | from span.kind | to span.kind | from region | to region | Request count |
|---|---|---|---|---|---|---|
| Service A | Service B | client | server | us-west | us-east | 2 |
| Service A | Service B | client | server | us-west | us-west | 1 |

1590 → (row 1)
1592 → (row 2)

FIG. 15

Node_Health Exemplars:

| svc_name | env | pod | code | operation | trace_ids | Exemplar type |
|---|---|---|---|---|---|---|
| frontend | prod | frontend-d aliuytgq-d d58f | 200 | /product | "ff0558ae875 a250e" | request |
| product catalog service | prod | productcat alongservi ce-18iodsf h27-r234t | 200 | /GetProduct | "ff0558ae875 a250e" | request |

Edge_Health Exemplars:

| from service name | to service name | from pod | to pod | from operation | to operation | trace_ids | Exemplar type |
|---|---|---|---|---|---|---|---|
| frontend | product catalog service | front end-d aliuy tgq -dd58f | product catalog service-18iodsfh 27-r234t | /Product | /GetProduct | "ff0558ae875 a250e" | request |

| ✓ Type | Select a condition for this alert | Alert when error rate goes above specified threshold. Learn more |
|---|---|---|
| 2. Alert signal | | |
| 3. Alert condition | Static Threshold | When to use |
| | Sudden Change | Works well when a specific error rate threshold is known. |
| 4. Alert settings | | |
| 5. Alert message | | |
| 6. Alert recipients | Proceed To Alert Settings | |
| 7. Activate... | | |

| ✓ Type | Select a condition for this alert | Alert when latency spikes compared to cyclical periods in the past. Learn more |
|---|---|---|
| 2. Alert signal | | |
| 3. Alert condition | Static Threshold — 1813 | When to use |
| | Sudden Change — 1814 | Works well for services that have patterns that repeat over known fixed periods of time, i.e., daily, weekly or seasonal usage patterns. |
| | Historical Anomaly — 1815 | |
| 4. Alert settings | | |
| 5. Alert message | | |
| 6. Alert recipients | Proceed To Alert Settings | |
| 7. Activate... | | |

← 1812

Customize the settings for this alert
Alert trigger: Latency in the last 10m is more than 5 deviations above the norm established in the preceding 1h. Clears when latency is less than 4 deviations above the norm. Learn more

ALERT SETTINGS   SIMULATED EVENTS   DATA TABLE

Trigger sensitivity ⓘ   ⊙ Low  ○ Medium  ○ High  ○ Custom
High advanced settings
Signal resolution — 1875

| | |
|---|---|
| Alert based on ⓘ | Deviations from norm ⌄ — 1883 |
| Current window ⓘ | 10m — 1884 |
| Historical window ⓘ | 1h — 1835 |
| Trigger threshold ⓘ | 5 — 1886 |
| Clear threshold ⓘ | 4 — 1887 |
| Exclude errors? ⓘ | Yes ⌄ |
| Min. req/sec (absolute) ⓘ | 0 — 1889 |
| Min. req/sec (% of history) ⓘ | 20 % — 1891 |

✓ Type
✓ Alert signal
✓ Alert condition
4. Alert settings
5. Alert message
6. Alert recipients — 1876
7. Activate...

[ Proceed To Alert Message ]

GENERATING SPAN RELATED METRIC DATA STREAMS BY AN ANALYTIC ENGINE

CROSS REFERENCE PARAGRAPH FOR PRIORITY

This application is continuation of U.S. Non-Provisional application Ser. No. 16/835,179, filed on Mar. 30, 2020, and titled "GENERATING METRIC DATA STREAMS FROM SPANS INGESTED BY A CLOUD DEPLOYMENT OF AN INSTRUMENTATION ANALYTICS ENGINE," which is hereby incorporated by reference in its entirety for all purposes.

BACKGROUND

Computer systems may run applications or services that are provided via a server or cloud computing environment. A client computer system may send a request to a server that retrieves application installation files in an underlying database. The applications or services may be developed and deployed as a single unit or as multiple units, such as a collection of microservices. Applications that are developed as a single unit may be monolithic applications that include a user interface and data access codes combined into a single program from a single platform. Monolithic applications are self-contained and independent from other computing applications. With the advent of cloud computing, however, these large centralized monolithic systems are being decoupled and distributed to address scalability needs and to allow companies to deliver value faster.

Microservices or a "microservices architecture" are used in a software development method wherein software applications are developed as a suite of independently deployable smaller cooperating services. The cooperating services run processes and communicate to serve a business goal to form an enterprise application. More specifically, in a microservices architecture, an application is developed as a collection of small services; each service implements business capabilities, runs in its own process and communicates via Application Program Interfaces ("APIs"), e.g., hypertext transfer protocol (HTTP) APIs, or messaging. Each microservice may be deployed, upgraded, scaled and restarted independent of other services in the application, typically as part of an automated system, enabling frequent updates to live applications without impacting end customers.

With the rise of cloud native applications, which include microservices, there has been a shift in the manner in which software is built and deployed, and also in the manner in which it is monitored and observed. Microservices-based applications have to operate within environments of dramatically increased complexity and many more layers of abstraction compared to previous generations of monolithic applications. Compared to monolithic applications, microservices architectures generally introduce complexity in network communication, feature short lifecycles and require resiliency in dynamic environments.

Diligent application performance monitoring (APM) is needed on the part of developers of microservices-based applications to ensure that their software delivers a steady baseline of performance. APM typically involves carefully managing the performance, availability and user experience of software applications. Using APM-based tools, software developers for microservices-based applications monitor different aspects of the software they develop by instrumenting the software. These aspects include performance of the software, disk utilization of the software, CPU utilization of the software, errors encountered during execution of the software, significant events encountered during execution of the software, information describing which parts of code are being executed and which parts are not being executed, among others. After development, similar aspects of the software are also monitored during production, such as when software is being executed in a cloud architecture.

Computing operations of the instrumented software may be described by spans and traces. The spans and traces are produced by various instrumented microservices in an architecture and are communicated to an analysis system that analyzes the traces and spans to enable a software developer to monitor and troubleshoot the services within their software.

As companies begin to increasingly rely on microservices architectures, they run into operational complexity and struggle to efficiently monitor their environments. Conventional microservices-based environments are complicated because they include many micro-transactions that are handled by a variety of hosts, containers and infrastructure platforms. One of the challenges associated with microservices architectures, for example, is computing metrics from significant amounts of span and trace data generated by various services in an application owner's architecture, and using the generated metrics to detect problematic conditions associated with network performance, an erroneous process, a failing service, etc. Another related challenge is providing relevant information associated with the problem in the event that a software developer decides to perform a more in-depth investigation.

Traditional monitoring and troubleshooting tools, designed as symptom-based solutions with single purpose capabilities, are simply unable to keep up with tracking the performance of dynamic cloud native applications and analyzing the significant amounts of span and trace data they generate. Thus, systems that can efficiently and accurately monitor microservices architectures and microservices-based applications are the subject of considerable innovation.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The challenges associated with monitoring, troubleshooting and tracking errors in microservices architectures led to the rise of distributed tracing, which involves tracing user requests through a microservices-based application. One of the challenges associated with microservices architectures, for example, is computing metrics information accurately from significant amounts of span and trace data generated by various services in an application owner's architecture, and using the generated metrics to identify and alert on errors in an application in real time. Another related challenge is providing appropriately focused information (related to an error) to a developer depending on the level of detail sought.

Embodiments of the present invention address these challenges by ingesting up to 100% of span information from a client application and grouping the incoming spans by mapping each of the spans to a unique span identity. In an embodiment, additional user-configured dimensions may be extracted as part of a span identity to gather further relevant information. Metrics are computed with respect to each span identity and streams of metric data corresponding to each span identity are generated. The streams of metric data (referred to herein as "metric time series" data) may be aggregated and filtered to provide meaningful information, e.g., request, latency, error computations for various services and dependencies in an application. Further, additional user-configured dimensions may be added to the metric time series data for services and dependencies of interest so additional metadata can be extracted and analyzed.

Embodiments of the present invention are also able to monitor the metric time series and also perform computations on the metric time series data to identify anomalous patterns. If an anomalous pattern is identified, alert information regarding the anomalous pattern may be annotated on a display screen. Further, while alerts are generated by monitoring metric time series, once an alert is identified, metadata associated with the alert can be used to construct queries against or perform a deeper analysis of additional datasets (separate from the metric time series data) to further investigate the error. Embodiments of the present invention allow a client to store and analyze the trace data using multiple modalities of analysis, wherein each analysis modality extracts a different level of detail from the plurality of spans associated with the plurality of traces. Accordingly, though metric time series data may be monitored and used to generate alerts, once an alert is flagged other modalities of analysis comprising additional details regarding the traces may be searched to investigate the error further.

In one or more embodiments of the present disclosure, a method of diagnosing anomalous patterns from metrics data associated with a microservices-based application is provided. The method comprises aggregating a plurality of ingested spans into a plurality of streams of metric data. The method also comprises performing computations on a stream of metric data from the plurality of streams of metric data to identify an anomalous pattern. Further, the method comprises generating an alert in response to the anomalous pattern and querying a data set using metadata associated with the alert to retrieve additional information pertaining to the anomalous pattern.

In one or more embodiments of the present disclosure, a non-transitory computer-readable medium having computer-readable program code embodied therein for causing a computer system to perform a method of diagnosing anomalous patterns from metrics data associated with a microservices-based application is provided. The method comprises aggregating a plurality of ingested spans into a plurality of streams of metric data. The method also comprises performing computations on a stream of metric data from the plurality of streams of metric data to identify an anomalous pattern. Further, the method comprises generating an alert in response to the anomalous pattern and querying a data set using metadata associated with the alert to retrieve additional information pertaining to the anomalous pattern.

In one or more embodiments of the present disclosure, a system for performing a method of diagnosing anomalous patterns from metrics data associated with a microservices-based application is provided. The system comprises a processing device communicatively coupled with a memory and configured to: a) aggregate a plurality of ingested spans into a plurality of streams of metric data; b) perform computations on a stream of metric data from the plurality of streams of metric data to identify an anomalous pattern; c) generate an alert in response to the anomalous pattern; and d) query a data set using metadata associated with the alert to retrieve additional information pertaining to the anomalous pattern.

In one or more embodiments of the present disclosure, a method of generating metrics data associated with a microservices-based application is provided. The method comprises ingesting a plurality of spans and mapping an ingested span of the plurality of spans to a span identity, wherein the span identity comprises a tuple of information identifying a type of span associated with the span identity, wherein the tuple of information comprises user-configured dimensions. The method further comprises grouping the ingested span by the span identity, wherein the ingested span is grouped with other spans from the plurality of spans comprising a same span identity. The method also comprises computing metrics associated with the span identity and using the metrics to generate a stream of metric data associated with the span identity.

In one or more embodiments of the present disclosure, a non-transitory computer-readable medium having computer-readable program code embodied therein for causing a computer system to perform a method of generating metrics data associated with a microservices-based application is provided. The method comprises ingesting a plurality of spans and mapping an ingested span of the plurality of spans to a span identity, wherein the span identity comprises a tuple of information identifying a type of span associated with the span identity, wherein the tuple of information comprises user-configured dimensions. The method further comprises grouping the ingested span by the span identity, wherein the ingested span is grouped with other spans from the plurality of spans comprising a same span identity. The method also comprises computing metrics associated with the span identity and using the metrics to generate a stream of metric data associated with the span identity.

In one or more embodiments of the present disclosure, a system for performing a method for generating metrics data associated with a microservices-based application is provided. The system comprises a processing device communicatively coupled with a memory and configured to: a) ingest a plurality of spans; b) map an ingested span of the plurality of spans to a span identity, wherein the span identity comprises a tuple of information identifying a type of span associated with the span identity, wherein the tuple of information comprises user-configured dimensions; c) group the ingested span by the span identity, wherein the ingested span is grouped with other spans from the plurality of spans comprising a same span identity; d) compute metrics associated with the span identity; and e) use the metrics to generate a stream of metric data associated with the span identity.

BRIEF DESCRIPTION OF THE DRAWINGS

In the drawings:

FIG. 15 is a table illustrating an exemplary manner in which selected tags for each service in a cross-service span pair may be mapped to tag attributes and stored as part of a memory-resident data object associated with an edge in the service graph, in accordance with embodiments of the present invention.

FIG. 16C illustrates the manner in which data in the metric events modality is persisted using an edge data object comprising a memory-resident table of extracted indexed tag attributes with associated Trace IDs and using a node data object comprising a memory-resident table of extracted tags with associated Trace IDs, in accordance with an embodiment of the present invention.

FIG. 18A is an exemplary on-screen GUI showing the manner in which a client may configure an alert signal in connection with the metric time series modality, in accordance with embodiments of the present invention.

FIG. 18B is an exemplary on-screen GUI showing the manner in which a client may configure a condition associated with the error alert configured in FIG. 18A, in accordance with embodiments of the present invention.

FIG. 18C is an exemplary on-screen GUI showing the manner in which a client may configure a condition associated with a latency-based alert, in accordance with embodiments of the present invention.

FIG. 18D is an exemplary on-screen GUI showing the manner in which a client may configure alert settings associated with a latency-based alert, in accordance with embodiments of the present invention.

FIG. 21 is an exemplary on-screen GUI showing the manner in which the dimensions associated with the alert filters in FIG. 21 may be automatically applied to the full-fidelity data set for further analysis, in accordance with embodiments of the present invention.

DETAILED DESCRIPTION

Figure 1A:
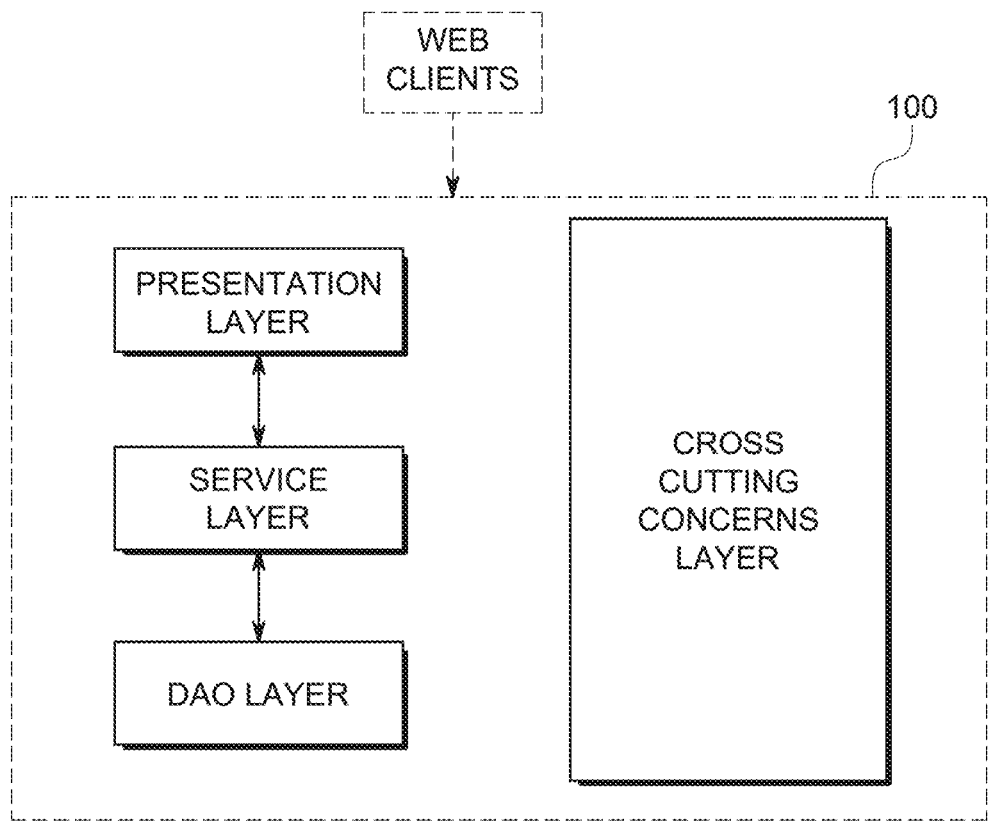
FIG. 1A illustrates an exemplary monolithic multi-layer architecture.

Embodiments are described herein according to the following outline:
  1.0 Terms
  2.0 General Overview
  3.0 Data Collection
    3.1 Logs, Traces and Metrics
  4.0 Multiple Modalities for Storing and Analyzing Data
    4.1 Metric Time Series
      4.1.1 Generating Metric Data Streams Using Span Identities
      4.1.2 Real-Time Monitoring Using Metric Time Series Data 4.2 Metric Events
    4.2.1 Metric Events Data Generation and Persistence
  4.3 High-Fidelity Data
5.0 Application Performance Monitoring (APM) Detectors
  5.1 Alert Configuration
  5.2 Application of Alert Details
1.0 Terms The term "trace" as used herein generally refers to a record of the manner in which a single user request, also referred to as a transaction, propagates from one microservice (hereinafter interchangeably referred to as "service") to the next in a distributed application. A transaction is generally described as an end-to-end request-response flow, from the making of the user's initial request to receiving the final response. A transaction often involves the interaction of multiple services. A trace is a record of a transaction and each trace may be identified using a unique trace identifier ("Trace ID"). The trace follows the course of a request or transaction from its source to its ultimate destination in a distributed system. In one embodiment, a trace may be conceptualized as a highly dimensional structured log that captures the full graph of user-generated and background request execution within an application, and includes valuable information about interactions as well as causality.

The term "span" as used herein generally refers to the primary building block of a trace, representing an individual unit of work done in a distributed system. A trace is composed of one or more spans where a span represents a call within the request. It is appreciated that a call may be to a separate microservice or a function within a microservice. The trace represents the work done by each microservice which is captured as a collection of linked spans sharing the same unique Trace ID. Each component of the distributed system may contribute a span-a named, timed operation representing a piece of the workflow. A span may also include a unique span ID, a service name (e.g., "analytics"), an operation name (e.g., "start"), duration (latency), start and end timestamps and additional annotations and attributes (e.g., tags such as key: value pairs). The annotations and attributes can describe and contextualize the work being done under a span. For example, each span may be annotated with one or more tags that provide context about the execution, such as the user instrumenting the software, a document involved in the request, an infrastructure element used in servicing a request, etc.

The term "tags" as used herein generally refers to key: value pairs that provide further context regarding the execution environment and enable user-defined annotation of spans in order to query, filter and comprehend trace data. Tag information is typically included with each span and there may be different levels of tag information included in a span. Tag information (including the 'key' and corresponding 'value') is typically included with each span and there may be different levels of tag information included in a span.

"Global tags" generally represent properties of a user-request (e.g., tenant name, tenant level, client location, environment type, etc.) and may be extracted from any span of the trace based on configured rules. A global tag for a particular span in a trace may be attributed to the other spans in a trace, because each span within a single trace may comprise the same global attributes. For example, if one span within a trace comprises a tag relating it to a request from a "gold" level "tenant," it may be inferred that other spans in the same trace are associated with the same request and, accordingly, from the same "gold" level "tenant."

Consequently, the "tenant: gold" key-value pair or tag may be attributed to the other spans in the same trace.

"Service-level tags" generally represent a non-global property of the service or the infrastructure that the associated span (which served a portion of the request) executed on, e.g., service version, host name, region, etc. Spans that executed on different services may have different values for the same tag, e.g., tag "region" may take different values in two services: a span in Service A may be attributed to "region: east" and a span in Service B attributed to "region: west". Also, multiple instances of the same service can serve different parts of the request and so the same service may be associated with different service-level tags in relation to those different parts.

"Span-level tags" comprise attributes that are specific to a particular span.

The term "root span" as used herein generally refers to the first span in a trace. A span without a parent is called a root span.

The term "child span" as used herein generally refers to a span that follows a root span, including a child of a child.

The term "parent span" as used herein generally refers to a span that executes a call (to a different service or a function within the same service) that generates another span, wherein the span executing the call is the "parent span" and the span generated in response to the call is the "child span." Each span may typically comprise information identifying its parent span, which along with the Trace ID, may be used to consolidate spans associated with the same user-request into a trace.

A "metric" as used herein generally refers to a single quantifiable measurement at a specific point in time. Combining the measurement with a timestamp and one or more dimensions results in a metric data point. A single metric data point may include multiple measurements and multiple dimensions. Metrics are used to track and assess the status of one or more processes. A metric typically comprises a numeric value that is stored as a timeseries. A timeseries is a series of numeric data points of some particular metric over time. Each time series comprises a metric plus one or more tags associated with the metric. A metric is any particular piece of data that a client wishes to track over time.

2.0 General Overview

One of the fundamental shifts in modern day computing has been the shift from monolithic applications to microservices-based architectures. As previously mentioned, this is the shift from an application being hosted together (e.g., on a single system) to each piece of an application being hosted separately (e.g., distributed). FIG. 1A illustrates an exemplary monolithic multi-layer architecture. A monolithic application is traditionally built as a single unit. The monolithic application consists of a single self-contained unit in which code exists in a single codebase 100 and in which modules are interconnected. At deployment time, the entire codebase is deployed and scaling is achieved by adding additional nodes.

Figure 1B:
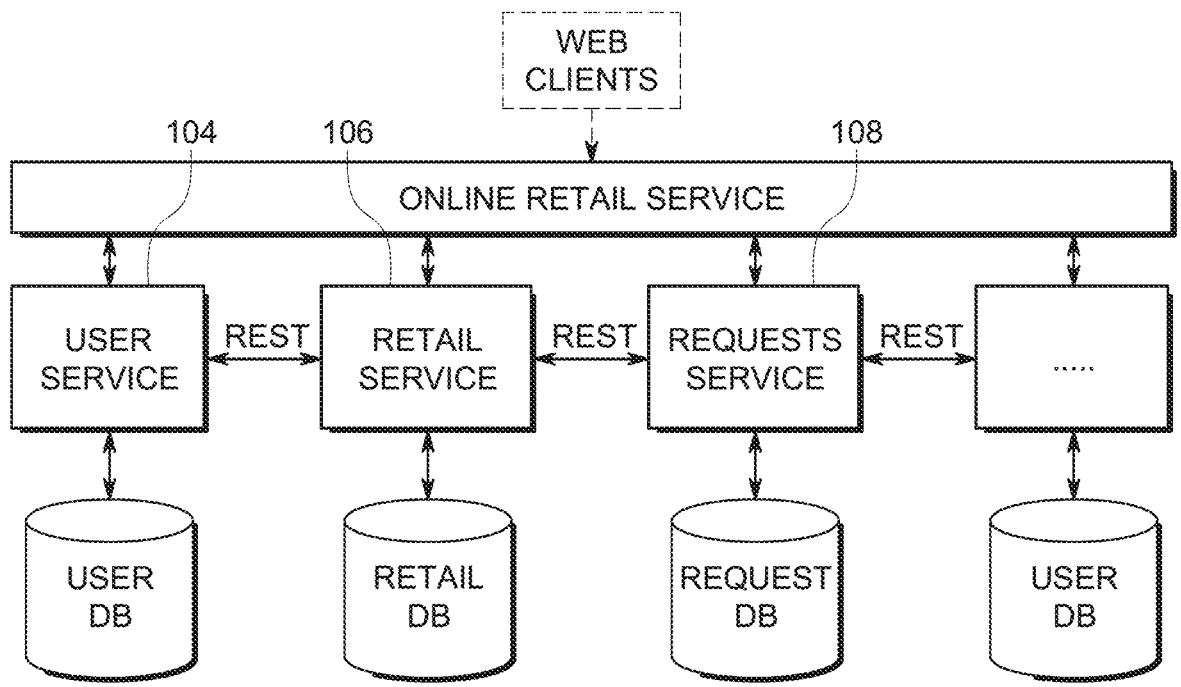
FIG. 1B illustrates an exemplary microservices architecture.

FIG. 1B illustrates an exemplary microservices architecture. A microservices architecture involves the building of modules (e.g., modules 104, 106 and 108) that address a specific task or business objective. As a result, these modules tend to exhibit low coupling and high cohesion. A microservices architecture is often achieved by decoupling a monolithic application into independent modules that each include the components necessary to execute a single business function. These services typically communicate with each other using language agnostic Application Programming Interfaces ("APIs") such as Representational State Transfer (REST).

Microservices were created in order to overcome the issues and constraints of monolithic applications. Monolithic applications have a tendency to grow in size over time. As applications become larger and larger, the tight coupling between components results in slower and more challenging deployments. Because of the tight coupling, the potential for a failure of the entire application due to a recently deployed feature is high. In some cases, deployments may take several months to a year, greatly reducing the number of features that may be rolled out to users. This tight coupling also makes it difficult to reuse and replace components because of the effect they may have on other components throughout the application.

Microservices address these issues by being small in scope and modular in design. Modular design results in components being loosely coupled, which offers enormous benefits from the standpoint of being both fault tolerant and independently deployable. This results in functionality that may be frequently deployed and continuously delivered. The attribute of loosely coupled modules without a central orchestrator in a microservices architecture, however, leads to considerable challenges in terms of monitoring, troubleshooting and tracking errors.

These challenges have led to the rise of observability, a new generation of monitoring, the foundation for which is built, in part, on distributed tracing. Distributed tracing, also called distributed request tracing, is an application performance monitoring (APM) method used to profile and monitor applications, especially those built using a microservices architecture. Distributed tracing helps pinpoint where failures occur and what causes poor performance. Distributed tracing, as the name implies, involves tracing user requests through applications that are distributed. A trace represents a single user request, also referred to as a transaction, and represents the entire lifecycle of a request as it traverses across the various services or components of a distributed system.

APM-based methods such as distributed tracing monitor the speed at which transactions are performed both by end-users and by the systems and network infrastructure that support a software application, providing an end-to-end overview of potential bottlenecks and service interruptions. This typically involves the use of a suite of software tools—or a single integrated SaaS or on-premises tool—to view and diagnose an application's speed, reliability, and other performance metrics in order to maintain an optimal level of service.

Figure 2A:
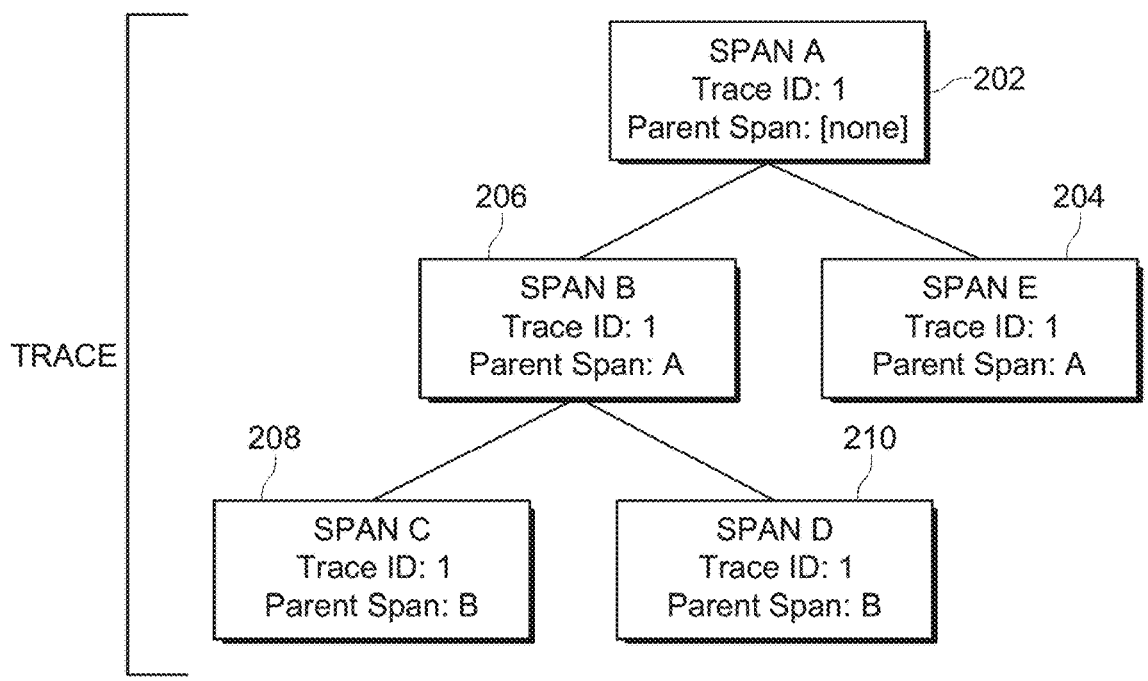
FIG. 2A illustrates an exemplary trace tree.

FIG. 2A illustrates an exemplary trace tree. The first span in the trace tree, Span A 202, is known as the root span. A trace tree typically comprises a root span, which is a span that does not have a parent. It may be followed by one or more child spans. Child spans may also be nested as deep as the call stack goes. Span B 206 and Span E 204 are child spans of the parent span, Span A. Further, Span C 208 and Span D 210 are child spans of the parent Span B 208.

Figure 2B:
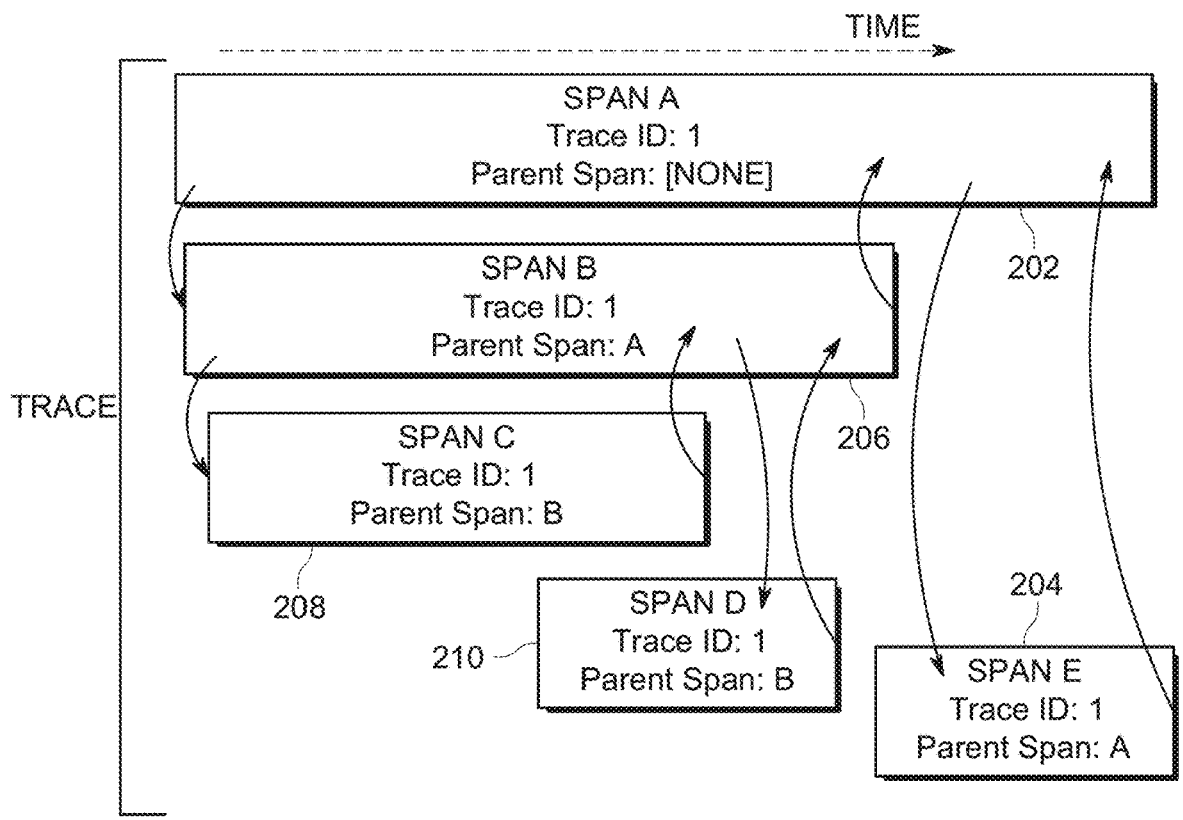
FIG. 2B illustrates an alternate view of the trace from FIG. 2A adjusted for timeline.

FIG. 2B illustrates an alternate view of the trace from FIG. 2A adjusted for timeline. The trace starts with the Span A 202, the root span, where the request starts. When the trace starts, a Trace ID is generated (e.g., Trace ID: 1 as shown in FIG. 2B), which follows the request as it propagates through the distributed system. A new span is generated for each logical chunk of work in the request, where the new span includes the same Trace ID, a new Span ID and a Parent Span ID, which points to the span ID of the new span's logical parent. The Parent Span ID creates a parent-child relationship between spans.

A given request typically comprises one span (e.g., the root Span A 202) for the overall request and a child span for each outbound call made to another service, database, or a function within the same microservice etc. as part of that request. For example, in the example of FIG. 2B, the Span A 202 is the root span for the overall request and generates several child spans to service the request. The Span A 202 makes a call to the Span B 206, which in turn makes a call to the Span C 208, which is a child span of the Span B 206. The Span B 206 also makes a call to the Span D 210, which is also a child span of the Span B 206. The Span A 202 subsequently calls the Span E 204, which is a child span of the Span A 202. Note, that the spans in a given trace comprise the same Trace ID. The Trace ID along with the Parent Span ID may be used to consolidate the spans together into a trace.

3.0 Data Collection

Distributed tracing data is generated through the instrumentation of microservices-based applications, libraries and frameworks. Software may be instrumented to emit spans and traces. The spans and traces may be generated according to an industry standard, such as the OpenTracing standard. Other common open source instrumentation specifications include OPENTELEMETRY and OpenCensus. Each span may be annotated with one or more tags that provide context about the execution, such as the user instrumenting the software, a document involved in the request, an infrastructure element used in servicing a request, etc.

The instrumentation handles the creating of unique trace and span IDs, tracking duration, adding metadata and handling context data. Handling context data, also known as context propagation is critical and is responsible for passing context such as the trace ID between function/microservice calls, thereby, enabling an observer to view the entire transaction at each step along the way. Context propagation may, for example, be based on REST. REST is header-based and requires a transaction to pass headers between service-to-service calls. In order to work properly, services within a request use the same context propagation format. Once the code has been instrumented and context propagation has been implemented using a standard format, the trace data generated by the services may be collected and analyzed to monitor and troubleshoot the microservices-based applications generating the trace data.

Figure 3:
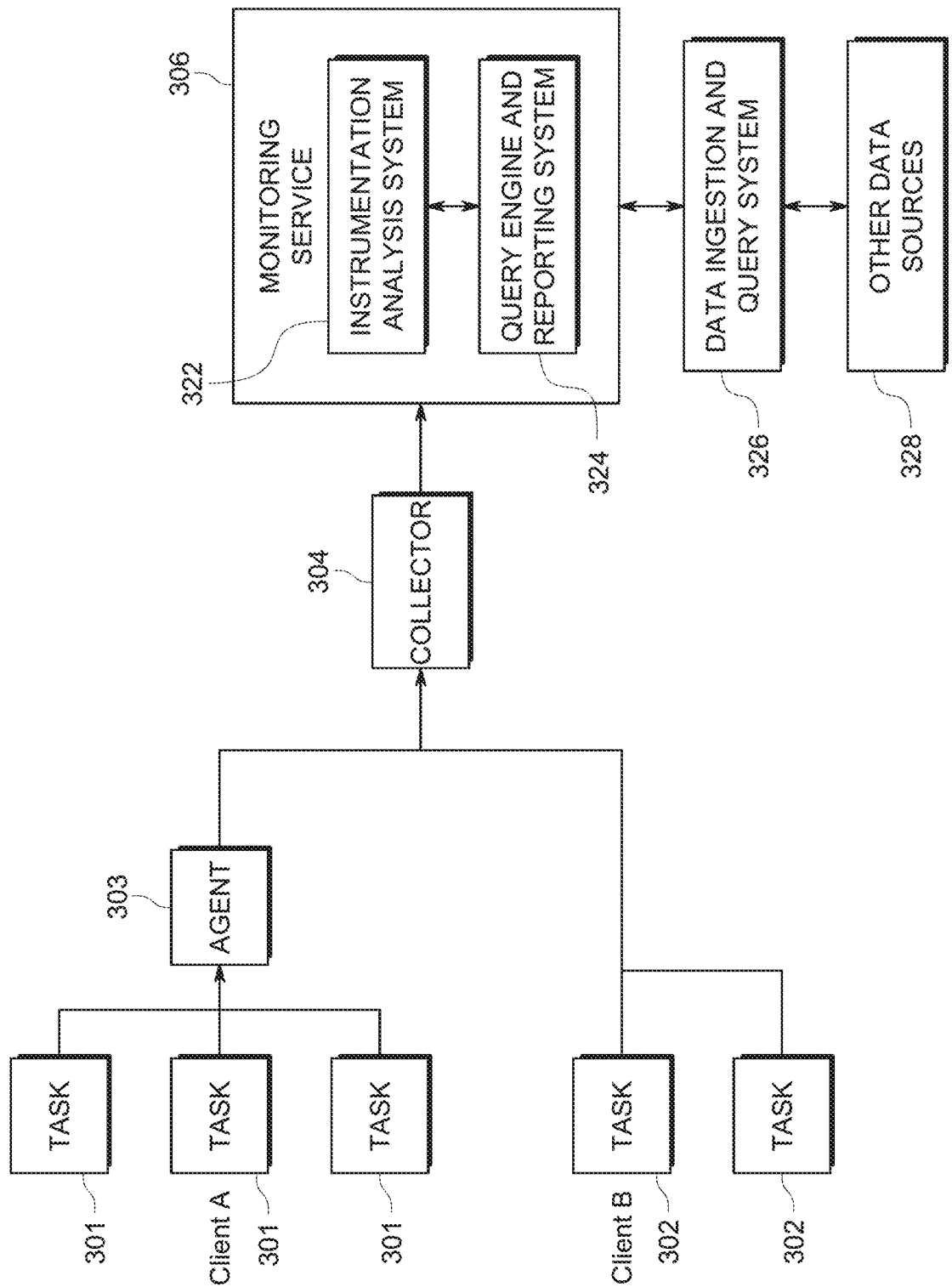
FIG. 3 is a flow diagram that illustrates the manner in which trace data may be collected and ingested for further analysis within a computer system, in accordance with embodiments of the present invention.

FIG. 3 is a flow diagram that illustrates the manner in which trace data may be collected and ingested for further analysis within a computer system, in accordance with an embodiment of the invention. Tasks 301 represent client applications that execute within a client data center for Client A. Similarly, tasks 302 represents client applications that execute within a client data center for Client B. The tasks 301 or 302 may comprise services or applications within a client's on-premises ("on-prem") software. Alternatively, they may comprise services or applications running in the cloud computing environment, e.g., in an AMAZON WEB SERVICES (AWS) Virtual Private Cloud (VPC).

The tasks 301 and 302 may be instrumented using open source or common commercial tracing libraries, from tracing applications (e.g., Jaeger or Zipkin), in-house formats, or auto-instrumentation. Each task may be configured to generate spans that describe the processing of a portion of a request as the request traverses through the various tasks (or services) on the client-side.

It should be noted that while the tasks 301 and 302 may comprise instrumented application software, the techniques disclosed herein are not limited to application software but are applicable to other kinds of software, for example, server software, software executing on customer devices, websites and so on. Furthermore, a client device (e.g., a device at a data center for Client A or Client B) may include any computing system that is configured to execute instrumented software, whether or not it is used for development of improved software. For example, the client device may be a computing system used for testing purposes, staging purposes, or any production system executing in an enterprise.

An agent 303 is typically configured at the client-side host or service for receiving spans collected from the various tasks on the client-side and transmitting the spans to a collector 304. An agent may receive generated spans locally using, for example, User Datagram Protocol (UDP). The tasks 302 may comprise instrumented tasks that are not using an agent and may be configured to span directly to the collector 304. While spans may be collected from the client-side tasks without configuring an agent (e.g., in the case of Client B), using an agent may provide benefits including batching, buffering and updating trace libraries.

Batches of span data collected by the agent 303 are periodically received at the collector 304. The collector may be implemented within a client's on-prem software or in the cloud computing environment (e.g., in an AWS VPC). Traces often generate duplicative data that is not relevant for monitoring or troubleshooting. The collector 304 may avoid redundancies by sampling the data before processing and storing it. The collector 304 runs the span data through a processing pipeline and may store it in a specified storage or analytics backend such a monitoring service 306. It should be noted that the collector 304 may interact with the monitoring service 306 through a network (not shown).

In an embodiment, the collector 304 may consolidate data from several client devices and combine the data to send to the monitoring service 306. For example, the collector 304 may comprise a server that receives data streams internally from different client devices and, periodically, sends the combined data in batch form to the monitoring service 306. This allows efficiency of external communication from the enterprise.

In an embodiment, the monitoring service 306 receives and analyzes the span data for monitoring and troubleshooting purposes. It should be noted that, in addition to monitoring service 306, tracing data might also be simultaneously transmitted to other types of storage and monitoring backend services, e.g., a data ingestion and query system 326.

In one embodiment, the monitoring service 306 may be a Software as a Service (SaaS) based service offering. Alternatively, in another embodiment, it may also be implemented as an on-prem application. The monitoring service 306 receives the observability data collected by the collector 304 and provides critical insights into the collected trace data to a client, who may be an application owner or developer. In an embodiment, the monitoring service 306 may be hosted on a computing system that includes one or more processors, memory, secondary storage and input/output controller. The computing system used for hosting the monitoring service 306 is typically a server class system that uses powerful processors, large memory resources and fast input/output systems.

The monitoring service 306 may comprise an instrumentation analysis system 322 (also referred to herein as an "analytics engine") and a query engine and reporting system 324. The instrumentation analysis system 322 receives data comprising, for example, trace information, span information and/or values of metrics sent by different clients. As noted previously, task or software program may be instrumented to generate spans with a common field in their data structures to designate spans that are part of a common trace. For example, the spans may include a trace identifier such that spans with the same trace identifier are a part of the same trace.

The tasks (or software) executing on the client device are configured to send information generated as a result of instrumenting the software to the instrumentation analysis system 322 of the monitoring service 306. For example, the tasks may send span information collected from the various services at the client end to the instrumentation analysis system 322. Alternatively, traces may be sampled to generate metric values, and the tasks may send values corresponding to various metrics as they are generated to the instrumentation analysis system 322. The tasks may send group values of metrics periodically to the instrumentation analysis system 322. Different tasks may send the same metric or different metrics at different rates. The same task may send different metrics at different rates.

In an embodiment, the tasks (e.g., tasks 301 and 302) and the collector 304 may send data to the monitoring service 306 by invoking an API supported by the monitoring service 306 and the instrumentation analysis system 322. In one embodiment, a customer name may be specified for the instrumented software. The instrumented software includes the customer name when it identifies a data stream associated with that particular customer. The ability to associate a data stream with a customer allows the instrumentation analysis system 322 to perform customer specific analysis, for example, report on usages of systems for each customer, identify customers reporting more than a threshold number of errors and so on.

In one embodiment, an application owner or developer may submit queries to the query engine and reporting system 324 to gain further insight into the spans and traces (or metrics) received and analyzed by the instrumentation analysis system 322. For example, the query engine and reporting system 324 within the monitoring service 306 may be configured to generate reports, render graphical user interfaces (GUIs) and/or other graphical visualizations to represent the trace and span information received from the various clients. The query engine and reporting system 324 may, for example, interact with the instrumentation analysis system 322 to generate a visualization, e.g., a histogram or an application topology graph (referred to interchangeably as a "service graph" herein) to represent information regarding the traces and spans received from a client. Alternatively, the query engine and reporting system 324 may be configured to respond to specific statistical queries submitted by a developer regarding one or more services within a client's application.

3.1 Logs, Traces and Metrics

As mentioned above, the shift from monolithic applications to microservices-based architectures has increased the usefulness of analyzing traces in a distributed system. In one or more embodiments, the tracing data may be coupled with log data and/or metrics data, in order to provide users with a more complete picture of the system. For example, the trace data may be coupled with log or other data from the data ingestion and query system 326. In one embodiment the data ingestion and query system 326 may be comprised within the monitoring service 306.

One example of a data ingestion and query system 326 is the event-based data intake and query SPLUNK® ENTER- PRISE system developed by Splunk Inc. of San Francisco, California. The SPLUNK® ENTERPRISE system is the leading platform for providing real-time operational intelligence that enables organizations to collect, index and search machine-generated data from various data sources 328, for example, websites, applications, servers, networks and mobile devices that power their businesses. In one embodiment the other data sources 328 may be associated with the same clients (e.g., Client A and Client B) that generate the trace data received by the monitoring service 306.

The SPLUNK® ENTERPRISE system is particularly useful for analyzing data which is commonly found in system log files, network data and other data input sources. In another example, the data ingestion and query system 326 may be an on-premises application or based on a distributed or cloud-based service.

In one embodiment, the trace data may be ingested into the data ingestion and query system 326, or may be coupled with outputs from the data ingestion and query system 326 e.g., from searches that may be based on trace data and run on the data ingestion and query system 326. In some embodiments, the data ingestion and query system 326 described above may be integrated with or into the monitoring service 306 that analyzes trace data, e.g., the monitoring service 306. The monitoring service 306 may, accordingly, comprise a full suite of services including, for example, analyzing trace data, generating metrics data from the trace data, ingesting and analyzing log data, ingesting metrics data and providing insights generated from the metrics data, including aggregating and/or correlating trace data, log data and metrics data, in order to gain insights into a computing platform.

As described above, the trace data received from the collector 304 may be sent to systems configured to ingest and search data, such as the data ingestion and query systems 326 described above. In some embodiments data ingestion and query system 326 may be configured to generate metrics data from the trace data received from the collector 304. Additionally, other embodiments may use a stream processor that may perform transformations and other operations on incoming data prior to, concurrently with, and/or as an alternative to, ingestion of the data. In some embodiments, the system may also be configured to ingest metrics data and may be optimized to ingest, query and generate insights from metrics data.

In other embodiments, metrics may be generated by instrumentation (e.g., from instrumenting client software and tasks, e.g., tasks 301, 302 etc. as described above) and sent to a SaaS-based processing system, e.g., the monitoring service 306. For example, software may be instrumented to send metrics to a gateway or to a instrumentation analysis engine, where metrics may be aggregated, queried and alerted.

As above, the trace data may be paired with data from the data ingestion and query system 326, metrics generated by instrumentation, and other data sources, and correlated in various ways to provide insights. For example, as a broad-based correlation example, the metrics data may be used in a thresholding comparison to determine that there is an issue that needs attention, the trace data may be used to determine which component or microservice requires attention, and log data from the data ingestion and query system 326 may be used to determine exactly why the component or microservice needs attention. Other correlations and uses for the combination of metrics data, log data and event data are also contemplated herein. As noted above, the various features and services may be provided within an integrated monitoring platform (e.g., the monitoring service 306), wherein the platform comprises, among other things, an instrumentation analysis system (e.g., the instrumentation analysis system 322), a query engine and reporting system (e.g., the query engine and reporting system 324) and a data ingestion and query system (e.g., the data ingestion and query system 326).

4.0 Multiple Modalities for Storing and Analyzing Data

Historically, there have been several challenges associated with implementing an analytics tool such as the monitoring service 306 within a heterogeneous distributed system. One of the challenges associated with microservices architectures, for example, is efficiently ingesting and aggregating significant amounts of span and trace data generated by various services in an architecture. Conventional tracing and monitoring systems are typically unable to ingest the vast amounts of span and tracing data generated by clients' application and have to resort to sampling the data intelligently to reduce the volume of stored trace data. Using sampling exclusively, however, results in loss of data and, as a result, conventional monitoring tools do not allow clients access to all the traces generated by their application. Furthermore, conventional monitoring tools may calculate metrics (e.g., requests, errors, latency, etc.) based on the sampled set of data and, accordingly, the calculations may be approximate at best and inaccurate at worst.

Advantageously, embodiments of the present invention allow clients of a monitoring platform the ability to ingest up to 100% of the spans and create streams of metric data using the ingested spans prior to consolidating the spans into traces (through a sessionization process). The metric time series provide valuable real-time information pertaining to services or endpoints within an application and also allow alerts to be configured to manage anomalous behavior on the endpoints.

Embodiments of the present invention also sessionize and store up to 100% of the spans received from the client in real time. Embodiments of the present invention comprise an ingestion streaming pipeline that is able to ingest and consolidate the incoming spans into traces, and is further able to use advanced compression methods to store the traces. Additionally, because incoming trace and span information may be efficiently ingested and aggregated in real time, a monitoring platform configured, in accordance with embodiments of the present invention, is able to advantageously convey meaningful and accurate information regarding throughput, latency and error rate (without the need for sampling) for the services in the microservices-based application. High-cardinality metrics pertaining to throughput, latency and error rate may be calculated with a high degree of accuracy because all incoming data is accounted for and there is no data loss as a result of sampling.

Embodiments of the present invention further allow a client to store and analyze the trace data using multiple modalities of analysis. In one embodiment, a first modality comprise converting incoming spans from one or more clients into a plurality of metric data streams (also referred to as metric time series) prior to sessionizing the spans. Each metric time series is associated with a single span identity, where a base span identity comprises a tuple of information corresponding to an associated type of span. Each metric time series in this modality (referred to herein as "metric time series modality") represents a plurality of tuples, each tuple representing a data point. Key performance metrics (KPIs) can be extracted directly from the metric time series in real-time and reported to a user. Because the metric time series are created without paying a time penalty associated with sessionization, they can be used to perform real-time monitoring with sub-second resolution and generate alerts within two to three seconds if a condition is violated.

In one or more embodiments, a second modality of analysis sessionizes the incoming spans and supports deriving higher-cardinality metrics (as compared with metric time series data) for a selected set of indexed tags, e.g., user-selected tags, global tags of the trace, etc. over selected time durations (referred to herein as the "metric events modality"). This modality is particularly useful for clients that need accurate SLI information for a larger set of high-value indexed tags. The metric events modality enables developers to aggregate metrics that have been pre-generated using the sessionized trace data to efficiently respond to queries submitted by a client. The aggregated metrics provide a user visibility into the performance of services within a microservices-based application. The metric events modality may deprioritize speed as compared to the metric time series to provide a user resolution into a larger set of indexed tags. As such, responses provided by the metric events modality are typically slightly slower (e.g., 45 seconds to 1 minute) as compared with the sub-second response rates of the metric time series.

In one or more embodiments, the metric events modality may also keep track of exemplary traces associated with a pre-configured set of indexed tags. The tags to be indexed may be pre-selected by the user or the monitoring platform. The Trace IDs may be used to retrieve the associated traces and analysis on the actual traces may be performed to generate more particularized information, e.g., span duration, span count, span workload percentage, etc. for each span in a given trace. In one embodiment, once the traces are retrieved, an analysis may be run on an arbitrary set of tags (in addition to the pre-configured indexed tags).

Additionally, in one or more embodiments, a third modality of analysis may comprise a "full-fidelity" modality where a full-fidelity analysis may be conducted on any dimension or attribute of data to gauge the performance of services in the microservices-based application. The full-fidelity modality allows clients to search most or all of the incoming trace data that was ingested by the monitoring platform without relying on sampling. The full-fidelity mode may sacrifice speed for accuracy, and may be used by clients that need a more thorough analysis of the services across every dimension or attribute.

In an embodiment, the three modalities may be supported by the monitoring platform simultaneously by storing ingested trace data using three different formats, wherein each format corresponds to one of the three available modalities of analysis. Note that embodiments of the present invention are not restricted to three discrete data sets. The data sets for the different modalities may overlap or may be saved as part of a single data set. When a user submits a query, the monitoring platform may determine which of the data sets is most suitable for addressing the query. Thereafter, the monitoring platform executes the query against the selected data set to deliver results to the user. By comparison, conventional monitoring systems typically focus on a single modality and do not provide clients the ability to seamlessly navigate between different modalities. Conventional monitoring systems also do not provide the ability to automatically select the most appropriate modality based on the content, structure, syntax or other specifics pertaining to an incoming query.

Figure 4:
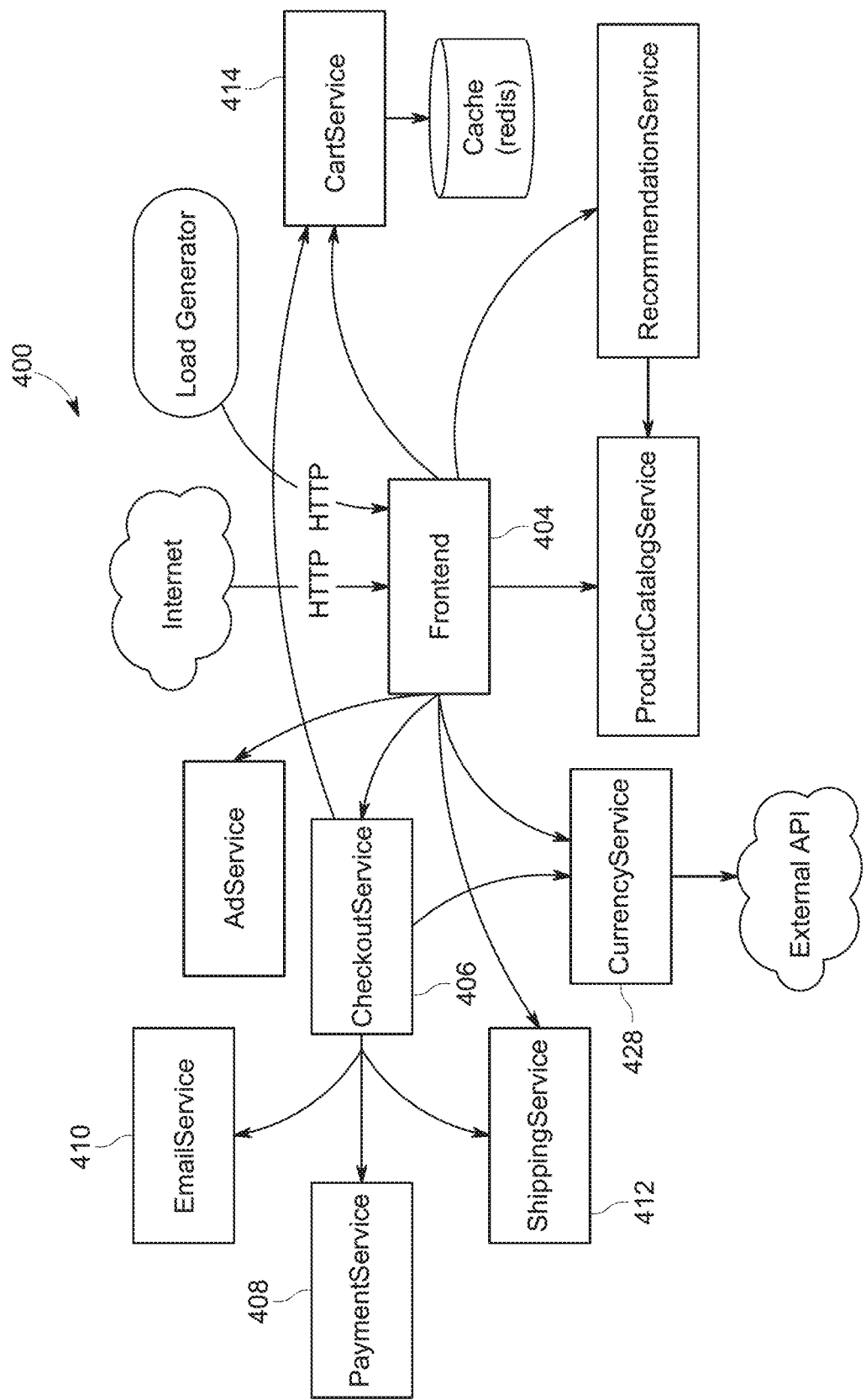
FIG. 4 illustrates components of an exemplary microservice application for an online retailer.

FIG. 4 illustrates components of an exemplary microservice application for an online retailer. A user needing to conduct a transaction may visit the website of the online retailer which would initiate a call to the retailer's Front-end service 404 on a server. The call to the Front-end service 404 may subsequently trigger a chain of calls on the retailer's back-end that would not be transparent to the user. For example, if the user proceeds to complete the transaction by checking out, several calls may be made to the back-end to services such as a CheckOutService 406, a PaymentService 408, an EmailService 410, a ShippingService 412, a Currency Service 428 and a CartService 414 that may be involved in processing and completing the user's transactions. Note, that a given request submitted by a user to the website would involve a subset of the services available and, typically, a single request would not result in a call to each of the services illustrated in FIG. 4.

As mentioned above, a request that the user initiates would generate an associated trace. It is appreciated that each user request will be assigned its own Trace ID, which will then propagate to the various spans that are generated during the servicing of that request. Each service may process a portion of the request and generate one or more spans depending on the manner in which instrumentation is configured for a respective service. The Trace ID may then be used by the server to group the spans together into a trace with that Trace ID. So, for example, the user's checkout transaction may generate a call at the Front-end service 404, which may in turn generate calls to various microservices including the CheckoutService 406. The CheckoutService 406 may, in turn, generate calls to other services such as the PaymentService 408, the EmailService 410 and the ShippingService 412. Each of these calls passes the Trace ID to the respective service being called, wherein each service in the call path could potentially generate several child spans.

It should be noted that a service does not necessarily need to make calls to other services—for instance, a service may also generate calls to itself (or, more specifically, to different operations and sub-functions within the same service), which would also generate spans with the same Trace ID. Through context propagation then, each of the spans generated (either by a service making a call to another service or a service making a call to various operations and sub-functions within itself) is passed the Trace ID associated with the request. Eventually, the spans generated from a single user request would be consolidated (e.g., by the collector 304 or the monitoring service 306 of FIG. 3) together using the Trace ID (and the Parent Span IDs) to form a single trace associated with the request.

As noted above, conventional distributed tracing tools are not equipped to ingest the significant amounts of span and tracing data generated by clients' application and have to resort to sampling the data intelligently to reduce the volume of stored trace data. Further, conventional distributed tracing tools do not provide application owners multiple modalities of storing and querying trace data with the flexibility of switching between the different modalities depending on the level of detail required to respond to a user's query.

Referencing FIG. 4 again, an owner of the application 400 may, for example, need varying degrees of detail regarding the services in the application. For example, the application owner may need to monitor certain metrics (e.g., RED metrics associated with Request, Errors, Durations) in real-time associated with a particular service, e.g., CheckoutService 406. Assuming there are errors generated by a call made from the Frontend service 404 to the CheckoutService 406, the owner may require further information pertaining to additional tags (indexed or non-indexed) associated with CheckoutService 406. The application owner may also need to access the full trace(s) associated with the request from the Frontend service 404 to the CheckoutService 406 to perform a more detailed analysis. Each of the requests requires a different degree of detail extracted from the span and trace information.

In one embodiment, the metric time series modality allows the user to monitor RED metrics associated with a given service, e.g., CheckoutService 406 in the online retailer's application in real-time. In one embodiment, the metric time series modality can also be configured to deliver real-time alerts to a user based on each of the RED metrics, e.g., anomalies related to the request rate, error rate, or latency (duration).

If the user needs Service Level Indicators (SLIs) pertaining to certain indexed tags related to the call between Frontend service 404 and CheckoutService 406 for a given time duration, the metric event modality may enable the user to perform aggregations of metrics data computed from the indexed tags associated with the spans generated by the call between the Frontend service 404 and the CheckoutService 406. The metrics aggregation may be a numeric summation, for example, and may be performed relatively quickly.

The metric event modality, in accordance with embodiments of the present invention, associates the selected tags indexed from the incoming span data (e.g., the same indexed tags used for performing metrics extraction) with Trace IDs for exemplary traces. The Trace IDs may be used to retrieve the exemplary traces associated with indexed tags. Thereafter, the monitoring platform may analyze the exemplary traces to generate more particularized information, e.g., span duration, span count, span workload percentage, etc. for each span in a given trace. For the example of FIG. 4, if the user requires a performance summary for the spans generated by the call made from the Frontend service 404 to the CheckoutService 406, the associated query submitted by the user may access the data set associated with the metric event modality. Using the Trace IDs corresponding to the indexed tags, the monitoring platform may then perform the computations necessary on the corresponding exemplary traces to provide the user further information regarding the span performances. In an embodiment, the user may also be able to extract meaningful information from the unindexed tags associated with the spans generated by the call using the exemplary traces.

If the user wants to search all the incoming trace data associated with the call between Frontend service 404 to the CheckoutService 406, embodiments of the present invention provide a third modality of analysis. In the full-fidelity modality, a full-fidelity analysis may be conducted on any dimension or attribute of the trace data. For example, the user may be able to search previously indexed or unindexed tags across each of the traces associated with the call the between the Frontend service 404 and the CheckoutService 406. The full-fidelity modality allows an analysis to be performed across any relevant trace. Conventional tracing systems are unable to provide that level of flexibility and detail for developers or application owners needing to investigate performance issues with their applications. Note that this modality of analysis may be more time-consuming because trace data may be detailed and require significant storage space.

Embodiments of the present invention ingest and aggregate the span information from the online retailer's application. Further, embodiments of the present invention extract information from the incoming span data and store the information using multiple formats to support multiple modalities of data analysis for a user. Each modality is configured to allow the users access to a different format in which incoming trace information may be represented and stored, where each format conveys a different degree of resolution regarding the ingested traces to a user and, accordingly, may occupy a different amount of storage space.

Figure 5:
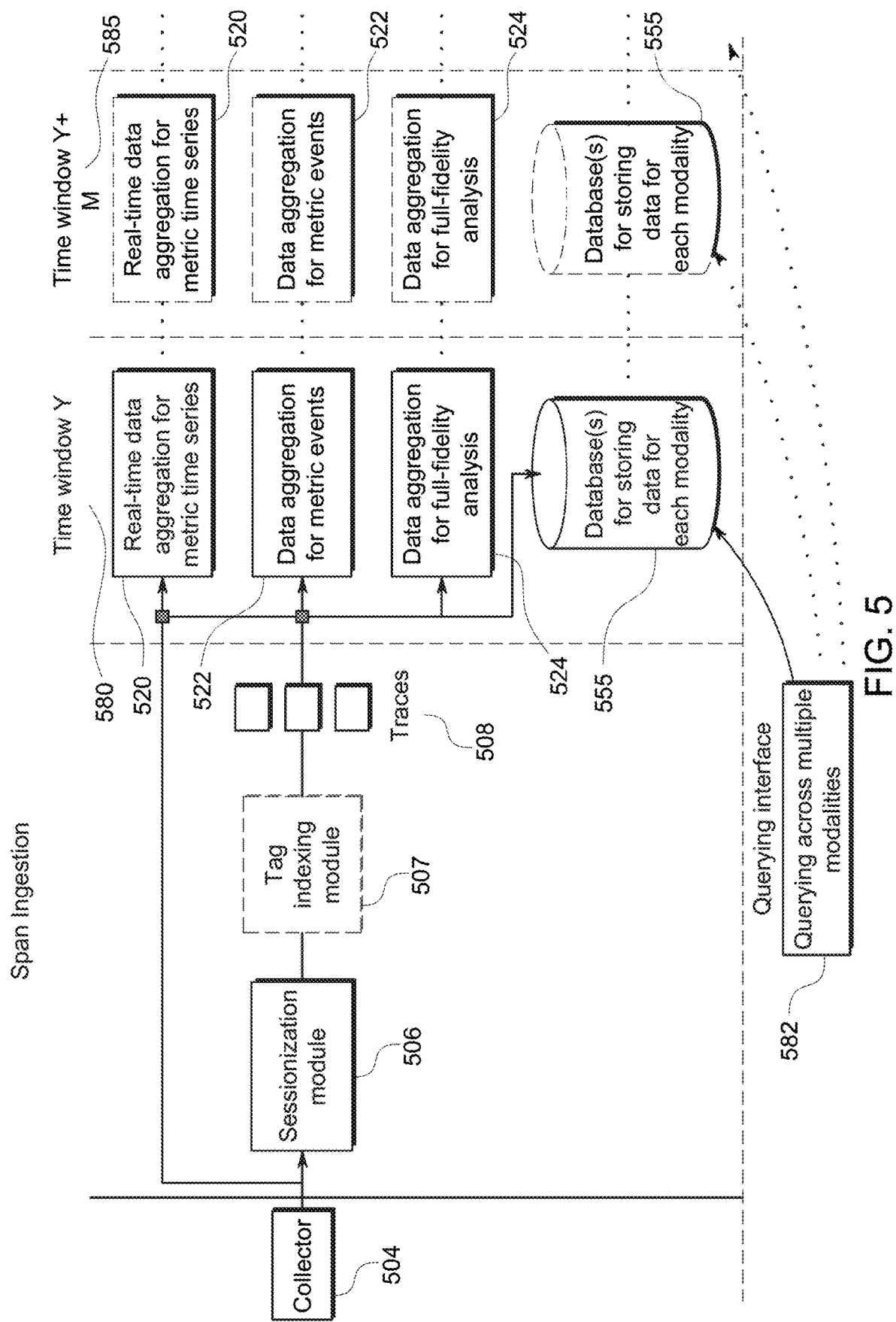
FIG. 5 is a flow diagram that illustrates an exemplary method of ingesting and aggregating span information to support multiple modalities of analysis, in accordance with embodiments of the present invention.

FIG. 5 is a flow diagram that illustrates an exemplary method of ingesting and aggregating span information to support multiple modalities of analysis, in accordance with embodiments of the present invention. As mentioned in connection with FIG. 3, span information is received at the monitoring service 306 from the collector (e.g., the collector 504 in FIG. 5).

As noted previously, in one embodiment, incoming spans from one or more clients are converted into a plurality of metric data streams prior to consolidating the spans into traces through a sessionization process. The incoming spans are received and the metric data streams are generated by module 520 prior to the spans being sessionized. Because the metric time series are created without paying a time penalty associated with sessionization, they can be used to perform real-time monitoring and alerting.

The incoming spans are also sessionized where the span information is combined into traces in a process called sessionization. The sessionization module 506 is responsible for stitching together or combining the traces 508 using, among other things, the Trace IDs associated with each user-request (and typically also the Parent Span IDs of each span). Note that, in one embodiment, the sessionized traces may also be inputted to the module 520 to create metric time series to track traces (separately from the time series created to track spans).

In addition to a Trace ID, each trace also comprises a time-stamp; using the time-stamps and the Trace IDs, the sessionization module 506 creates traces 508 from the incoming spans in real time and sessionizes them into discrete time windows. For example, the sessionization process may consolidate traces (from spans) within a first time window (associated with time window Y 580) before transmitting the traces to modules 520, 522, or 524. Thereafter, the sessionization process may consolidate traces within the subsequent time window (associated with time window "Y+M" 585) before transmitting those traces to the modules 520, 522, or 524. It should be noted that the time windows associated with each of the modules 520, 522, and 524 may be different. In other words, the metric time series data may be collected over short time windows of 10 seconds each. By comparison, traces for the metric events modality (associated with the module 522) may be collected over 10 minute time windows.

In some embodiments of the present invention, the sessionization module is able to ingest, process and store all or most of the spans received from the collector 504 in real time. By comparison, conventional monitoring systems do not accept all of the incoming spans or traces; instead, they sample incoming spans (or traces) to calculate SLIs at the root level of a trace before discarding the spans. Embodiments of the present invention, by comparison, comprise an ingestion streaming pipeline that is able to ingest and consolidate all the incoming spans into traces in real time, and is further able to use advanced compression methods to store the traces. Further, embodiments of the present invention are able to generate metric time series from the span data (prior to sessionizing the spans) to provide real-time monitoring and alerting of certain KPIs.

As noted above, the sessionization module 506 has the ability to collect all the traces within a first time window Y

580 using the time-stamps for the traces. Subsequently, the sessionized traces are fed to the modules 522 and 524, for the respective modes (metric events and full-fidelity) for extraction and persistence.

In one embodiment, subsequent to consolidation, the trace data is indexed by an optional tag indexing module 507, which indexes one or more tags in the trace data. The tags may be user-selected tags or tags that the monitoring platform is configured to index by default. In a different embodiment, tag indexing may be performed as part of data aggregation, e.g., by module 522 associated with metric events.

In an embodiment, data sets associated with each of the modalities may be persisted in one or more databases 555. As noted previously, the data sets for the respective modalities may be separate data sets, overlapping data sets or a single data set that supports all the modalities. Note that the databases 555 may be a single database that stores data sets corresponding to all three modalities. Alternatively, the databases 555 may represent different respective databases for each of the three modalities. Furthermore, the databases 555 may also represent distributed databases across which relevant information for each of the three modalities is stored.

In one embodiment, data associated with each of the three modalities is generated at the time of ingestion and stored separately from each other. The structure, content, type or syntax of query submitted by a user will typically dictate which of the three modalities and corresponding data set will be selected. In one embodiment, an interface through which the query is submitted may also determine which of the three modalities and corresponding data set is selected. In an embodiment, there may be some commonality in the data for the three modalities in which case the storage for the data may overlap. An alternative embodiment may also comprise one or two of the three modalities (instead of all three) described above.

A client may send in a request to retrieve information pertaining to an application through query interface 582. The underlying querying engine (e.g., the query engine and reporting system 324 from FIG. 3) will analyze the structure, content, type and/or syntax of the query, and also the interface through which the query is submitted, to determine which of the three modalities and respective data set to access to service the query. In an embodiment, the three data sets corresponding to the three modalities are structured in a way that allows the querying engine to navigate between them fluidly. For example, a client may submit a query through the query interface 582, which may potentially result in the query engine accessing and returning data associated with the metric events modality. Thereafter, if the client requires more in-depth information, the querying engine may seamlessly navigate to data associated with a different mode (e.g., full-fidelity) to provide the user with further details. Conventional monitoring systems, by comparison, do not provide more than a single modality or the ability to navigate between multiple modalities of data analysis.

4.1 Metric Time Series

Embodiments of the present invention allow trace data to be stored and analyzed using multiple modalities of analysis. In one embodiment, incoming spans from one or more clients are converted into a plurality of metric data streams (also referred to as metric time series) and transmitted to the analytics engine (e.g., the instrumentation analysis system 322) for further analysis. Most of the metric data streams are created directly from the incoming spans prior to the sessionization process to generate metric time series related to spans. Each metric time series is associated with a single "span identity," where a base span identity comprises a tuple of information corresponding to an associated type of span. Each metric time series in the metric time series modality represents a plurality of tuples with each tuple representing a data point. KPIs can be extracted in real-time directly from the metric time series and reported to a user. Because the metric time series are created without paying a time penalty associated with sessionization, they can be used to perform real-time monitoring with sub-second resolution and generate alerts within two to three seconds if some condition is violated.

4.1.1 Generating Metric Data Streams Using Span Identities

A client application associated with, for example, an online retailer's website may potentially generate millions of spans from which a monitoring platform may need to extract meaningful and structured information. To organize the significant amounts of incoming span data, in an embodiment, incoming spans may be automatically grouped by mapping each span to a base "span identity," wherein a base span identity comprises some key attributes that summarize a type of span. An exemplary span identity may be represented as the following exemplary tuple: {operation, service, kind, isError, httpMethod, isServiceMesh}, where the operation field represents the name of the specific operation within a service that made the call, the service field represents the logical name of the service on which the operation took place, the kind field details relationships between spans and may either be a "server" or "client," the isError field is a "TRUE/FALSE" flag that indicates whether a span is an error span, the httpMethod field relates to the HTTP method of the request for the associated span and the isServiceMesh field is a flag that indicates whether the span is part of a service mesh. A service mesh is a dedicated infrastructure layer that controls service-to-service communication over a network. Typically, if software has been instrumented to send data from a service mesh, the trace data transmitted therefrom may generate duplicative spans that may need to be filtered out during monitoring. Accordingly, the 'isServiceMesh' flag allows the analytics engine to filter out any duplicative spans to ensure the accuracy of the metrics computations.

In some embodiments, the tuple used to represent the span identity may include other identifying dimensions as well. For example, if a user needs visibility into metadata tags from the spans in addition to the dimensions extracted for a base span identity by default (e.g., service, operation, kind, etc.), an extended identity may be created. An extended identity supports custom dimensionalization by a user, where dimensionalization refers to the ability to extract information pertaining to additional tags or metadata in a span. An extended identity provides a customer the ability to dimensionalize the span using pre-selected dimensions. Conventional methods of monitoring by comparison did not offer customers the flexibility to add custom dimensions to streams of metric data. An extended identity comprises the span's base identity and additionally a map of the span's tag key: value pairs that matched a user's configuration settings. An exemplary extended identity may be represented as the following exemplary tuple: {operation, service, kind, isError, httpMethod, isServiceMesh, key ValueMap . . . }, where the key ValueMap field represents one or more additional tags or dimensions configured by the user to be extracted as part of the span's identity, e.g., customer name, member ID, etc.

By extracting information related to additional tags, higher cardinality metrics may be computed using the metric time series modality. Further, a user is able to configure alerts on the custom dimensions as well, wherein the alerts inform a user if a particular dimension has crossed some critical threshold. In alternate embodiments of the present invention, the tuple used to represent a span's base or extended identity may contain fewer elements.

If the tuple of information of an incoming span happens to be the same as another span, both spans relate to the same identity. In an embodiment, spans with the same base identity may be grouped together. A fixed size bin histogram is generated for each span identity to track metrics associated with the span identity. In this way the same type of spans are organized together and the user can track one or more metrics associated with each group of spans sharing a common identity. In an embodiment, a fixed size bin histogram is generated for each unique span identity. The fixed size bin histogram may be a data structure, for example, that is preserved in memory.

As noted above, each span identity may be tracked with a respective histogram. The histograms associated with the corresponding span identities, in one embodiment, are generated and updated in fixed time duration windows. For example, histogram data may be generated for the incoming spans in memory every 10 seconds. At the end of each fixed duration, metrics associated with the histograms are emitted and the histogram is reset for the next time window. By emitting metrics for each time duration, data streams of metrics may be generated from the histogram data. The streams of metric data associated with each span identity, in one embodiment, may be aggregated by a monitoring platform to provide a user meaningful information regarding the application being monitored.

Figure 6:
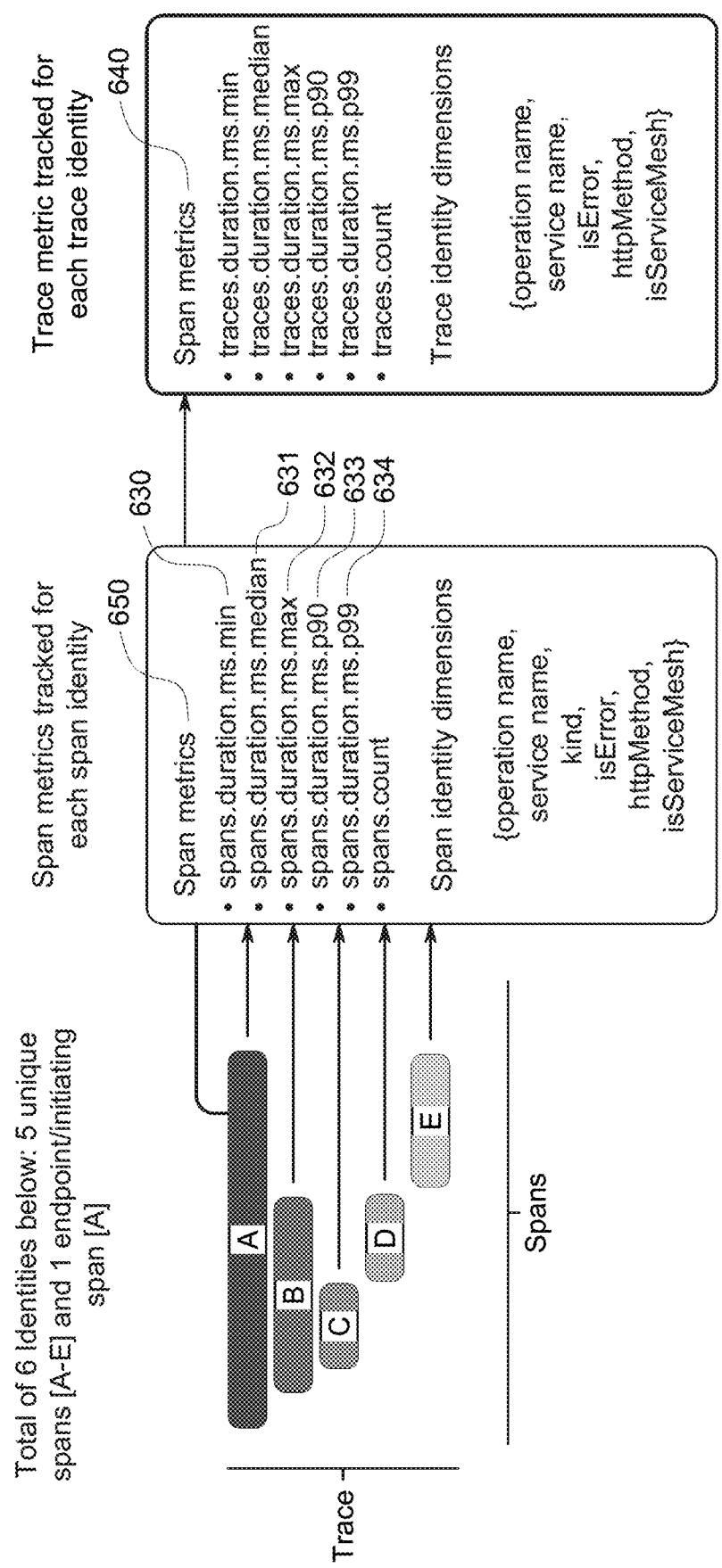
FIG. 6 illustrates the manner in which span metrics and trace metrics are generated, in accordance with embodiments of the present invention.

FIG. 6 illustrates the manner in which span metrics and trace metrics are automatically generated, in accordance with embodiments of the present invention. FIG. 6 illustrates 5 unique spans (A-E) including a root span (an initiating span) A. In an embodiment, each group of spans identified by the same span identity is associated with one or more span metrics 650. For example, a minimum span duration 630, a median span duration 631, a maximum span duration 632, a p90 latency value 633, a p99 latency value 634 and a span count (how many times a particular identity was counted) may be tracked for each span identity. A histogram corresponding to the span identity may track these metrics over fixed sized durations, e.g., 10 seconds. For example, over a 10 second window, the histogram may comprise fixed size bins that track a minimum span duration, a median span duration, a maximum span duration, a p90 value, a p99 value and a count of all spans received corresponding to a given identity. At the end of each duration, the metrics are emitted and the histogram is reset. The emitted metrics are used to generate streams of metrics data corresponding to each span identity. Each data point on a metric data stream comprises the span identity dimensions or the extended identity dimensions if the user has configured additional metadata to be extracted from the spans.

As shown in FIG. 6, in an embodiment, the initiating span A comprises a trace identity that is used to emit trace metrics 640. The initiating span A helps define an identity for a trace which allows the monitoring platform to logically group together all traces that represent the same flow through an endpoint of the application. The duration of the identity for a trace is calculated as the end time of the latest span in the trace minus the start time of its initiating span. An exemplary trace identity may be represented as the following exemplary tuple: {operation, service, isError, httpMethod, isServiceMesh}, where the operation field represents the name of the specific operation within a service that made the call, the service field represents the logical name of the service on which the operation took place, the isError field is a "TRUE/FALSE" flag that indicates whether the trace is associated with an error, the httpMethod field relates to the HTTP method of the request for the associated trace and the isServiceMesh field is a flag that indicates whether the trace is part of a service mesh. The trace metrics 640 are computed after the spans have been consolidated into a trace following a sessionization process. The trace metrics are also turned into streams of metric data similar to the metric time series associated with the spans.

Figure 7:
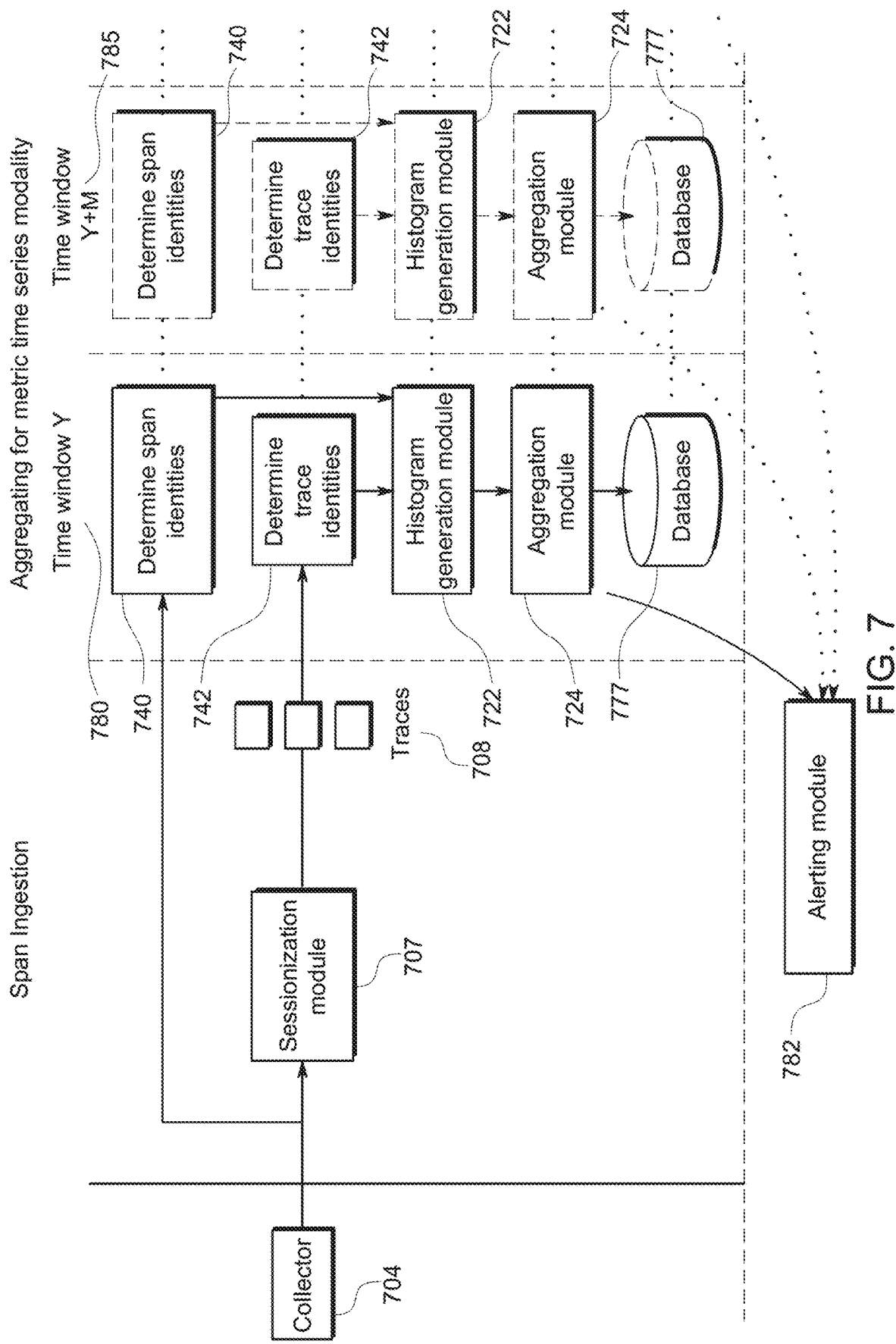
FIG. 7 is a flow diagram that illustrates an exemplary method of generating metric time series from ingested spans, in accordance with embodiments of the present invention.

FIG. 7 is a flow diagram that illustrates an exemplary computer implemented method of generating metric time series from ingested spans, in accordance with embodiments of the present invention. As mentioned previously, incoming spans are received at a monitoring service from a collector 704. Prior to being sessionized, span identities are generated for the spans and the spans with identical base identities are grouped together by module 740.

In one embodiment, a histogram generation module 722 generates a histogram respective to each span identity. The histogram may represent a distribution of durations for a set of spans. Information from each incoming span (e.g., span duration information) corresponding to a given span identity is added to the fixed size bins of the respective histogram for the identity. The histogram is maintained for a fixed sized time window Y 780 (e.g., 10 seconds) after which the histogram generation module 722 emits the aggregated metrics and resets all the counters in the histogram for the next segment. Subsequently, the histogram generation module 722 generates metrics for the next duration of time Y+M 785, and emits metrics corresponding to that time window. In this way, histogram generation module periodically emits one or more metrics (e.g., six span metrics as seen in FIG. 6), including user-configured custom metrics, corresponding to each type of span to the analytics engine.

In one embodiment, the span information is also combined into traces 708 using a sessionization module 707 as discussed in connection with FIG. 5. The sessionization process may consolidate traces (from spans) within a first minute window (associated with time window Y 1480). Thereafter, the sessionization process may consolidate traces within the subsequent window (associated with time window "Y+M" 1485). Trace identities are determined for the sessionized traces 708 using module 742 after which the trace metrics (as discussed in connection with FIG. 6) are determined using the histogram generation module 722 in a process similar to the manner in which span metrics are generated.

In an embodiment, an aggregation module 724 may aggregate the periodic metric data from the histogram generation module 722 and create metric time series from the data for each span identity. In some embodiments, the aggregation module 724 may generate quantized data streams from the metric data received from the histogram generation module 722. The quantized data stream has data values occurring periodically at fixed time intervals.

In one embodiment, the aggregation module 724 may identify a function for aggregating the metric for which values are provided by one or more input data streams. The aggregation module 724 generates the quantized data streams by determining an aggregate value for each input data stream for each fixed time interval by applying the identified function over data values of the input data stream received within the fixed time interval. The aggregation module 724 may further receive a request to evaluate an expression based on the data values from the input data streams. The system periodically evaluates the expression using the data values of the quantized data streams.

In one embodiment, the aggregation module 724 may, for example, perform aggregations on the various metric time series to provide real-time monitoring of certain higher priority endpoints in the application. For example, aggregations may be performed to determine request, error and latency metrics for certain designated services. In order to do that, the aggregation module 724 may, for example, aggregate values across all span identities that are associated with the designated service.

Further, in some embodiments, alerting module 782 may monitor one or more metric time series from the aggregation module 724 and may be configured to generate alerts if certain metrics being monitored exhibit anomalous behavior. For example, if a maximum span duration associated with a given span identity crosses over a certain threshold, an alert configured using the alerting module 782 may be triggered. The alert may, for example, be responsive to a metric time series associated with span metric 632 from FIG. 6, wherein the alert is triggered if the maximum span duration exceeds a given threshold.

In one embodiment, the histograms generated by the histogram generation module 722 may be stored in database 777. In an embodiment, the histogram data may be stored as parquet-formatted files.

In an embodiment, the instrumentation analysis system 322 compares durations of a set of similar spans (e.g., spans for the same span identity) with the tags associated with these spans and determines whether there are any patterns for a given tag. As discussed above, the analysis system 322 generates a histogram that may represent a distribution of durations for a set of spans. For a given tag, the analysis system calculates a p-value indicating the likelihood that the ranks of the spans for that tag in the distribution arose by chance. In particular, the analysis system may calculate a p-value of the Mann-Whitney U-statistic comparing the ranks of the durations of the traces having the tag to the other traces in the distribution. A larger U-statistic indicates that the spans for that tag skew rightward, i.e., that they tend to have long durations relative to other spans in the distribution. The analysis system can provide alerts regarding the tags whose spans have relatively long duration. Long duration spans may be indicative of configuration problems at the instrumented systems. The analysis system may correct the p-value for the number of hypotheses tested, for example by multiplying the p-value by the total number of tags. This procedure defines a map from tags to non-negative real numbers. The analysis system sorts the tags by the associated p-value (e.g., in ascending order) and returns those with p-value less than or equal to some threshold, e.g., 0.01.

4.1.2 Real-Time Monitoring Using Metric Time Series Data

Figure 8:
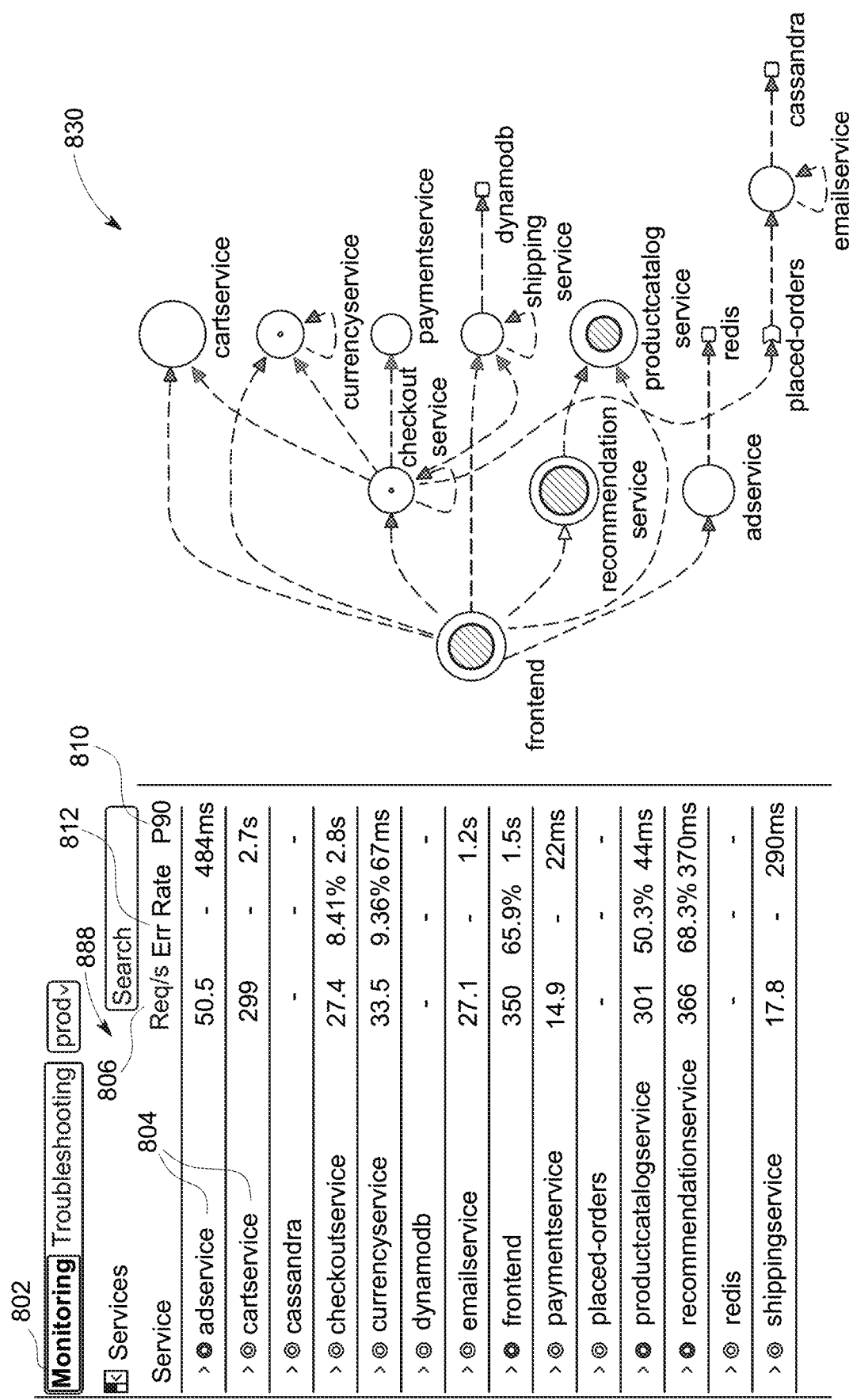
FIG. 8 illustrates an exemplary on-screen GUI illustrating a monitoring mode for an application displaying metric values aggregated from metric time series data, in accordance with embodiments of the present invention.

FIG. 8 illustrates an exemplary on-screen GUI illustrating a monitoring mode for an application displaying metric values aggregated from metric time series data, in accordance with embodiments of the present invention. In one embodiment, the GUI of FIG. 8 displays a monitoring mode indication when a corresponding monitoring mode option 802 is selected. The monitoring mode displays a panel 888 listing services 804 comprised within the application being monitored. Each service is displayed alongside metrics pertaining to requests/second 806, error rate 812 and P90 latency values 810. The metrics data displayed in the panel 888 is computed in real-time and is aggregated using the metric time series data. In an embodiment, an aggregation module similar to the aggregation module 724 discussed in connection with FIG. 7 performs the necessary aggregations from the various metric time series to display metrics associated with each of the services. The service level KPIs may be computed through the real-time aggregation pipeline discussed in connection with FIG. 7 before the histogram metadata is stored in the backend of the analytics engine.

The monitoring mode also comprises an application topology graph 830. The service graph 830 facilitates visualizing cross-service relationships between services comprised within the application and external to the application (as will be discussed further in connection with the metric events modality). In an embodiment, the service graph may be created using information gleaned from the metric time series data aggregated by the aggregation module 724 discussed in connection with FIG. 7.

By ingesting up to 100% of the incoming spans from the client software and implementing monitoring service 306 as a Software as a Service (SaaS) based service offering, embodiments of the present invention advantageously retain valuable information pertaining to the spans that is further analyzed in the SaaS backend. Span identities and histogram information (e.g., various counts and metrics data) associated with the incoming spans that are stored may be used to conduct further analysis. For example, metadata may be analyzed to identify certain offending services or operations, and data regarding those services or operations may be surfaced for further analysis.

Conventional monitoring systems typically expunged the span data after extracting the relevant metrics from them. By comparison, embodiments of the present invention retain high-fidelity information related to all the incoming spans for deeper analysis. The metadata retained provides a user the ability to filter based on certain dimensions and services that would not have been possible using conventional monitoring systems. Further, the metadata retained may be used in conjunction with data sets for other modalities such as metric events and full-fidelity to allow a user to provide a thorough investigation of an alert.

In one embodiment, using, for example, the "service," "operation," and "kind" fields in the tuple, the aggregation module 724 (from FIG. 7) may be able to determine span identities associated with cross-service calls. Spans associated with inter-service calls are of interest to a user because they provide user information regarding the manner in which two services within an application are interacting. Embodiments of the present invention are able to advantageously use the metadata saved for the metric time series to perform post-processing and determine services associated with inter-services calls. For example, the value of the "kind" field related to a span identity may be either "client" or "server" where the analytics engine may be able to use that information in post-processing to determine if the span is related to a cross-service call.

If it is determined that a particular span is related to a cross-service call, those spans could be processed through the analytics engine to discover further information regarding the dependencies. For example, in one embodiment, if a user identifies a span identity associated with a cross-service call or a span identity associated with a high value operation, the user may create an extended identity for the corresponding span identities and supplement those identities with additional custom dimensions to be monitored. For example, the user may want to monitor a customer name association with such spans. The user may simply reconfigure the analytics engine to extract the additional customer name dimension as part of the spans' extended identity.

Retaining span information associated with incoming spans provides a user additional metadata to perform intelligent processing. In an embodiment, the user may only collect data pertaining to select operations. In other words, the user may filter out data pertaining to select operations that are of less interest to a user.

The number of unique span identities may typically roughly correlate with the number of unique operation names present on the span. In an embodiment, the user is able to turn off or filter out span identities associated with certain operations if they are not particularly useful. In other words, the monitoring platform can be configured to turn off metric generation related to selected span identities. This advantageously reduces loads on the metrics analytics engine because it does not need to track and store metric time series for spans that are of little interest to a user. For example, spans associated with calls that a service makes to operations internal to the service do not convey information and can be filtered. Accordingly, additional resources can be directed towards processing spans associated with services and operations that are of greater interest to a user. Conventional monitoring systems by comparison would not have the flexibility to selectively focus on spans associated with high value services or operations by filtering out the less valuable spans.

Figure 9:
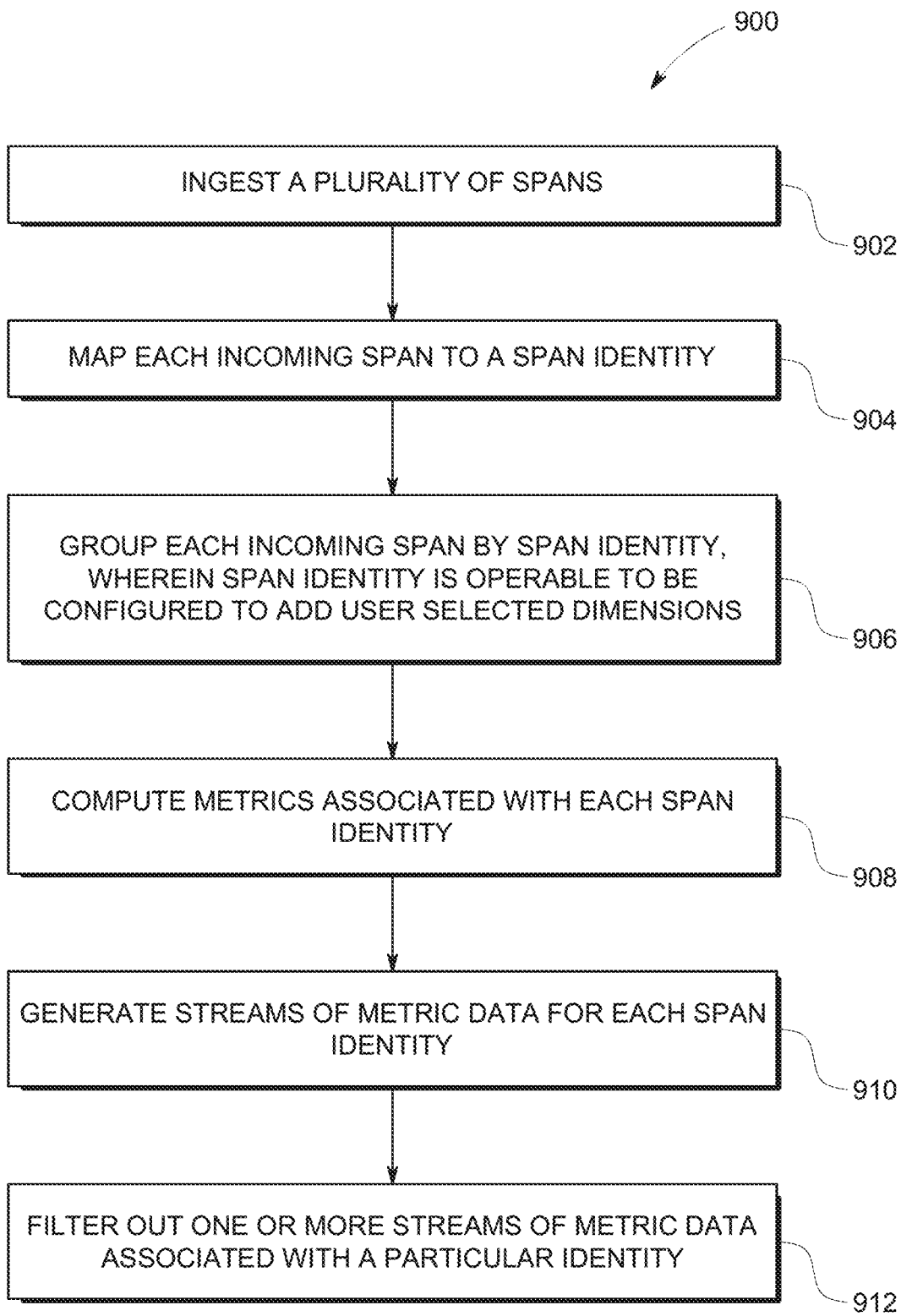
FIG. 9 presents a flowchart illustrating a computerized process to create a trace error signature starting with a root cause error span, in accordance with embodiments of the present invention.

FIG. 9 presents a flowchart illustrating a computerized process to create a trace error signature starting with a root cause error span, in accordance with embodiments of the present invention. Blocks 902-912 describe exemplary steps comprising the process 900 depicted in FIG. 9, in accordance with the various embodiments herein described. In one embodiment, the process 900 is implemented at least in part as computer-executable instructions stored in a computer-readable medium and executed in one or more processing devices.

At block 902, a plurality of spans are ingested into a cloud-based monitoring platform. At block 904, each incoming span is associated with a unique span identity. At block 906, spans are grouped by span identity, where a span identity can be extended to include additional custom configured dimensions.

At block 908, a histogram associated with each span identity is generated to compute metrics (e.g., six metrics discussed in connection with FIG. 6) for each span identity. At block 910, streams of metric data (metric time series) can be generated for each span identity.

At block 912, metric data pertaining to certain operations of no interest to a user may be filtered out. This way metrics data pertaining to only high value operations may be aggregated.

4.2 Metric Event Modality

The metric event modality generates and stores aggregated rows of metrics values for selected indexed tags from the incoming trace data for given time durations. The selected tags may, for example, be indexed from the incoming spans when the spans are ingested. Metrics data may, for example, comprise, but is not limited to, number of requests (e.g., between two services), number of errors and latency. The aggregated rows of metrics data are stored efficiently for fast aggregation. The metric events data may be rapidly vectorized and aggregated in response to queries from a user.

Figure 10:
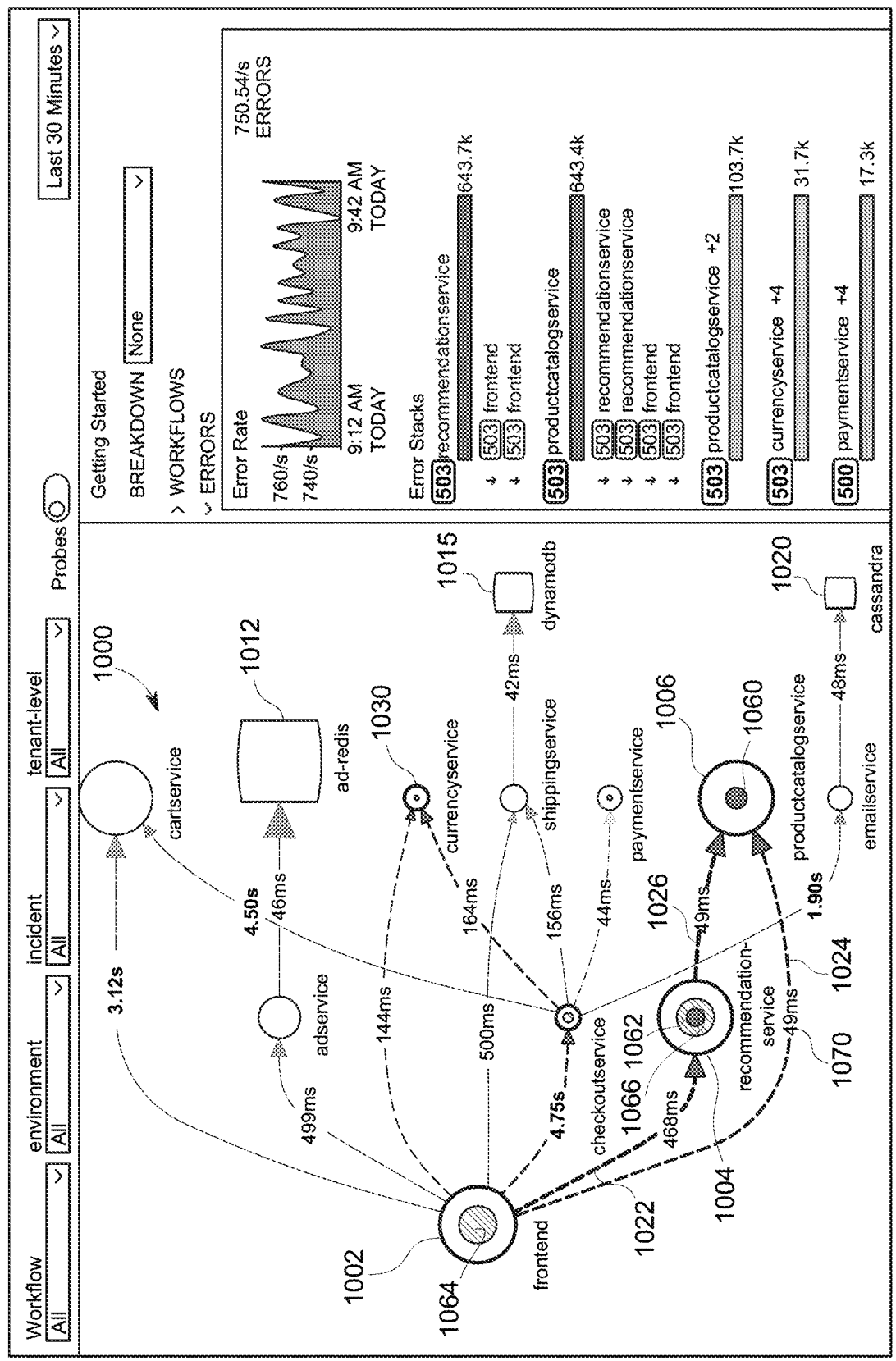
FIG. 10 illustrates an exemplary on-screen GUI comprising an interactive topology graph for an application created from the aggregated metric events data, in accordance with embodiments of the present invention.

Embodiments of the present invention use the aggregated rows of metrics data created in association with the metric events modality to generate a full-context application topology graph using the metric events data (e.g., by module 522 in FIG. 5). FIG. 10 illustrates an exemplary on-screen GUI comprising an interactive topology graph for an application created from the aggregated metric events data, in accordance with embodiments of the present invention. The service graph facilitates visualizing cross-service relationships between services comprised within the application and external to the application. The exemplary GUI of FIG. 10 also enables customers to track the causal chain of operations resulting in an error.

It should be noted that the service graph may also be generated using the metric time series data as noted earlier, however, storage for the metric events data set may be significantly less because it does not need to store as much metadata as metric time series data. Accordingly, generating the service graph using metric events data is more efficient from a storage standpoint.

FIG. 10 illustrates an on-screen GUI comprising an interactive full-context service graph 1000, which is constructed for an exemplary microservices-based application using the metrics data generated in connection with the metric events modality. Each circular node (e.g., nodes associated with services 1002, 1004 and 1006 of FIG. 10) represents a single microservice. Alternatively, in an embodiment, a circular node may also represent a group of multiple microservices, where the GUI for the monitoring platform (associated with, for example, the monitoring service 306) provides a client the ability to expand the node into its sub-components.

In an embodiment, services that are part of the client's application may be represented differently from services that are external to the client's application. For example, circular nodes (e.g., nodes associated with services 1002, 1004 and 1006) of the exemplary application represented by service graph 1000 are associated with services comprised within the client's application. By contrast, squarish nodes (e.g., nodes associated with databases dynamodb 1015, Cassandra 1020, ad-redis 1012) are associated with services or databases that are external to the client's application.

A user may submit a request at the front-end service 1002; the user's request at the front-end service 1002 may set off a chain of subsequent calls. For example, a request entered by the user at the front end of the platform may generate a call from the front-end service 1002 to the recommendation service 1004, which in turn may generate a further call to the product catalog service 1006. As noted previously, a chain of calls to service a request may also comprise calls that a service makes to internal sub-functions or operations within the same service.

Each edge in the service graph 1000 (e.g., the edges 1022, 1024 and 1026) represents a cross-service dependency (or a cross-service call). The front-end service 1002 depends on the recommendation service 1004 because it calls the recommendation service 1004. Similarly, the recommendation service 1004 depends on the product catalog service 1006 because it makes a call to the product catalog service 1006. The directionality of the edge represents a dependency of a calling node on the node that is being called. Each of the calls passes the Trace ID for the request to the respective service being called. Further, each service called in the course of serving the request could potentially generate several spans (associated with calls to itself or other services). Each of the spans generated will then carry the Trace ID associated with the request, thereby, propagating the context for the trace. Spans with the same Trace ID are, thereafter, grouped together to compose a trace.

In some embodiments, the GUI comprising service graph 1000 may be configured so that the nodes themselves provide a visual indication regarding the number of errors that originated at a particular node versus errors that propagated through the particular node but originated elsewhere. In an embodiment, the high-cardinality metrics data aggregated in association with the metric events modality may be used to compute the number of errors that are used to render the nodes of the service graph.

For example, as shown in the service graph of FIG. 10, the front-end service 1002 makes calls to the recommendation service 1004. Errors may be generated at the recommendation service 1004 not only in response to calls from the front-end service 1002, but also in response to calls that the recommendation service 1004 makes to itself (e.g., in response to sub-functions or operations that are part of recommendation service). For such errors, the recommendation service 1004 would be considered the "originator" for the error. The recommendation service 1004 also makes calls to the product catalog service 1006 and these calls may result in their own set of errors for which the product catalog service 1006 would be considered the error originator. The errors originating at the product catalog service 1006 may propagate upstream to the front-end service 1002 through the recommendation service 1004; these errors would be observed at the recommendation service 1004 even though the recommendation service 1004 is not the originator of those errors.

It is appreciated that conventional monitoring technologies would not provide adequate means for a client to distinguish between errors that originated at the recommendation service 1004 versus errors that propagated through the recommendation service 1004 but originated elsewhere. By performing computations using the metrics data associated with the metric events modality, embodiments of the present invention are able to render a service graph that visually indicates critical information regarding the services in an architecture, e.g., number of requests between services, the number of errors generated by a service, number of errors for which the service was the root cause, etc. The service graph 1000 allows clients the ability to visually distinguish between errors that originated at the recommendation service 1004 as compared with errors that simply propagated through the recommendation service 1004. As shown in FIG. 10, the node associated the recommendation service 1004 comprises a solid-filled circular region 1066 and a partially-filled region 1062, where the region 1066 represents errors that originated at the recommendation service 1004 while the region 1062 represents errors that propagated through the recommendation service 1004 but originated elsewhere (e.g., at the product catalog service 1006).

Similarly, solid-filled region 1060 within the node associated with the product catalog service 1006 represents the errors that originated at the product catalog service. Note that the errors returned by the product catalog service 1006 originated at the product catalog service. In other words, the product catalog service 1006 does not have errors from another downstream service propagating through it because it does not make calls to another service that is further downstream in the execution pipeline. Conversely, the front-end service 1002 comprises a partially-filled region 1064 because the errors observed at the front-end service 1002 propagated to it from other downstream services (e.g., the recommendation service 1004, the currency service 1030, the product catalog service 1006, etc.) The front-end service 1002 was not the originator of errors in the example shown in FIG. 10. Note that in other embodiments solid-filled regions (e.g., region 1066) and partially-filled regions (e.g., region 1064) may be represented differently. For example, different shades, patterns, or colors may be used to distinguish these regions from each other.

Embodiments of the present invention use the aggregated rows of metrics data created for the metric events modality to determine full-fidelity SLIs associated with the services in an application (e.g., by the module 522 in FIG. 5). An SLI is a service level indicator—a defined quantitative measure of some aspect of the level of service that is provided. The SLIs are aggregated and extracted for the various services in a microservices architecture so that the behavior of applications may be understood. Most clients consider request latency—how long it takes to return a response to a request—as a key SLI. Other common SLIs include the error rate (often expressed as a fraction of all requests received) and system throughput, typically measured in requests per second. The measurements are often aggregated over a measurement window using the metrics data associated with the metric events modality and then turned into a rate, average, or percentile.

In one embodiment, the GUI comprising service graph 1000 is interactive, thereby, allowing a developer to access the SLIs associated with the various nodes and edges within the application by interacting with respective portions of the service graph. Referring to FIG. 10, in an embodiment, a client may be able to hover their cursor over various regions of the on-screen displayed service graph 1000, including but not limited to the nodes (e.g., the nodes associated with services 1004, 1006 etc.) and edges (e.g., the edges 1022, 1026, etc.), to receive SLI-related information for the associated microservices through a pop-up window or other interface.

Figure 11:
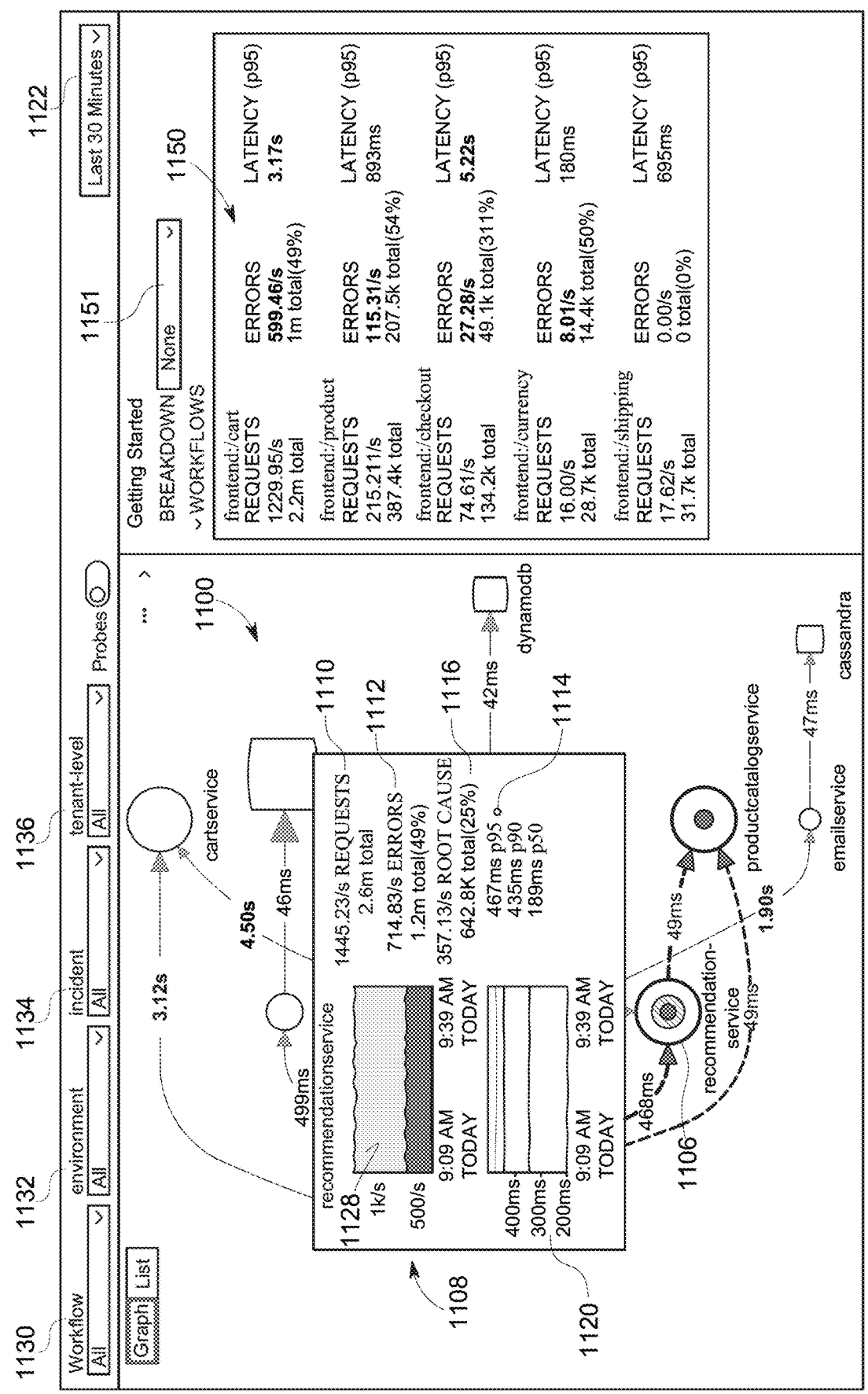
FIG. 11 illustrates an exemplary on-screen displayed GUI showing the manner in which a client may access SLIs pertaining to a service within an interactive topology graph, in accordance with embodiments of the present invention.

FIG. 11 illustrates an exemplary on-screen displayed GUI showing the manner in which a client may access SLIs pertaining to a service within an interactive topology graph, in accordance with embodiments of the present invention. As shown in FIG. 11, when a client hovers the cursor over the node associated with, for example, the recommendation service 1106, a pop-up window 1108 is overlaid on the service graph 1100 comprising SLIs pertaining to the recommendation service 1106. Specifically, SLIs pertaining to Requests 1110, Errors 1112 and Latency percentiles 1114 are provided. Furthermore, in an embodiment, information pertaining to Root Cause 1116 is also provided to the client.

For example, the SLIs related to Requests 1110 comprise information regarding the rate of requests and number of requests serviced by the recommendation service 1106 during a specific time duration. The time duration over which the SLIs are calculated may be adjusted using drop-down menu 1122. The time duration over which SLIs are calculated may vary, for example, from 1 minute to 3 days. As indicated by the time axis on hover chart 1128, for this example, a time window of 30 minutes (from 9:09 to 9:39 a.m.) is selected.

In an embodiment, the pop-up window 1108 also provides the client information pertaining to SLIs related to Errors 1112. In the example of FIG. 11, the pop-up window 1108 provides information regarding the error rate and the total number of errors that occurred during the specified time duration. The client is also provided information regarding what percentage of the total number of requests resulted in errors.

In an embodiment, the pop-up window 1108 also provides the client information pertaining to Latency Percentiles 1114 and a graphical representation 1120 of the same. For example, SLI p95 indicates that for 95% of the users, the latency for servicing the requests was less than 467 ms. Latency-related SLIs also include information regarding p90 and p50 percentiles. The graphical representation 1120, in the example of FIG. 11, shows the latency information regarding the p95 percentile graphically.

In one embodiment of the present invention, the pop-up window 1108 also displays information pertaining to errors for which the selected service was the root-cause. The Root Cause information 1116 includes the number of errors for which the selected service (e.g., the recommendation service 1106 in the example of FIG. 11) was the originator, the associated error rate and the percentage of the total number of requests that represents. In this way, embodiments of the present invention, in addition to providing clients visual cues for identifying root cause error originators, are also able to provide meaningful and accurate quantitative information to help clients distinguish between root cause-related errors and errors associated with downstream causes.

Note that the SLIs displayed in the pop-up window 1108 are computed accurately using the metrics data gathered for the metric events modality. Because embodiments of the present invention are able to ingest up to 100% the incoming span data (without sampling), the SLIs are computed factoring in all the incoming data, which results in accurate measurements. For the example of FIG. 11, there were a total of 2.6 million requests served by the recommendation service 1106 at a rate of 1445.23 requests/second ("sec"). Of these, 1.2 million of the requests resulted in errors at a rate of 714.83/sec, which represents approximately 49% of the total number of requests. In this way, embodiments of the present invention provide a modality of analysis that enables a client to gather critical SLIs pertaining to the recommendation service 1106 including an indication of how many of the errors originated at the recommendation service 1106.

Figure 12:
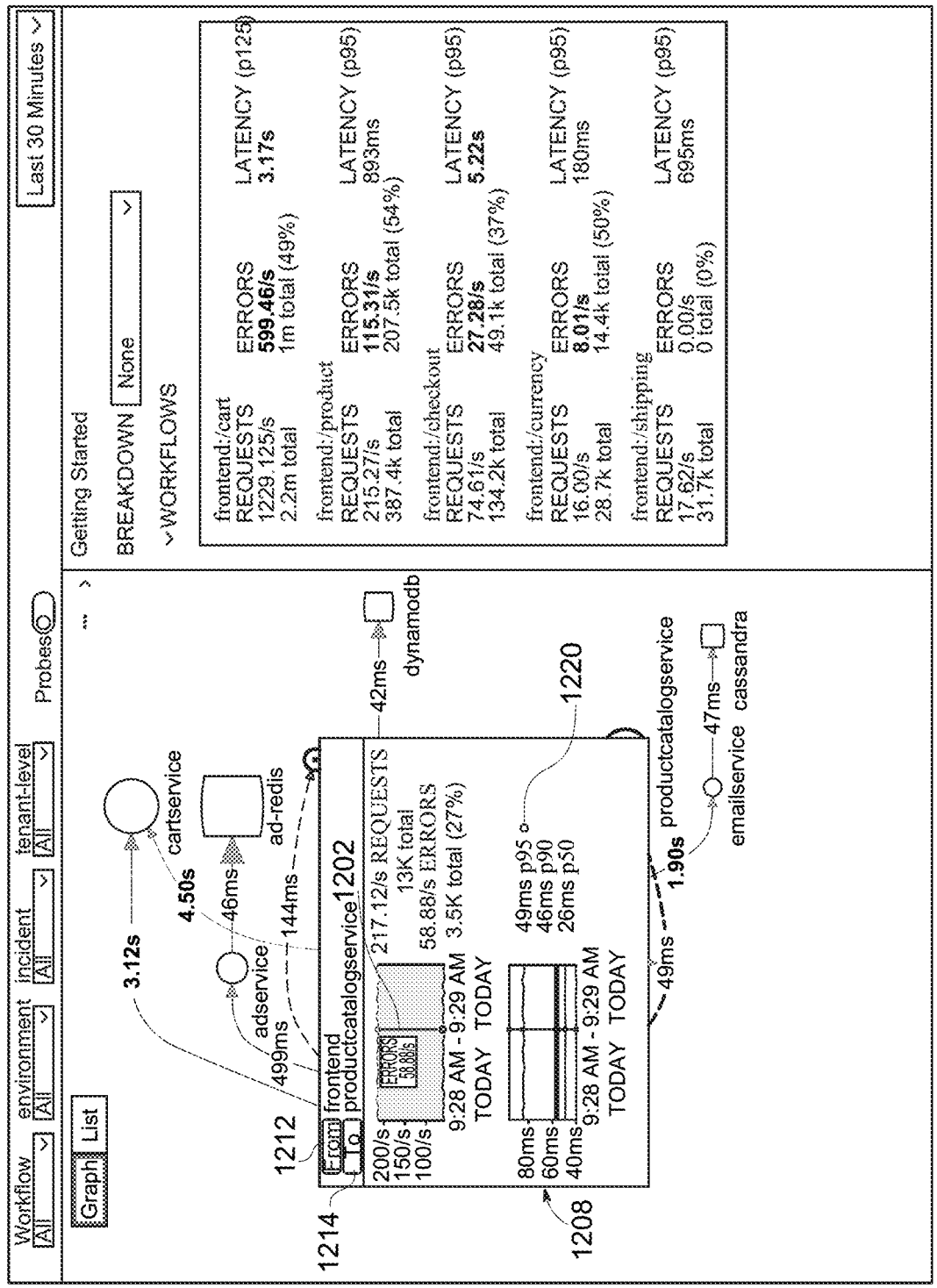
FIG. 12 illustrates an exemplary on-screen GUI showing the manner in which a client may access SLIs pertaining to an edge within an interactive topology graph, in accordance with embodiments of the present invention.

FIG. 12 illustrates an exemplary on-screen GUI showing the manner in which a client may access SLIs pertaining to an edge within an interactive topology graph, in accordance with embodiments of the present invention. The SLIs pertaining to edges are also computed using the metrics data associated with the metric events modality. As shown in FIG. 12, if a user hovers over or selects a particular edge, e.g., the edge 1024 (as shown in FIG. 10) (which represents the cross-service dependency of the front-end service 1002 on the product catalog service 1006) a pop-up dialog box 1208 opens up on-screen that reports SLIs specific to the dependency. The "From" field 1212 represents the service that executes the call and the "To" field 1214 represents the service that is called (the service that the calling service depends on). As shown in the dialog box 1208, SLIs pertaining to the number of requests (or calls) that were made, the number of those that returned in errors, and the latency associated with servicing the requests are provided. It should be noted that a latency value 1220 of 49 ms shown in FIG. 12 for this particular dependency may be annotated directly on the edge of the service graph. For example, as shown in service graph 1000 of FIG. 10, edge 1024 of the service graph 1000 in FIG. 10 indicates the latency value 1070 (e.g., 49 ms) directly on the edge in the service graph allowing a client to efficiently gather information regarding latency associated with the dependency.

In an embodiment, as shown in FIG. 10, the edges within the application topology graph are annotated with their corresponding latency values. In this way, embodiments of the present invention efficiently compute SLI data from the metrics information aggregated for this modality and advantageously enable developers to gather meaningful and accurate information regarding cross-service dependencies directly from the service graph 1000.

In one embodiment, the metrics data associated with the metric events modality are used to compute accurate SLIs across multiple dimensions. Further, embodiments of the present invention support high dimensionality and high cardinality tags for the metric events modality. In one embodiment, the GUI of FIG. 11 may display one or more attribute (or tag) categories that comprise dimensions that may be varied across the service graph 1100. For example, attribute categories (e.g., Workflow 1130, environment 1132, incident 1134 and tenant-level 1136) may be depicted within the GUI, each of which may correspond to attributes that may be varied to compute SLIs and error-related information for different combinations of the attributes. The categories of dimensions across which the SLIs may be computed, include, but are not limited to, workflow 1130, environment 1132, incident 1134 and tenant-level 1136. Each of the categories comprises a drop-down menu with options for the different dimensions. The metrics events data allows users to easily and rapidly compute measurements across various cross-combinations of tags or attributes.

In an embodiment, the GUI may include a panel 1150 that may display SLIs across the various workflows. Further, the GUI allows users the ability to break down the workflows across multiple different attributes using drop down menu 1151. The computations for each of the break-downs may be efficiently determined using the metrics data aggregated for the metri events mode.

Figure 13:
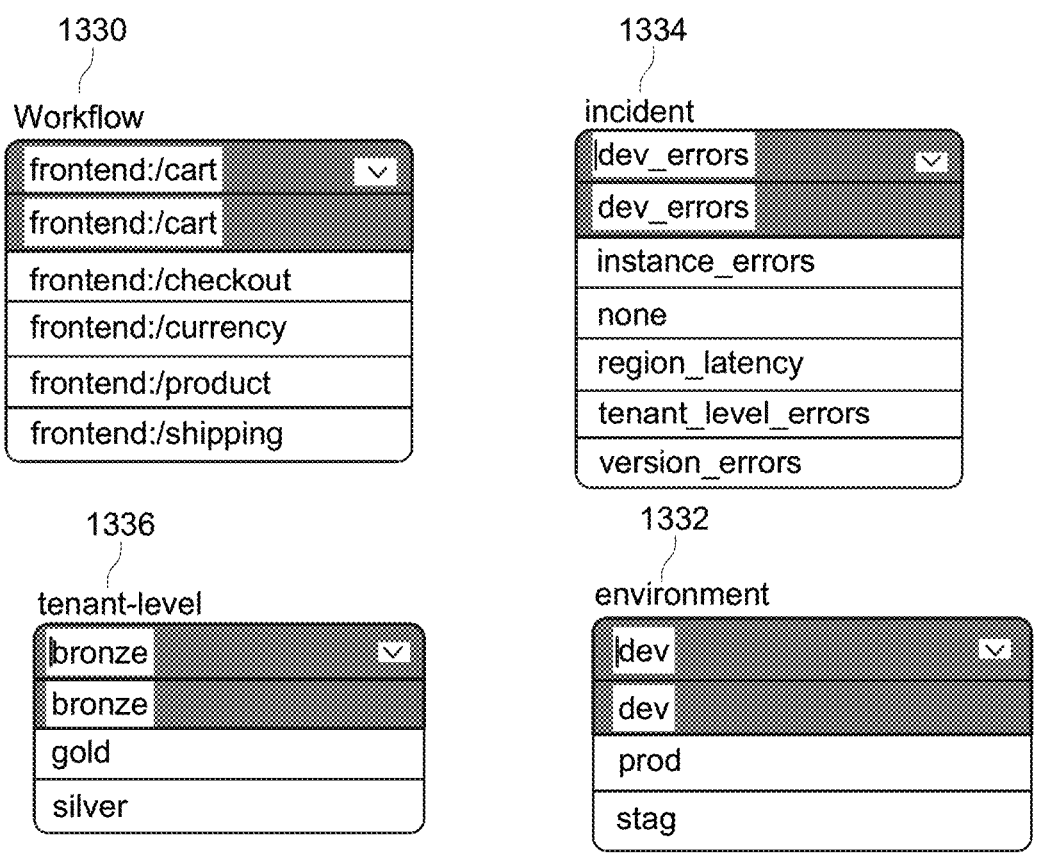
FIG. 13 illustrates on-screen displays that represent exemplary categories of dimensions across which SLIs may be computed, in accordance with embodiments of the present invention.

FIG. 13 illustrates on-screen displays that represent exemplary categories of dimensions across which SLIs may be computed, in accordance with embodiments of the present invention. The exemplary category of dimensions corresponds to the categories associated with drop-down menus (e.g., 1130, 1132, 1134 and 1136) discussed in connection with FIG. 11. The metrics data aggregated using the metric event modality allows users to easily and rapidly compute measurements across various cross-combinations of attributes. Drop-down on-screen menu 1330, corresponding to workflow, illustrates different workflows specific to the application discussed in connection with FIG. 10. A "workflow" is a type of category of dimension of the request that was processed; a workflow may be conceptualized as a type of "global tag" that is attributed to each span in a given trace. A workflow may, for example, be associated with a type of business action, e.g., "checkout," that is generated on the back-end in response to a request.

Similarly, drop down on-screen menus 1334, 1336 and 1332, relating to incident, tenant-level and environment respectively, provide further categories of dimensions across which SLIs may be computed. Each of the drop down on-screen menus 1330, 1332, 1334 and 1336 comprises various dimensions (associated with the respective categories) across which aggregations may be made. For example, the user may submit a query asking for the number of requests in a trace where "Workflow=frontend:/cart" and "incident=instance_errors" and "tenant-level=gold." By aggregating metrics data associated with the indexed tags, the metric events modality is able to respond to the user's query rapidly and efficiently.

Note that SLIs may be computed for each attribute of the categories in FIG. 13 and also for each combination of attributes associated with the categories. In an embodiment, for each combination of attributes selected using one or more of the drop-down menus, the client may be able to determine the computed SLIs (e.g., by hovering a cursor over the various nodes and edges of the graph after the dimensions have been selected using, for example, the drop-down menus shown in FIG. 11). In this way, embodiments of the present invention enable a client to use the metric events modality to slice the application topology graph across several different attributes.

It should be noted that clients might have different attributes or dimensions that may be of interest for their respective application. In an embodiment, the monitoring platform may be configured to provide insight into client-specific dimensions. Consequently, the specific attributes or dimensions available in each of the drop-down menus may vary by client.

4.2.1 Metric Events Data Generation and Persistence

Figure 14:
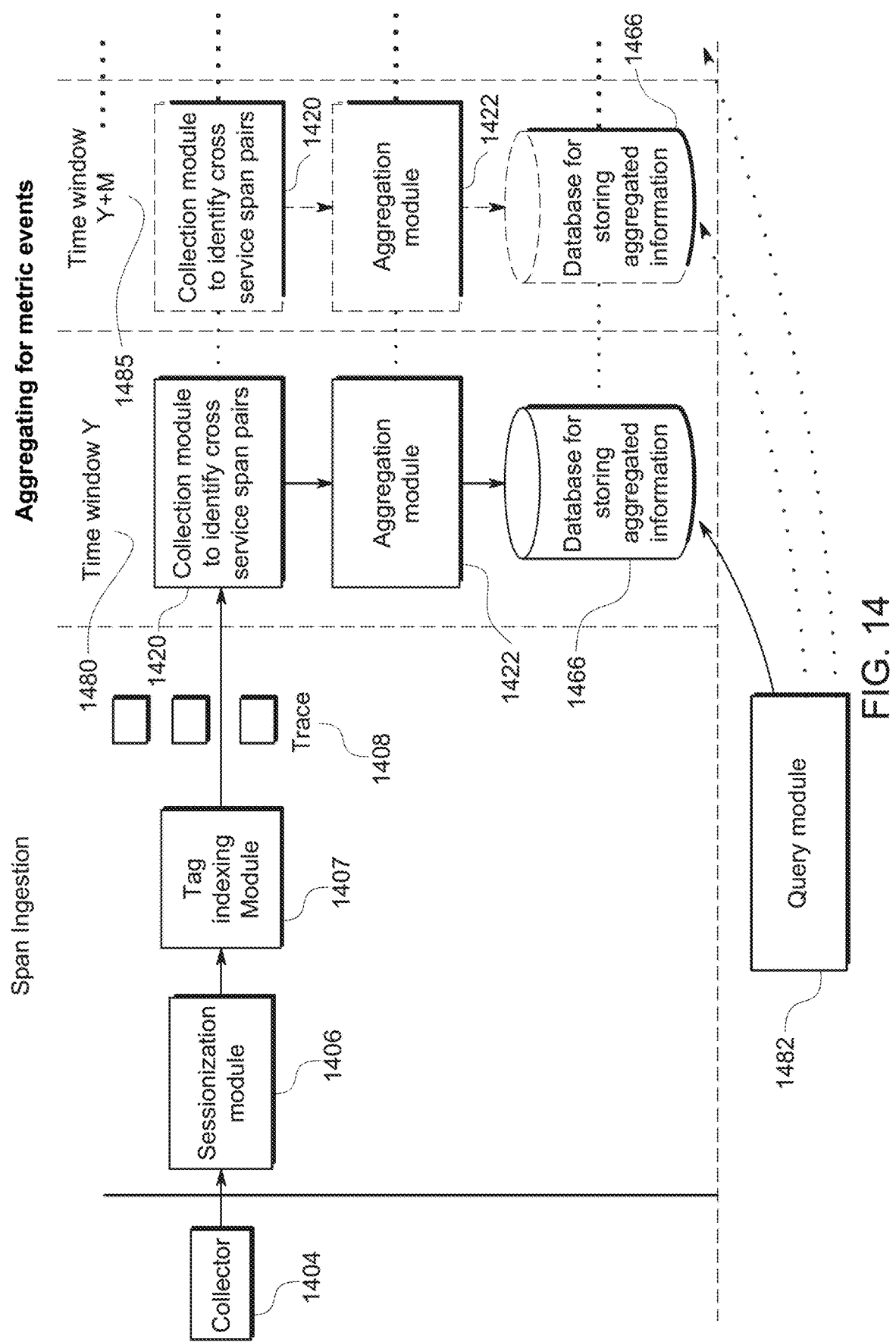
FIG. 14 is a flow diagram that illustrates an exemplary method of aggregating metrics data from ingested traces for the metric events modality, in accordance with embodiments of the present invention.

FIG. 14 is a flow diagram that illustrates an exemplary method of aggregating metrics data from ingested traces for the metric events modality, in accordance with embodiments of the present invention. As mentioned previously, span information is received at a monitoring service from a collector 1404. The span information is then combined into traces 1408 in real time using module 1406 in a process called sessionization as discussed in connection with FIG. 5. The sessionization process may consolidate traces (from spans) within a first time window (associated with time window Y 1480) before transmitting the traces to the collection module 1420. Thereafter, the sessionization process may consolidate traces within the subsequent window (associated with time window "Y+M" 1485).

Subsequent to consolidation, the trace data is indexed by tag indexing module 1407, which indexes one or more tags in the trace data. The tags may be client-selected tags or tags that the monitoring platform is configured to index by default. In one embodiment, the metric events modality indexes a subset of tags associated with the spans of a trace, but indexes that set of tags with perfect accuracy because the metrics calculated take into account all the ingested spans.

In one or more embodiments, collection module 1420 receives one or more traces 1408 generated within a predetermined time window Y 1480, and traverses the traces to identify and collect cross-service span pairs that represent cross-service calls. To collect the cross-service span pairs, the collection module 1420 identifies parent-child span pairs in a given trace where the service name for the parent and the child are different. Stated differently, the collection module 1420 will collect each pair of spans that has a parent-child relationship and where each of the two spans in the pair are associated with a different service. The service name of a span may be identified in a span-level tag included with each span. Alternatively, there may be other conventions for identifying a service name associated with a span, e.g., a special field within the span for the service name.

Identifying and collecting the cross-service span pairs from the incoming spans are advantageous because they enable the monitoring platform to track information that will be most relevant to a user, e.g., to render the service graph and display the SLIs associated with the various dependencies between services. Spans associated with calls to internal operations that a service might make may not be of interest to an application owner and may, therefore, be ignored by the collection module 1420 when determining the cross-service span pairs.

It should be noted that, in one embodiment, once the cross-service span pair is identified, indexed tags may be extracted for the cross-service span pair by determining a service tier for the respective parent and child spans of the span pair. A service tier is a subset of spans in a trace that logically identifies a single request to a service. Accordingly, both a parent span and a child span in the cross-service span pair are associated with a respective subset of related spans known as a service tier. Indexed tags are extracted by the collection module 1420 from service tiers associated with a cross-service span pair. In a different embodiment, however, the tags may be extracted directly from the parent span and child span in a cross-service span pair rather than the respective service tier associated with the parent span or child span.

In one or more embodiments, once the cross-service span pairs are collected and the indexed tags extracted from the respective service tiers, the collection module 1420 maps one or more selected tags for each service in the cross-service span pair to tag attributes, e.g., selected tags in a parent span (associated with the originating service) are mapped to a "FROM" tag attribute and selected tags in a child span (associated with the target service) are mapped to a "TO" tag attribute. This enables directionality information for the cross-service calls to be preserved. It will be appreciated that while the discussion herein focuses on "FROM" and "TO" tag attributes to indicate the direction of the dependency between services in a cross-service call, there may be several different ways to record dependency information between the two services.

In one embodiment, the aggregation module 1466 of the monitoring platform aggregates across the cross-service span pairs by maintaining a count for each unique set of "FROM" tag attributes (and their corresponding values) to "TO" tag attributes (and their corresponding values) for a cross-service pair. It should be appreciated that in this embodiment, counts are maintained at the tag level for the cross-service span pair (rather than at the service level). Accordingly, a separate count is maintained for each set of parent span tags (mapped to a "FROM" tag attribute) and child span tags (mapped to a "TO" tag attribute) for a cross-service pair. The count is increased each time the aggregation module encounters the same unique set of "FROM" tag attributes (associated with tags of a parent span) and "TO" tag attributes (associated with tags of a child span) for the same cross-service span pair in one or more traces. In a different embodiment, the count may be maintained at the service level. Accordingly, the count may be increased each time the same cross-service span pair is encountered within the trace information ingested from the client.

The aggregation module 1422 advantageously prevents duplication by storing a single instance of each unique set of "FROM" tag attributes and "TO" tag attributes for a given cross-service span pair with an associated count in the storage module 1466. The information in the storage module 1466 may be accessed by querying module 1482 where the querying module 1482 determines that the query is associated with the metric events modality. The querying module 1482 may, for example, be associated with the query engine and reporting system 324 discussed in FIG. 3.

The aggregated cross-service "FROM" and "TO" tag attribute sets and associated count values stored in the storage module 1466 may be used by the querying module 1482 to respond to queries in accordance with the metric events modality. Note that the collection and aggregation process is repeated for subsequent time windows (including window Y+M 1485) after time window Y 1480. In this way, the aggregation process is performed over time. This allows the metric events modality to deliver query results over varying time durations (as discussed, for example, in connection with the drop-down menu 1122 in FIG. 7).

FIG. 15 is a table illustrating an exemplary manner in which selected tags for each service in a cross-service span pair may be mapped to tag attributes and stored as part of a memory-resident data object associated with an edge in the service graph, in accordance with embodiments of the present invention. As noted above, in one or more embodiments, once the cross-service span pairs are collected, the monitoring platform maps selected tags associated with each service in the cross-service span pair to tag attributes, e.g., selected tags in a parent span are mapped to a "FROM" tag attribute and selected tags in a child span are mapped to a "TO" tag attribute. The mapping is performed to allow directionality information for the cross-service calls to be preserved. For example, a data object for an "edge" (corresponding to an edge or dependency in the topology graph) may be created that comprises both the FROM-type of tag attributes and the TO-type of tag attributes. In one embodiment, one or more edge data objects similar to the one shown in FIG. 15 is used to persist the data for the metric events modality (in addition to node data objects which will be discussed in connection with FIG. 16B).

The table of FIG. 15 illustrates an exemplary manner of storing a data object associated with an edge in the service graph. The table comprises two services, Service A and Service B, in an application. Both Service A and Service B comprise indexed tags "span.kind" and "region." Tag "span.kind" may have two possible values, "client" and "server." Similarly, tag "region" may have two possible values, "us-west" and "us-east."

If all possible combinations exist in Service A, there may be 4 unique tag combinations associated with the "FROM" tag attribute, e.g., {(span.kind=client, region=us-west) (span.kind=client, region=us-east) (span.kind=server, region=us-west) (span.kind-client, region=us-east). Similarly, if all possible combinations exist in Service B, there may also be 4 unique tag combinations associated with the "TO" tag attribute. Assuming there is a complete interaction between Service and Service B, there may be 16 (4×4) different edges between the two services based on the unique set of "FROM" and "TO" type tag attributes.

Note that the example in FIG. 15 illustrates information for two unique sets of "FROM" and "TO" tag attributes. Edge 1590 is associated with a TO-type attribute of "region=us-east" while edge 1592 is associated with a TO-type attribute of "region=us-west." Because the two sets of "FROM" and "TO" attributes are not identical, a separate count is maintained for each. The edge 1590 has an associated count of 2, while the edge 1592 has an associated count of 1. To determine the total number of requests or total count associated with the cross-service call from Service A to Service B, the number of counts for each set of "FROM" and TO" tag attributes for an associated cross-service call may be summed up. In the example of FIG. 15 then, a total of 3 requests is computed to occur between Service A and Service B.

In one embodiment, data sets for the metric events mode are stored as row of metrics extracted from the indexed tags in the service tiers, where each row is associated with either an edge or a node in the service graph. In an embodiment, the edges on the service graph (e.g., the edges 1022 and 1026 of FIG. 10) are rendered using both the "FROM" and "TO" tag attribute sets because rendering the edges requires information regarding directionality. The counts for the "FROM" and "TO" tag attribute sets for a given cross-service span pair are summed up to yield the number of requests made between the two services associated with the span pair. In other words, edges are rendered in the service graph by grouping "FROM" and "TO" tag attribute sets associated with a cross-service call and summing up the request counts associated with the cross-service call. In an embodiment, this grouping may be performed using "group by" statements in a query language, e.g., SQL. In one embodiment, the value of the number of requests between two services may be used to determine the thickness of the edge between the two services in the service graph.

In one embodiment, the nodes (e.g., nodes associated with services 1002, 1004, 1006) on the service graph are also rendered using the aggregated cross-service "FROM" and "TO" tag attribute sets. However, rendering the nodes does not require directionality information and, therefore, the nodes may be rendered by collecting and extracting information from the "TO" type tag attributes. Stated differently, the nodes are rendered by grouping the "TO" tag attributes associated with a given service and summing up the request counts associated with the service. In an embodiment, this grouping may be performed using "group by" statements in a query language, e.g., SQL. The "TO" tag attributes represent new services being called within the microservices architecture. Accordingly, the counts associated with "TO" tag attributes for a given service may be summed up to determine the total number of requests made to the service. In one embodiment, the value of the number of requests may also be used to determine the size of the node when rendering the service graph.

In an embodiment, the "TO" type tag attributes for rendering the nodes may be aggregated separately from the "FROM" and "TO" tag attribute sets for rendering the edges (as will be discussed in connection with FIG. 16B). In the exemplary table of FIG. 15, information for Service B may be determined, for example, by analyzing the "TO" type tag attributes in the table.

Figure 16A:
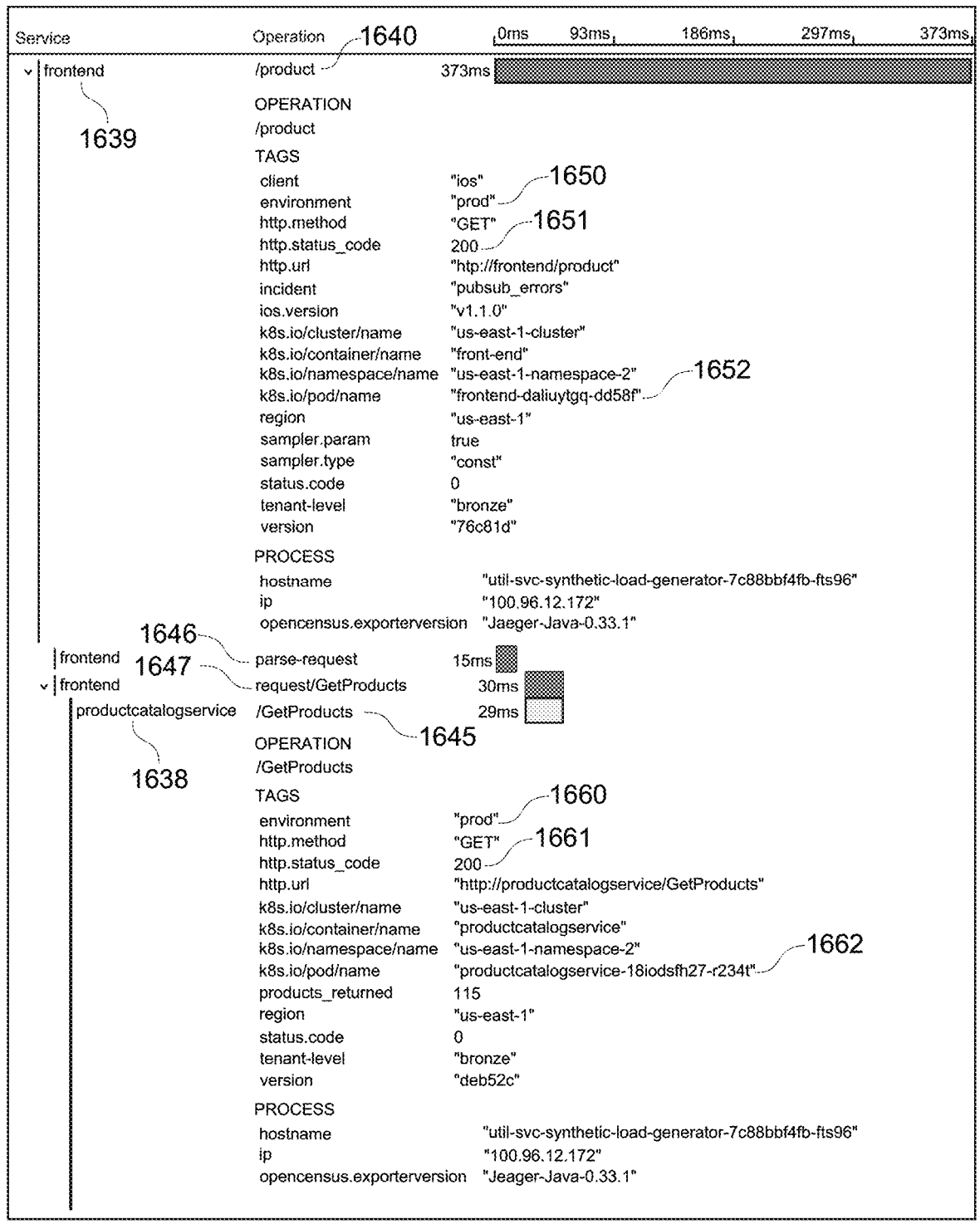
FIG. 16A illustrates an exemplary on-screen GUI showing a visual representation of a portion of an exemplary trace illustrating a cross-service call, in accordance with embodiments of the present invention.

FIG. 16A illustrates an exemplary on-screen GUI showing a visual representation of a portion of an exemplary trace illustrating a cross-service call, in accordance with embodiments of the present invention. As shown in FIG. 16A, front-end service 1639 makes a call to product catalog service 1638. Accordingly, the front-end service 1639 and the product catalog service 1638 comprise a cross-service span pair. Note that spans 1640, 1646 and 1647 may be part of the service tier for front-end service 1639. Accordingly, even though the call is made by the span 1647 ('frontend: request/GetProduct') to span 1645 ('productcatalogservice:/GetProducts), indexed tags associated with the front-end service 1639 may also be extracted from the spans that are part of the service tier for the front-end service 1639. In one embodiment, the first matching tag within a service tier is extracted. For example, indexed tag "environment=prod" 1650 may be extracted from the span 1640, even though it is repeated in the spans 1646 and 1647 because the span 1640 comprises the first matching instance of the tag 1650. Assuming tags "environment" (referred to herein as "env"), "http.status_code" (referred to herein as "code") and "k8s.io/pod/name" (referred to herein as "pod") are indexed, then tags 1650, 1651 and 1652 are extracted from the front-end service 1639 while tags 1660, 1661 and 1662 are extracted from the product catalog service 1638.

In an embodiment, the extracted indexed tags are mapped to tag attributes. The extracted tags 1650, 1651 and 1652 in the parent span (associated with the front-end service 1639) may be mapped to a "FROM" tag attribute while the extracted tags 1660, 1661 and 1662 in the child span may be mapped to a "TO" tag attribute. In one embodiment, the mapped tags may be used to create node and edge data objects that are used to persist data for the metric events modality as shown in FIG. 16B.

Figure 16B:
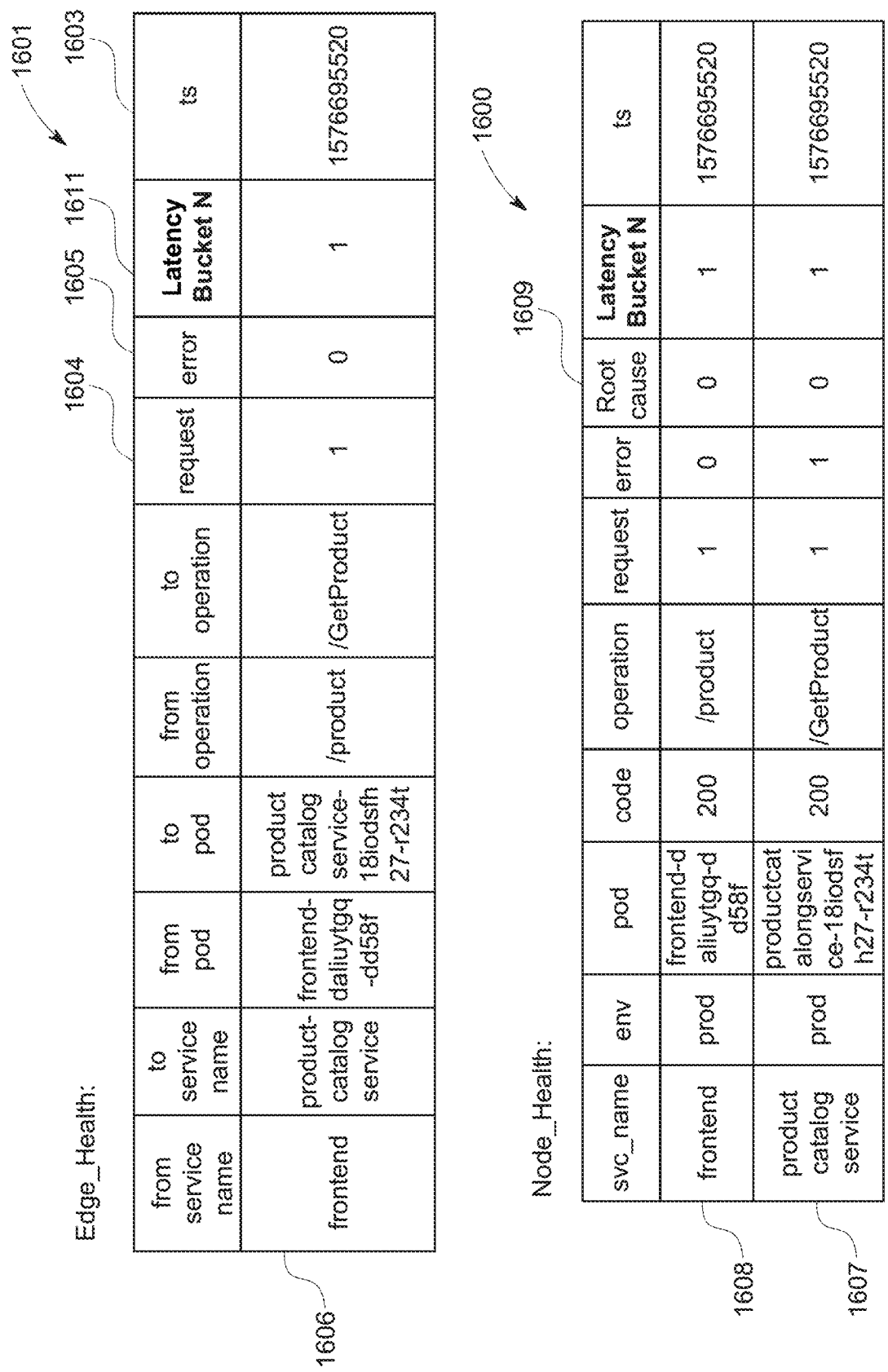
FIG. 16B illustrates the manner in which data in the metric events modality is persisted using an edge data object comprising a memory-resident table of tag attributes with associated counts and using a node data object comprising a memory-resident table of tags with associated counts, in accordance with an embodiment of the present invention.

FIG. 16B illustrates the manner in which data in the metric events modality is persisted using an edge data object comprising a memory-resident table of tag attributes with associated counts and using a node data object comprising a memory-resident table of tags with associated counts, in accordance with an embodiment of the present invention. In one embodiment of the present invention, a memory-resident table 1601 titled "Edge Health" may be maintained to keep track of the various dependencies in the application. The table 1601 may be stored in, for example, in the storage module 1466 (in FIG. 14). A memory-resident table 1600 titled "Node Health" may be maintained to keep track of the various service nodes in the application. Both tables comprise aggregated rows comprising metrics values. In one embodiment, these rows are stored efficiently for fast aggregation.

For example, the table 1601 may comprise one or more exemplary rows related to the cross-service span pair discussed in connection with FIG. 16A. Row 1606 is one exemplary row that may be generated for the cross-service span pair of FIG. 16A. Note that for simplicity, only tag attributes "from pod" and "to pod" are illustrated in row 1606 in FIG. 16B, but row 1606 would typically also comprise information for tag attributes associated with indexed tags "code" and "env" that are also indexed. As discussed above, each row for the cross-service span pair of FIG. 16A will comprise a unique set of "FROM" and "TO" tag attributes. For example, if the front-end service (e.g., front-end service 1639 in FIG. 16A) makes multiple calls to the product catalog service (e.g., product catalog service 1638 of FIG. 16A), but any of the calls are associated with different values for the "pod" tag from the values shown in row 1606, the information would be recorded in a new row. In other words, each row records a single unique combination of tag attributes and service names. If the value of either the "from pod" or "to pod" tag attribute changes, a new row is created to record the information. Accordingly, there may be multiple rows in the table 1601 for the cross-service call discussed in connection with FIG. 16A, where each row would comprise a unique combination of "FROM" and "TO" tag attributes for a given cross-service span pair.

Each row in the table 1601 comprises a count value for number of requests 1604, errors 1605 and latency 1611. The request metric 1604 is incremented each time the same cross-service call with the same unique set of attributes for a respective row is observed on a trace. The error metric 1605 is incremented each time a request associated with a respective row is observed on a trace that has an error. The latency 1611 metric relates to a histogram of the duration that a respective request took. Further, each row comprises a timestamp 1603 to record the time of the cross-service call.

Using the metrics associated with the requests 1604, errors 1605 and latency 1611 and the timestamp 1603, aggregations on the rows may be performed quickly and efficiently to determine SLIs for varying ranges of time as discussed in connection with FIGS. 6 to 12. In response to a user query then, the numeric rows in the tables 1600 and 1601 may be summed into either timeseries buckets or into a single number depending on the query.

In one embodiment, the metric events modality may maintain a separate memory-resident table 1600 titled "Node Health" in system memory associated with the service nodes in the application. Each row in the memory-resident table 1601 comprises a unique combination of service names and associated tags. For example, row 1608 is associated with the front-end service (e.g., service 1639 in FIG. 16A) and comprises corresponding tag values for "env," "pod" and "code." Similarly, row 1607 is associated with the product catalog service (e.g., product catalog service 1638 of FIG. 16A) and comprises corresponding tag values for "env," "pod" and "code."

Each unique combination of service name and corresponding tag values is associated with metrics that are maintained in the memory-resident table 1600, e.g., request, error and latency (as discussed in connection with table 1601). These metrics may be used to perform fast and efficient aggregations. For example, if the user queried the number of times "env=prod" in the application, assuming the two exemplary services illustrated in table 1600 are the only ones where "env=prod," the request counts in each row would be aggregated to provide a result of 2.

Note that the memory-resident table 1600 may also comprise a "root cause" metric 1609 which tracks the number of times the corresponding service was the root cause of an error. For example, the "root cause" metric may be aggregated using the memory-resident table 1600 across multiple rows to determine the number of times each given service in an application was the root cause for an error.

In one embodiment, a software tool may be employed to perform faster aggregations across the rows of tables 1600 and 1601. For example, Apache Druid, which is an open-source data store designed for sub-second queries on real-time and historical data, may be used to perform the aggregations rapidly and efficiently. In different embodiments, other tools may also be used to perform aggregations. In one embodiment, the information in the memory-resident tables 1600 and 1601 may be used in the metric events modality to perform the metrics aggregations for rendering the service graph (e.g., graph 1000 of FIG. 10) and computing the associated SLIs.

In one embodiment, the metrics event modality may also store Trace IDs associated for each unique combination of cross-service span pairs and corresponding indexed tags.

In one embodiment, the aggregation module 1422 (of FIG. 14) of the monitoring platform aggregates across the cross-service span pairs by maintaining one or more exemplary Trace IDs for each unique set of "FROM" tag attributes (and their corresponding values) to "TO" tag attributes (and their corresponding values) for a cross-service pair. Accordingly, exemplary Trace IDs may be maintained for each unique cross-service call.

The exemplary Trace IDs stored with each unique set of "FROM" and "TO" tag attributes for a cross-service span pair may be used by the querying module 1482 to respond to queries requesting more particularized information pertaining to non-indexed tags associated with the spans. For example, if a user needs particularized information regarding span performance or span duration, the querying module 1482 may be able to use the aggregated rows of information stored in a database associated with the storage module 1466 to access one or more exemplary Trace IDs associated with the call. Using the Trace IDs then, the querying module may be able to access the sessionized traces 1408 and perform analytics on the retrieved exemplary traces to deliver the requisite span performance and span duration information. In one embodiment, the full trace information may be accessed from a storage set associated the full-fidelity modality, which stores the entire traces as ingested following sessionization. In a different embodiment, however, the metric events modality may save full trace information for traces associated with the exemplary Trace IDs in a separate storage from the data set associated with the full-fidelity modality. In one embodiment, because the metric events mode allows users to retrieve raw trace data, it also allows users to run an analysis on the retrieved data for an arbitrary set of tags (instead of being limited to the tags pre-indexed by indexing module 1407).

The metric events modality is particularly advantageous in circumstances where the user has identified a problem from the information provided by the metric time series. Having identified a problem either by manual monitoring of RED metrics or through an automatically generated alert, the user may be able to traverse deeper using the metric events data set and access relevant traces to receive more specific information regarding the problem. Also, the metric events mode allows the user to run an arbitrary analysis on the traces, e.g., on a set of tags that has not previously been indexed, which provides the user with specific information that may be used to diagnose and resolve the problem.

FIG. 16C illustrates the manner in which data in the metric events modality is persisted using an edge data object comprising a memory-resident table of extracted indexed tag attributes with associated Trace IDs and using a node data object comprising a memory-resident table of extracted tags with associated Trace IDs, in accordance with an embodiment of the present invention. In one embodiment of the present invention, a memory-resident table 1631 created to persist data is associated with the various dependencies in the application. Also, a memory-resident table 1630 created to persist data for the metric events modality is associated with the various service nodes in the application. Note that table 1631 is created in a similar way to table 1601 in FIG. 16B and that table 1630 is created in a similar way to table 1600 of FIG. 16B. Instead of tracking RED metrics, however, the tables in FIG. 16C comprise a column for Trace IDs 1690 and Exemplar Type 1691. It should be noted that, in one embodiment, memory-resident table 1631 may be maintained in combination with memory-resident table 1601 and that memory-resident table 1630 may be maintained in combination with memory-resident table 1600.

Row 1697 in table 1631 is one exemplary row that may be generated for the cross-service span pair of FIG. 16C. Note that for simplicity, only tag attributes "from pod" and "to pod" are illustrated in row 1697 in FIG. 16C, but row 1697 would typically also comprise information for tag attributes associated with indexed tags "code" and "env." As discussed previously, each row for the cross-service span pair of FIG. 16A will comprise a unique set of "FROM" and "TO" tag attributes. Accordingly, there may be multiple rows in table 1631 for the cross-service call discussed in connection with FIG. 16A, where each row would comprise a unique combination of "FROM" and "TO" tag attributes for a given cross-service span pair. Each row in table 1631 comprises a Trace ID column 1690, which keeps track of one or more Trace IDs associated with the unique combination of service names (and operation names) and tag attributes for the given row. In other words, the combination of service names (and operation names) and tag attributes in each row may comprise an index to access the associated Trace IDs.

In one embodiment, the Exemplar Type column 1691 tracks the type of exemplary trace associated with the Trace ID. Types of exemplars may be request, error, root cause errors or some latency bucket identifier. The Trace IDs in each row may be accessed to identify and retrieve the full trace associated with the ID for further analysis, e.g., an analysis on an arbitrary set of tags associated with the trace.

In one embodiment, the monitoring system may maintain a separate table 1630 associated with the service nodes in the application. Rows 1695 and 1696 in table 1630 are two exemplary rows that may be generated for the cross-service span pair of FIG. 16A. Each row in table 1630 comprises a unique combination of service and associated tags. For example, row 1695 is associated with the front-end service (e.g., service 1639 in FIG. 16A) and comprises corresponding tag values for "env," "pod" and "code." Similarly, row 1696 is associated with the product catalog service (e.g., product catalog service 1638 of FIG. 16A) and comprises corresponding tag values for "env," "pod" and "code."

Each unique combination of service name and corresponding tag values is associated with a Trace ID and Exemplar type that is maintained in table 1630.

As noted above, in one embodiment, metrics event data may be persisted in tables that consolidate the data shown in FIG. 16B and FIG. 16C. For example, table 1601 may comprise an additional column to track Trace IDs and similarly table 1600 may comprise an additional column to track Trace IDs.

The Trace IDs may be used in metrics events modality to retrieve full traces for more detailed analysis. In one embodiment, full traces associated with the exemplary Trace IDs may be maintained in a dedicated storage associated with the metric events. In a different embodiment, the full traces may be accessed from a data set associated with the full-fidelity mode.

It should be noted that the metric events modality can comprise higher-cardinality metrics information because a higher number of tags may be indexed for the metric events data set as compared to the dimensions associated with the metric time series. However, the metric time series modality may provide higher-fidelity information because it retains metadata associated with incoming spans (e.g., service name, operation name, count values, etc.) that are not collected in the metric events modality. Further, the metric time series modality also allows users to configure alerts against one of more time series to monitor incoming data in real-time. Because metric events are generated from post-sessionized traces, the metrics data associated with metric events may not be computed as rapidly as compared with the metric time series modality.

4.3 Full-Fidelity Modality

In one embodiment, the full-fidelity module 524 of FIG. 5 stores all the incoming trace data from the sessionization process in real time. Unlike the prior two modes, the full-fidelity modality stores the trace data in its raw form. In one embodiment, the data is stored in parquet-formatted batches of full traces in an unstructured format (e.g., blob storage) along with some metadata. The metadata may comprise the tags associated with the trace (both indexed and unindexed) and other properties such as service name and operation for more efficient querying. In one embodiment, the format of the metadata may comprise a map of a service name to a map of tag names, wherein each tag name may be mapped to a list of tag values. The batches of full traces in unstructured format and the metadata are queried in the full-fidelity modality using a robust data engine to search for any tag across the traces. For example, PRESTO is an open source distributed SQL query engine that may execute queries against data sources of varying sizes.

Figure 17:
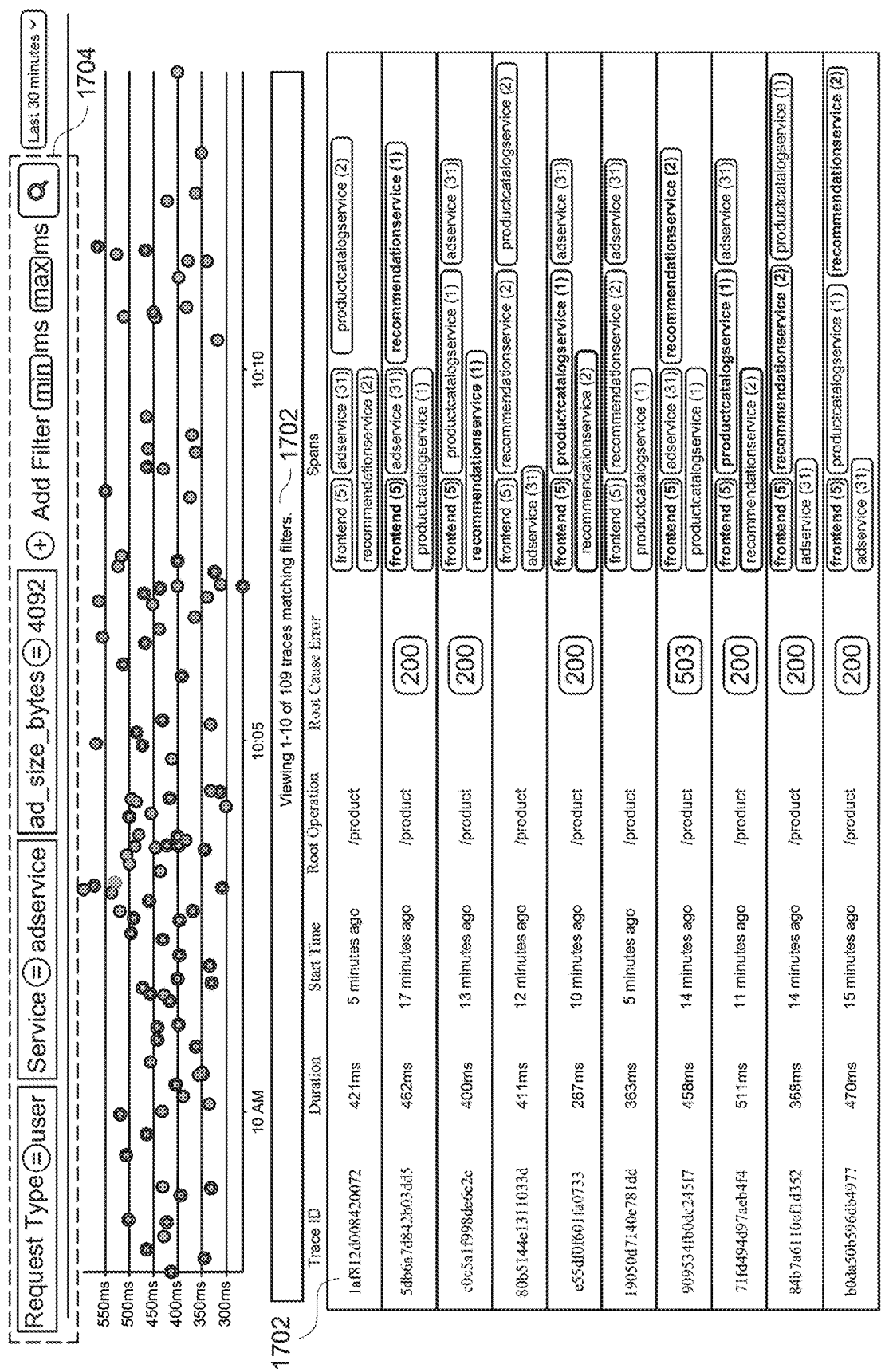
FIG. 17 is an on-screen GUI showing the manner in which a client may submit a query to be executed against the full set of traces stored in connection with the full-fidelity modality, in accordance with embodiments of the present invention.

FIG. 17 is an on-screen GUI showing the manner in which a client may submit a query to be executed against the full set of traces stored in connection with the full-fidelity modality, in accordance with embodiments of the present invention. The full-fidelity modality, in one embodiment, allows a user to execute query against arbitrary tags to receive a set of traces that matches the query. For example, in the GUI of FIG. 17, the user enters a query 1704 for traces where "Request Type=user," "Service=adservice" and the tag "ad_size_bytes=4092." In response, the platform returns a list 1702 of the traces matching the user-entered filters and, further, provides information about the traces, e.g., the Trace ID, duration, start time, root operation, root cause error status code and associated spans.

In one embodiment, the monitoring platform has the ability to run a full trace search (as shown in FIG. 17), and feed the traces collected into other modalities of analysis to get more detailed information about an arbitrary set of traces and an arbitrary set of attributes associated with the set of traces.

5.0 Application Performance Monitoring (APM) Detectors

Conventional monitoring technologies were not able to extract metrics in real-time from significant amounts of span and trace data generated by various services in an application owner's architecture, and use the generated metrics to identify errors in an application. Another related challenge is providing appropriately focused information related to an error to a developer depending on the level of detail sought.

In an embodiment, detectors can be configured to monitor incoming data associated with the metric time series modality. Detectors evaluate metric time series-which can themselves be the output of some analytics functions, not just the raw data being sent in-against a specified condition, and optionally for a duration. Stated differently, detectors can be configured to monitor one or more metric time series (or computations associated with a metric time series) associated with incoming spans to detect anomalous behaviors. For example, detectors may be set up to monitor an error rate associated with a particular node or an error rate associated with a dependency.

When a condition has been met, detectors generate events of a specified level of severity. Events generated when detector conditions are met are referred to as alerts. Among other things, alerts can be used to trigger notifications in incident management platforms or messaging systems. Notifications pertaining to alerts also may be configured to be annotated in a GUI for a user to review. For example, an alert may be triggered if the error associated with a respective node or edge increases above a predetermined threshold. A notification pertaining to the alert may be displayed pertaining to the alert for a user to review.

Detectors generate alerts on aggregates and trends and, subsequently, use the alerts as triggers for deeper analysis and investigation using the other modalities, e.g., metric events and full-fidelity. The aggregates, in an embodiment, may be captured as metric time series (which comprise per span statistical summaries).

The monitoring platform may configure alerts associated with the metric time series data, wherein the alert may be triggered, for example, when a configured threshold has been reached. Other more complex alerts may also be configured. For example, the alert may be generated when an error rate is above a threshold. In an embodiment, alerts may be set for any of the RED metrics (e.g., request, error, latency). According to embodiments, an alert may be generated when an error rate is in violation of user or other defined rules (e.g., greater than 10% over a duration of 5 minutes, or the like), or when there is a growth in error rate (e.g., error rate over the last 5 minutes is more than twice the error rate of the preceding hour). It is understood that other alerts may similarly be generated with different thresholds. In this way, network traffic may be monitored for error rates associated with endpoints.

Detector conditions can be static values, e.g., CPU utilization percentage should not exceed a value of 90. However, static values may result in noisy alerting because they are generally simplistic. The value that is appropriate for one service on a particular time of day may not be appropriate for another service or a different time of day. Accordingly, embodiments of the present invention allow a user to define conditions that are dynamically generated. Dynamic thresholds are the result of an ongoing computation on streaming data, rather than a simple constant. For example, if the metric exhibits cyclical behavior, such that the best basis of comparison is the same metric but from a week ago, then a user can define a threshold that is a 1-week time-shifted version of the same metric. Or, if the relevant basis of comparison is the behavior of a population like a clustered service, then a user can define the threshold as a value that reflects that behavior—for example, the $90^{th}$ percentile for the metric across the entire cluster over a moving 15-minute window.

Once an alert that is triggered off of one of the metric data series is received, the monitoring service 306 of FIG. 3 may be configured to automatically query a data set associated with one or the other modalities, e.g., the metric events data set or the full-fidelity data set. By retaining sessionized trace data as metric events or full-fidelity data, the monitoring service 306 ensures that executions which exemplify problems related to latency, errors, or request rates will be retained for further inspection and analysis. The metric events data set, for example, may be scoped by a time range determined by the alert. Further, the metric events data set may be explored for further information pertaining to the alert, e.g., reviewing a service graph where a path related to an error may be highlighted. Additionally, the full-fidelity data set may be explored to determine a collection of candidate error traces associated with an error. These candidate error traces may then be further explored by a user to identify a root cause of the error at the endpoint.

5.1 Alert Configuration

In one embodiment, additional value may be extracted from the time series metrics by identifying spikes and anomalies and determining when further investigations should occur. As mentioned previously, the metric time series modality can be configured, in an embodiment, to monitor RED metrics in real-time (with sub-second computation rates) and provide real-time alerting. In one embodiment, data can be ingested at one second resolution and alerts can be provided within a two to three second resolution if a condition is violated.

Figure 18A:
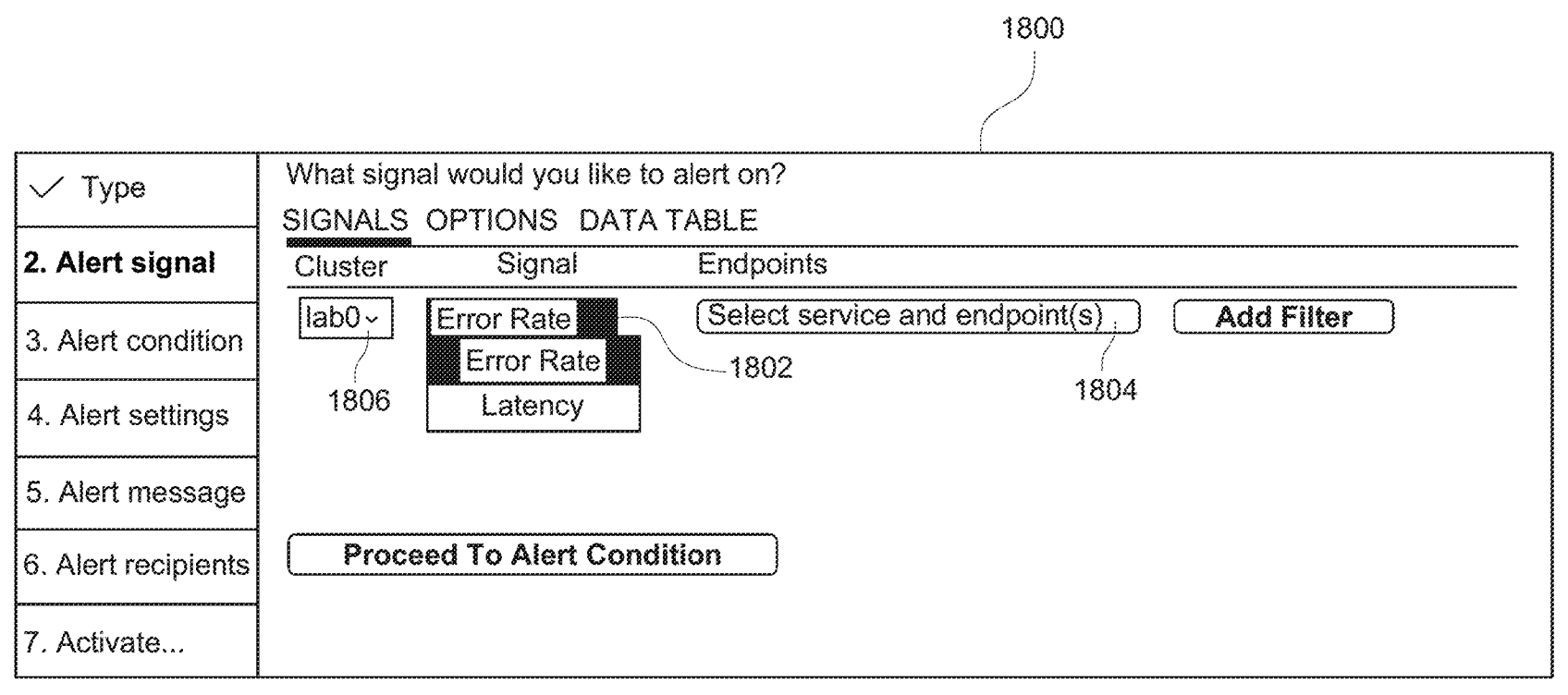

FIG. 18A is an exemplary on-screen GUI 1800 showing the manner in which a client may configure an alert signal in connection with the metric time series modality, in accordance with embodiments of the present invention. As noted previously, in an embodiment, the alerting capability of the monitoring platform is based on the data set associated with the metric time series. One or more metric time series associated with an endpoint configured through field 1804 may be monitored to determine if an alert corresponding to the endpoint is triggered.

GUI 1800 allows a user to select a cluster 1806 associated with the alert signal. The user may also determine a type of alert 1802, e.g., error, latency or request rate. Further, the GUI comprises a field 1804 for the user to select an endpoint or service to be monitored.

FIG. 18B is an exemplary on-screen GUI 1801 showing the manner in which a client may configure a condition associated with the error alert configured in FIG. 18A, in accordance with embodiments of the present invention. As shown in GUI 1801, a user may configure an error alert based on a static threshold, which works well when a specific error rate threshold is known. Alternatively, the alert may be configured as a sudden change, where the current error rate is compared to the baseline error rate calculated for the immediately preceding time window.

FIG. 18C is an exemplary on-screen GUI 1812 showing the manner in which a client may configure a condition associated with a latency-based alert, in accordance with embodiments of the present invention. Embodiments of the present invention are able to track different percentiles of the latency distribution in connection with, for example, particular services and operations. In an embodiment, there may be multiple options to configure a latency-based alert. For example, latency may be compared against a baseline set, which may be selected from a recent history baseline set (corresponding to a 'sudden change' type alert 1814) or a baseline set that represents a same time window in previous cycles (corresponding to a 'historical anomaly' type alert 1815). The monitoring platform may also provide options for measuring abnormality. For example, the abnormality may be measured as a percentage change relative to the baseline or a number of deviations from the norm. In one embodiment, the latency may also be compared to a static threshold 1813 (in milliseconds). It should be noted that for both latency and error rate, in an embodiment, the static threshold detectors allow for comparisons to distinct trigger and clear thresholds (and durations) to eliminate possibly flappy alerts.

FIG. 18D is an exemplary on-screen GUI 1888 showing the manner in which a client may configure alert settings associated with a latency-based alert, in accordance with embodiments of the present invention. In an embodiment, the latency-based alert may be configured based on several settings. For example, the alert may be based on deviations from the norm as selected by field 1883. The alert settings also allow a user to define the size of the current window 1884 and the size of a historical window 1835. Further, the alert settings allow the user to set a trigger threshold 1886, which may be a number of deviations above which an alert is triggered. A clear threshold 1887 sets the threshold below which the alert clears. For example, if a value of 4 is selected for the clear threshold 1887, the latency threshold will clear if the latency is less than 4 deviations above the norm.

Analysis of percentiles may provide an important but incomplete picture of the health of an endpoint. To this end, the detectors can be configured using compound alert conditions (e.g., configuring an alert to trigger on a condition of the form "A and B," for example). For example, the detectors can be configured to make it possible to easily incorporate the volume of traffic an endpoint receives in determining when an alert should trigger. As a consequence, alerts for sparse data can be suppressed. For latency detectors, one of the volume parameters is "Min. requests/sec (absolute)," which is the minimum request rate (expressed as requests per second) required in the current window for the alert to trigger. GUI 1888 allows a user to set this value through field 1889. Note the default value of 0 means this volume condition has no effect.

The other volume parameter is "Min. req/sec (% of history)," which is the minimum request rate, as a percentage of the historical request rate, required in the current window to trigger or clear the alert. This can be set through field 1891. The historical request rate may be calculated on the same time windows used to determine the baseline and threshold (e.g., the immediately preceding window, or the same window from prior weeks). For the static threshold detector, the historical window may be up to five times longer than and immediately precedes the trigger duration period.

Note that settings are specific to the alerting strategy chosen. A different strategy may be employed for an error-based alert. In an embodiment, a request volume condition for the error rate detectors is also exposed. This can be used to ensure, for example, that an endpoint that receives just a few requests, one of which is an error, does not trigger an alert. In an embodiment, the user can also configure settings related to the type of alert message (e.g., by selecting interface 1875) and the alert recipients (e.g., by selecting interface 1876).

Figure 18E:
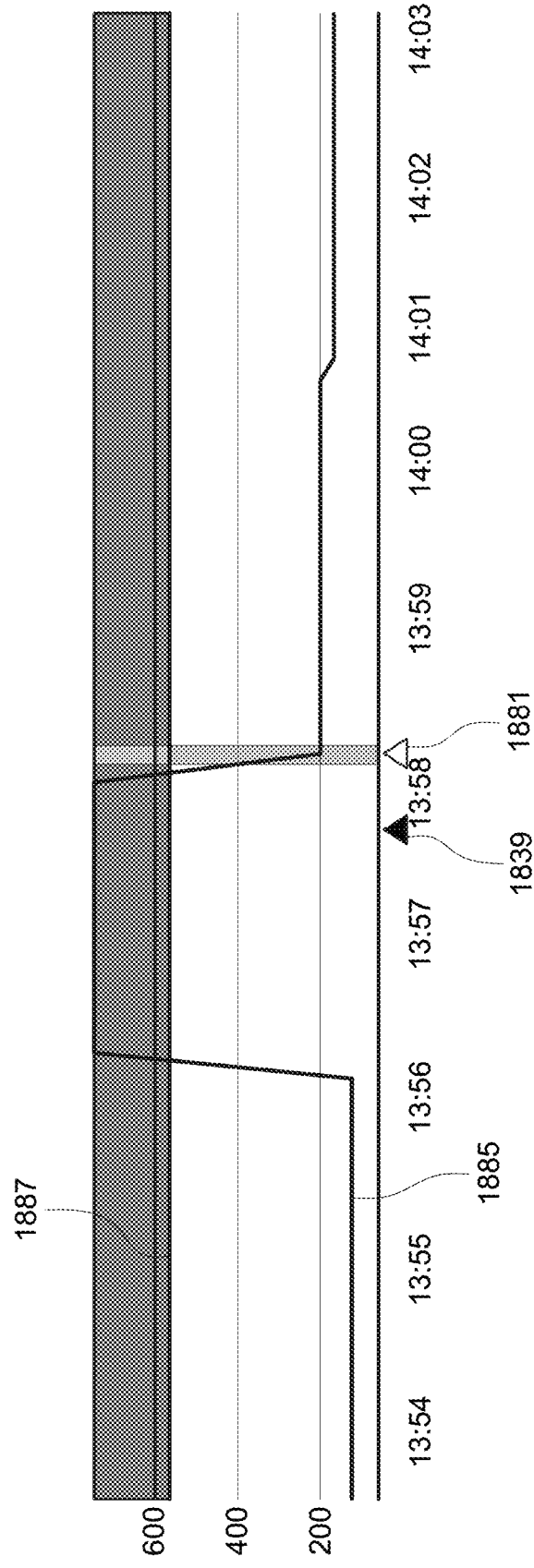
FIG. 18E is an exemplary on-screen GUI showing the manner in which a latency-based error is identified by a detector and depicted visually, in accordance with embodiments of the present invention.

FIG. 18E is an exemplary on-screen GUI showing the manner in which a latency-based error is identified by a detector and depicted visually, in accordance with embodiments of the present invention. As shown in FIG. 18E, an alert is triggered when the current latency increases just after time 13:56 and crosses the threshold 1887, which may be selected to be the historical median plus five historical deviations. The GUI also displays the historical baseline 1885, which may be selected to be the historical median. The historical baseline provides additional context to facilitate rapid evaluation of an alert. The filled triangle 1839 marks the beginning of the incident and the open triangle 1881 marks the end. It should be noted that any number of different sized, colored or shaped indicators may be used in connection with indicating problematic incidents.

Figure 19:
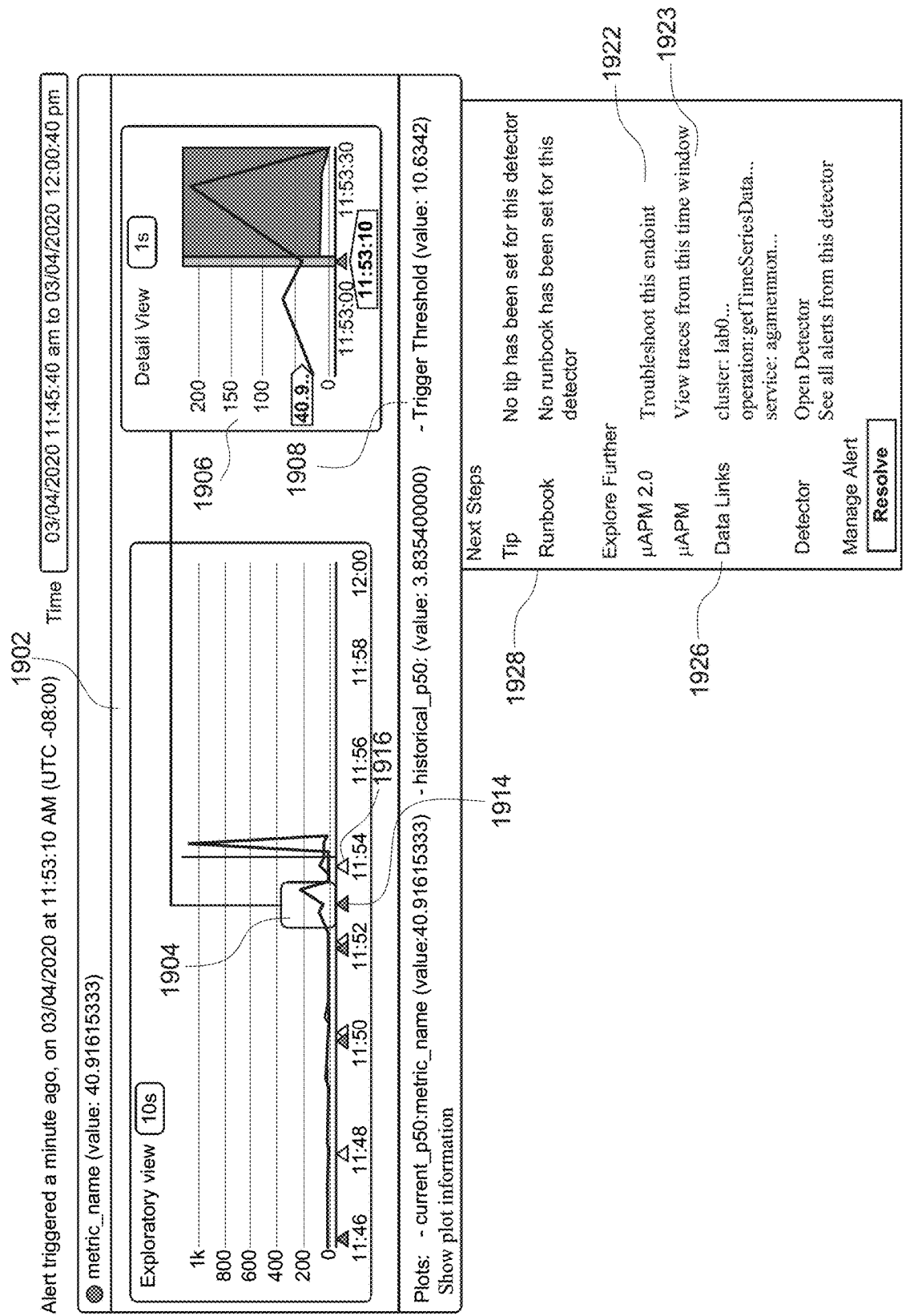
FIG. 19 is an exemplary on-screen GUI showing the manner in which an error is identified by a detector and depicted visually, in accordance with embodiments of the present invention.

FIG. 19 is an exemplary on-screen GUI 1902 showing the manner in which an error is identified by a detector and depicted visually, in accordance with embodiments of the present invention. GUI 1902 illustrates the alert modal comprising the visualization and alert details created when a monitored condition is met. In an embodiment, the alert condition may be reported along with an offending service name, operation name, or other details affiliated with the alert. Furthermore, additional tags associated with the alert may also be reported if they are stored as part of an extended span identity for a given metric time series.

As shown in GUI 1902, when the error rate increases over a critical threshold 1908 at time 1914 (a filled triangle marks the beginning of the incident), an alert is flagged. The end of the incident is indicated by an open triangle at time 1916. When the alert condition is met, the alert is generated and may be routed according to a notification policy specified in the configuration. In an embodiment, the region 1904 corresponding to the anomalous behavior is displayed in a window 1906, which provides a higher resolution view into the event. The visualization in window 1906 illustrates the behavior of the offending time series at the event time.

The GUI 1902 also comprises a window 1928 which comprises alert details specifying dimensions and metadata associated with an event. For example, the GUI 1902 provides additional metadata and dimensional details 1926 pertaining to the metric time series being monitored, e.g., the time series monitored in GUI 1902 is associated with cluster "lab0," operation "getTimeSeriesData" and service "agamemnon" as shown in window 1928.

5.2 Application of Alert Details

As noted above, the detectors can be configured to monitor one or more metric time series (or computations based on one or more metric time series) associated with incoming spans to detect anomalous behaviors. Detectors alert on aggregates and trends and, subsequently, use the alerts as triggers for deeper analysis and investigation using the other modalities, e.g., metric events and full-fidelity. Each monitored metric time series (or associated computation) will typically be associated with certain metadata or dimensions, e.g., service name, operation name, other user-configured dimensions, etc. as discussed earlier. If an alert is triggered, this collection of dimensions or metadata (plus the time range of the alert) may be used to write a query against one or more of the other data sets corresponding to the other modalities. Stated differently, any dimensions pertaining to an alert may be passed as a filter to data sets corresponding to either the metric events modality or the full-fidelity modality.

The GUI 1902 also provides an option to apply the alert details (e.g., the metadata and dimensions Y26) to other modalities (e.g., metric events, full-fidelity, etc.) and other views of the monitoring platform. For example, the user may select a Troubleshooting view 1922, which directs the user to a "Troubleshooting" view with the alert filters (corresponding to the metadata and dimensional details 1926) applied. The user is also given an option 1923 to view the traces associated with the metric time series being monitored for an appropriate time window, e.g., the time window for which the alert was flagged. In this way, alert context can be automatically propagated to other views of the platform or other data sets associated with different modalities supported by the monitoring platform. A user, therefore, would not be required to have the expertise to manually craft queries against different data sets in response to an alert. In addition, automatically populating queries is also time-efficient.

Figure 20:
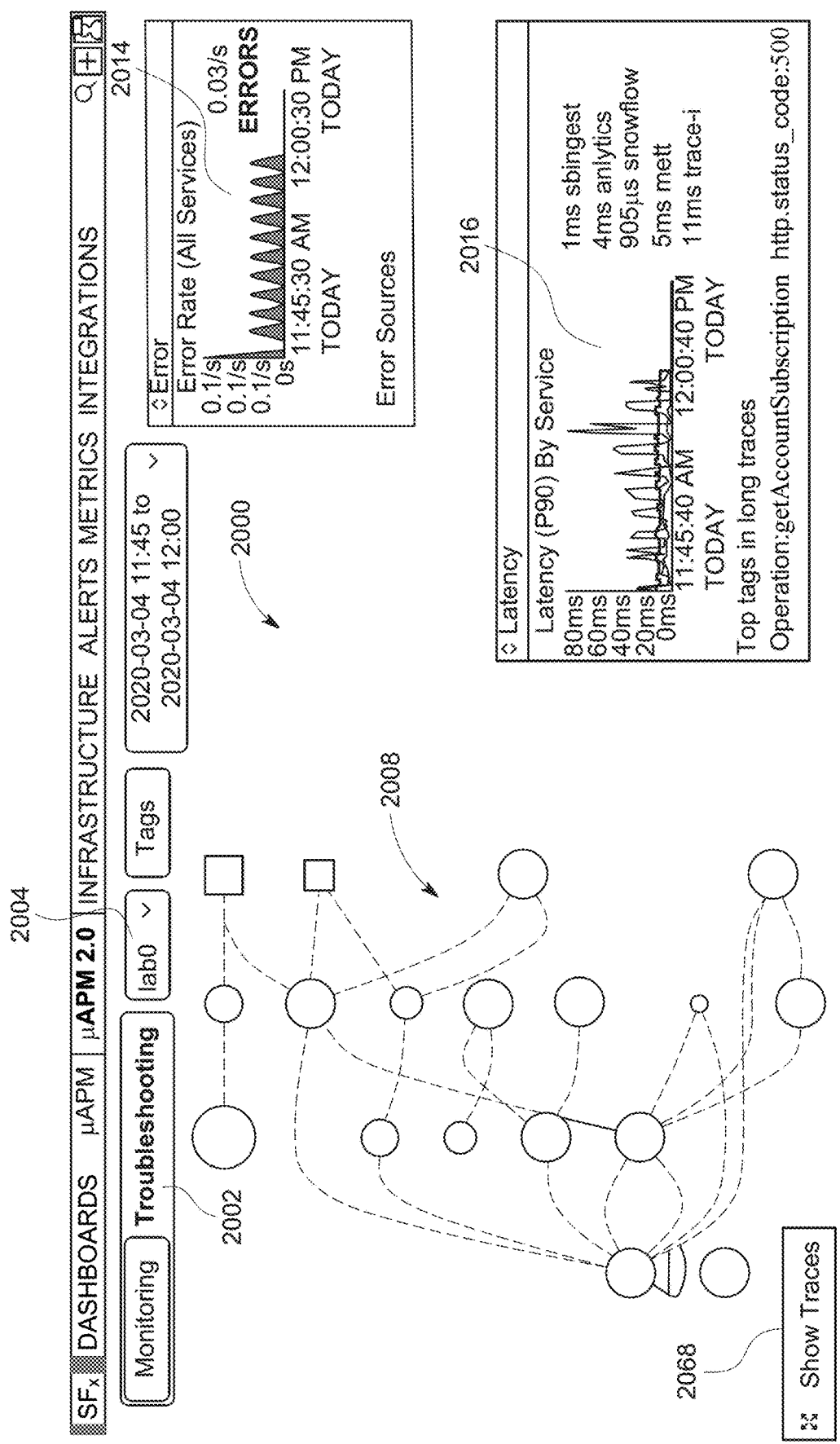
FIG. 20 is an exemplary on-screen GUI showing the manner in which the dimensions associated with the alert filters in FIG. 19 may be automatically applied to the metric events data set for further analysis, in accordance with embodiments of the present invention.

FIG. 20 is an exemplary on-screen GUI 2000 showing the manner in which the dimensions associated with the alert filters in FIG. 19 may be automatically applied to the metric events data set for further analysis, in accordance with embodiments of the present invention. In an embodiment, the alert filters may be used to automatically populate queries executed against the metric events or the full-fidelity data set. A Troubleshooting view 2002, for example, may be configured using the metric events data set and may, among other things, illustrate a service graph 2008 computed using the metric events data set.

For example, as shown in GUI 2000, the user is able to view a service graph 2008 filtered by dimensions pertaining to the error (e.g. metadata and dimensional details 1926). As seen in GUI 2000, the service graph 2008 is displayed filtered by the dimension "lab0" 2004, which was associated with the alert from FIG. 19 (e.g., metadata and dimensional details 1926). The cluster tag with the value "lab0" is a global tag and upon selecting the Troubleshooting view 1922 in FIG. 19, the user is automatically directed to the Troubleshooting view 2002 with the dependency graph filtered by the cluster tag. Because the metric events modality can comprise higher-cardinality metrics information (e.g. a higher number of tags may be indexed for the metric events data set as compared to the dimensions associated with the metric time series), the user is able to conduct a more in-depth analysis related to the anomalous behavior in an attempt to determine what caused the performance to deteriorate. For example, the user may determine what service the alert was associated with and can use the data provided in the Troubleshooting view 2002 to determine what other services are dependent on the offending service.

In an embodiment, the user is able to query and filter the metrics event data set by the additional dimensions and metadata indexed as part of the metric events and receive further information about each offending service or operation during troubleshooting. For example, if a user does not have an alert configured for a particular customer, but the user observes that latency associated with a given operation is high, the user may be able to analyze the metric events data set. The metrics event data set may have indexed tags corresponding to a customer name and type that may provide the user additional information to understand the anomalous behavior.

In an embodiment, the user may also be able to query and filter the metric events data set by additional tags that were not indexed initially. For example, as discussed above, the exemplary Trace IDs stored as part of the metric events data set allows a user to retrieve traces and conduct further queries to gather information regarding both indexed and unindexed tags. This provides the user with additional flexibility in investigating the metric events data set in response to a triggered alert.

In one embodiment, if the error which was alerted on is associated with a particular edge or dependency in the service graph, the edge may be highlighted in the service graph. Similarly, if the reported alert is associated with a path (comprising two or more edges), the path may be highlighted within the service graph. In an embodiment, the user may be given an option to receive further information by selecting and interacting with a particular offending infrastructure element (e.g., a node or dependency) related to the error on a service graph.

Embodiments of the present invention advantageously allow a user to derive further information regarding end user impact. Typically, in conventional analysis systems, if a computed metric changes significantly, the analysis system is not able to provide further information regarding end user impact for the associated metric. The multiple modalities of analysis provided by the monitoring platform in accordance with embodiments of the present invention allows a user to easily extract more structured information from the other more detailed modalities, e.g., full-fidelity or metric events. For example, the user may be able to retrieve exemplar traces associated with the alert from the metric events data set and tie the change in a monitored metric to an exemplary trace. Using a service graph and the exemplary trace, the user can then also correlate the incident with other related incidents in the vicinity of the trace, e.g., to determine if the offending incident was actually being caused by a service downstream from the service that generated the alert. Embodiments of the present invention, therefore, advantageously provide the user with a more structured experience for troubleshooting an alert and enable a user to make an in-depth investigation of the end user impact of the incident that formed the basis for the alert.

The GUI 2000 also comprises an error panel 2014 and latency panel 2016, which contain information filtered by the dimensions and metadata alerted in FIG. 19. The information in both error panel 2014 and latency panel 2016 is derived from the data set associated with the metric events. As mentioned earlier, metric events comprise additional higher cardinality metrics data and exemplary trace information that allows the user to perform a deeper investigation pertaining to the alert. Latency panel 2016 provides a user with an option to select "top tags in long traces," the information for which is retrieved using the exemplar traces stored as part of the metric events data set.

Referring back to FIG. 19, in an embodiment, the user is able to select option 1923 to perform an analysis directly on the traces associated with the spans connected to the alert. The traces retrieved for a user to inspect may, in one embodiment, be drawn from the data set associated with the full-fidelity modality. Referring to FIG. 20 again, in an embodiment, a user may be able to obtain the full trace view directly from GUI 2000 by selecting option 2068.

Figure 21:
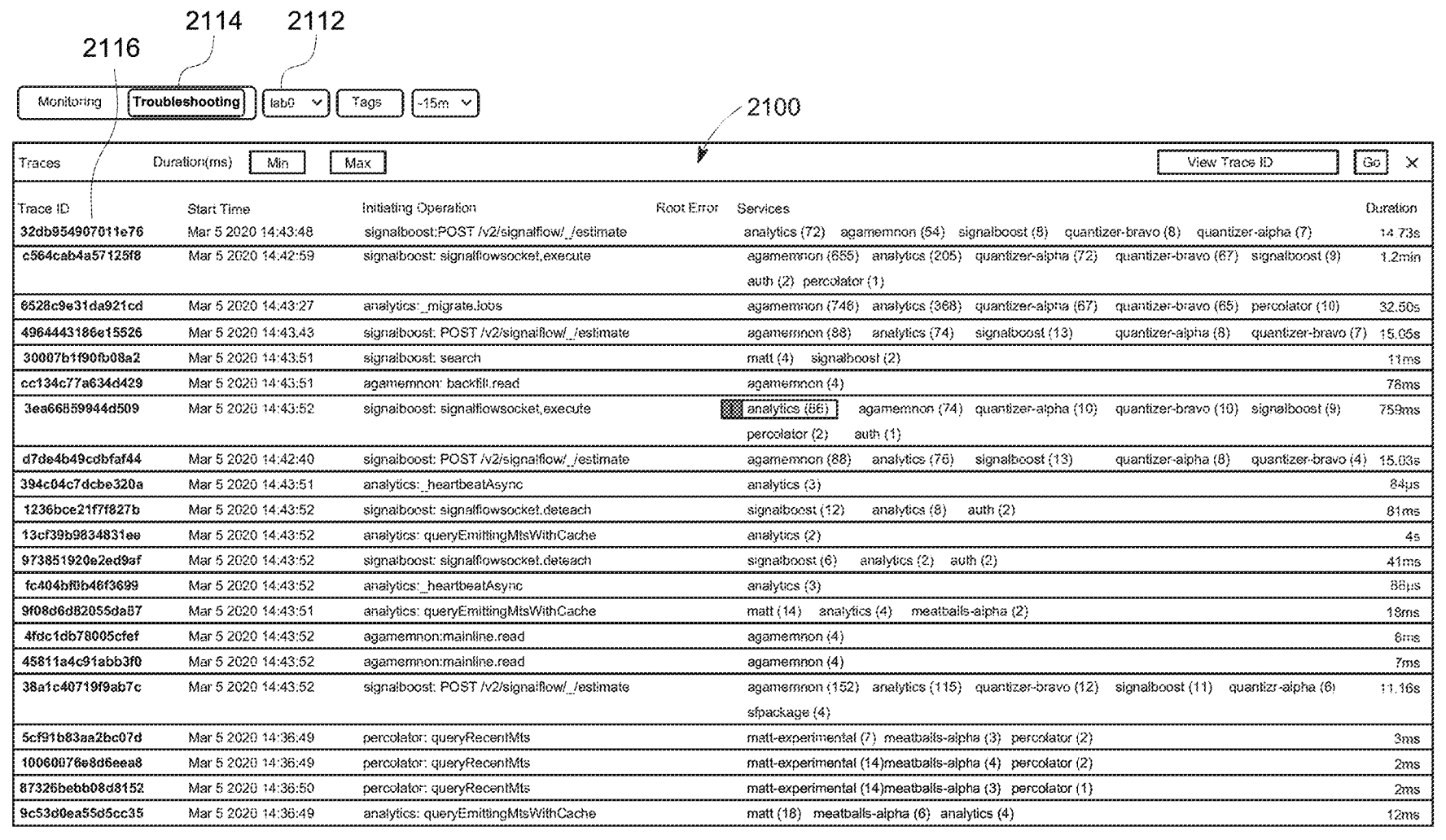

FIG. 21 is an exemplary on-screen GUI 2100 showing the manner in which the dimensions associated with the alert filters in FIG. 21 may be automatically applied to the full-fidelity data set for further analysis, in accordance with embodiments of the present invention.

In an embodiment, alert filters may be used to automatically populate queries executed against the full-fidelity data set. A Troubleshooting view 2114, for example, may be associated with the full-fidelity data set and may, among other things, provide a list of traces (with Trace IDs 2116) associated with the alert for a user to perform further exploration.

As seen in GUI 2100, only those traces are displayed that are associated with the dimension "lab0" 2112, which was associated with the alert from FIG. 19. The cluster tag with the value "lab0" is a global tag and upon selecting the Troubleshooting view 2114 in FIG. 21, the user is automatically directed to GUI 2100 with the traces filtered by the cluster tag "lab0."

Figure 22:
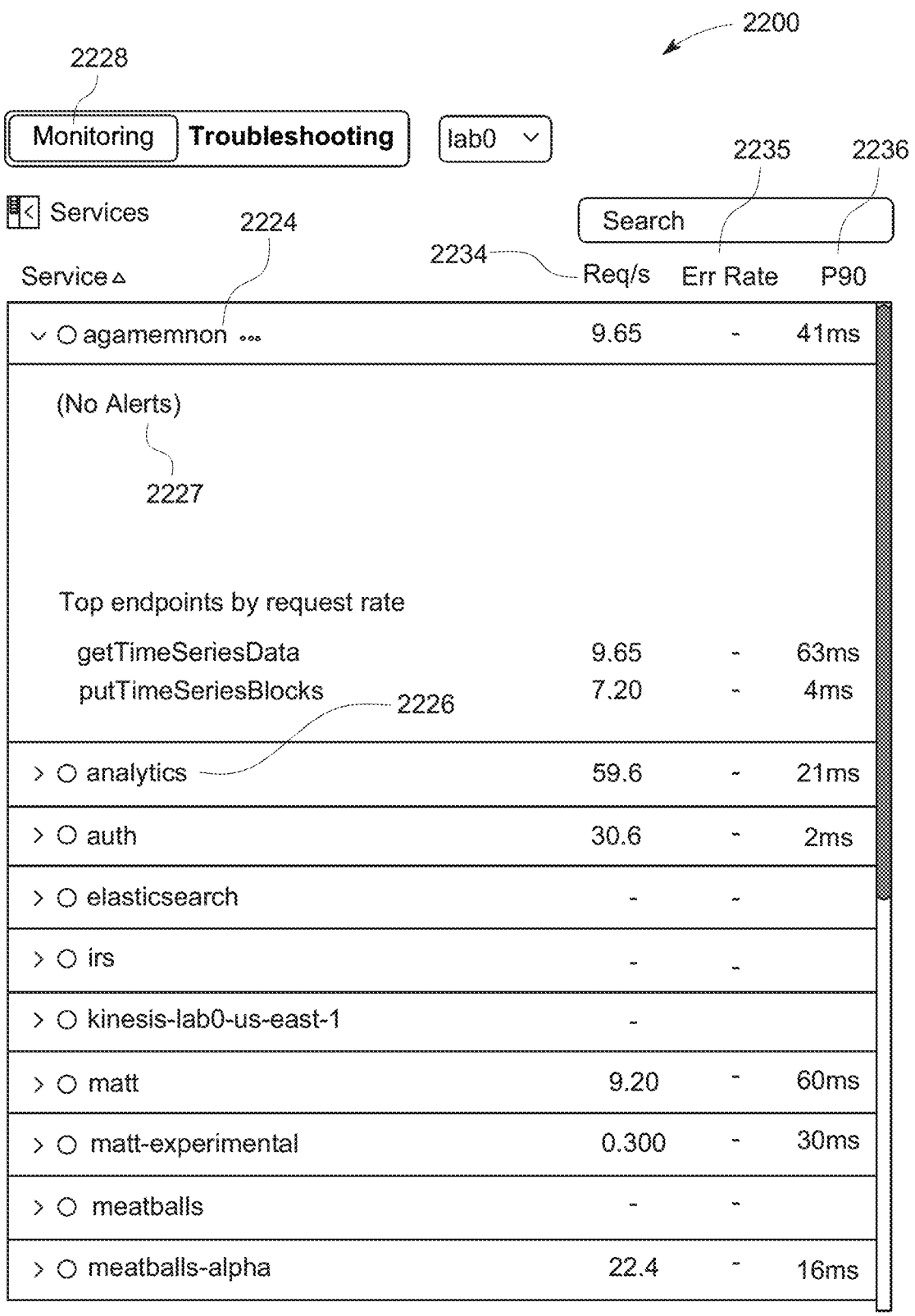
FIG. 22 is an exemplary on-screen GUI showing service-level information that is obtained by aggregating time series information that can be automatically monitored with a detector, in accordance with embodiments of the present invention.

FIG. 22 is an exemplary on-screen GUI 2200 showing service-level information that is obtained by aggregating time series information that can be monitored with a detector, in accordance with embodiments of the present invention. In an embodiment, a "Monitoring" view 2228 of the platform displays service-level information that is obtained by aggregating the metric time series information. For example, metrics associated with request 2234, error 2235 and latency values 2236 pertaining to services, e.g., agamemnon 2224, analytics 2226, etc. are displayed. If there are any alerts configured associated with one of the RED metrics, they would typically be displayed in a field 2227 associated with the corresponding service. In one embodiment, field 2227 would typically also comprise links for a user to perform a deeper troubleshooting analysis using data from either the metrics events or the full-fidelity data set.

Figure 23:
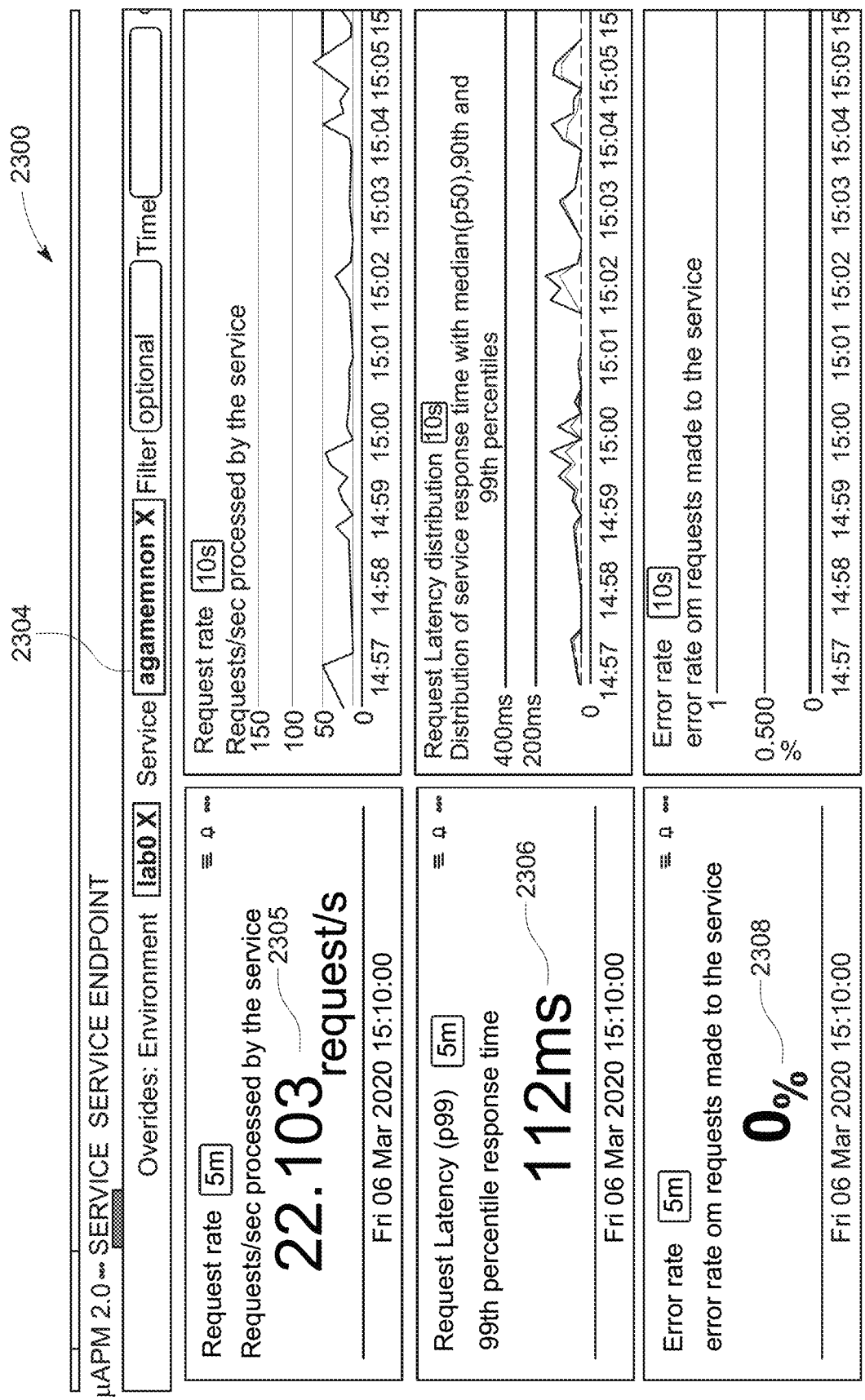
FIG. 23 is an exemplary on-screen GUI dashboard showing graphical visualizations for metrics associated with a given service that can be automatically monitored with a detector, in accordance with embodiments of the present invention.

FIG. 23 is an exemplary on-screen GUI dashboard 2300 showing graphical visualizations for metrics associated with a given service that can be automatically monitored with a detector, in accordance with embodiments of the present invention. FIG. 23 illustrates an exemplary GUI dashboard 2300 associated with the agamemnon service 2304. As mentioned previously, the RED metrics associated with a service may also be visually monitored by rendering separate visualizations for request rate 2305, request latency 2306 and error rate 2308. The data for the visualizations is aggregated from the metric time series.

Figure 24:
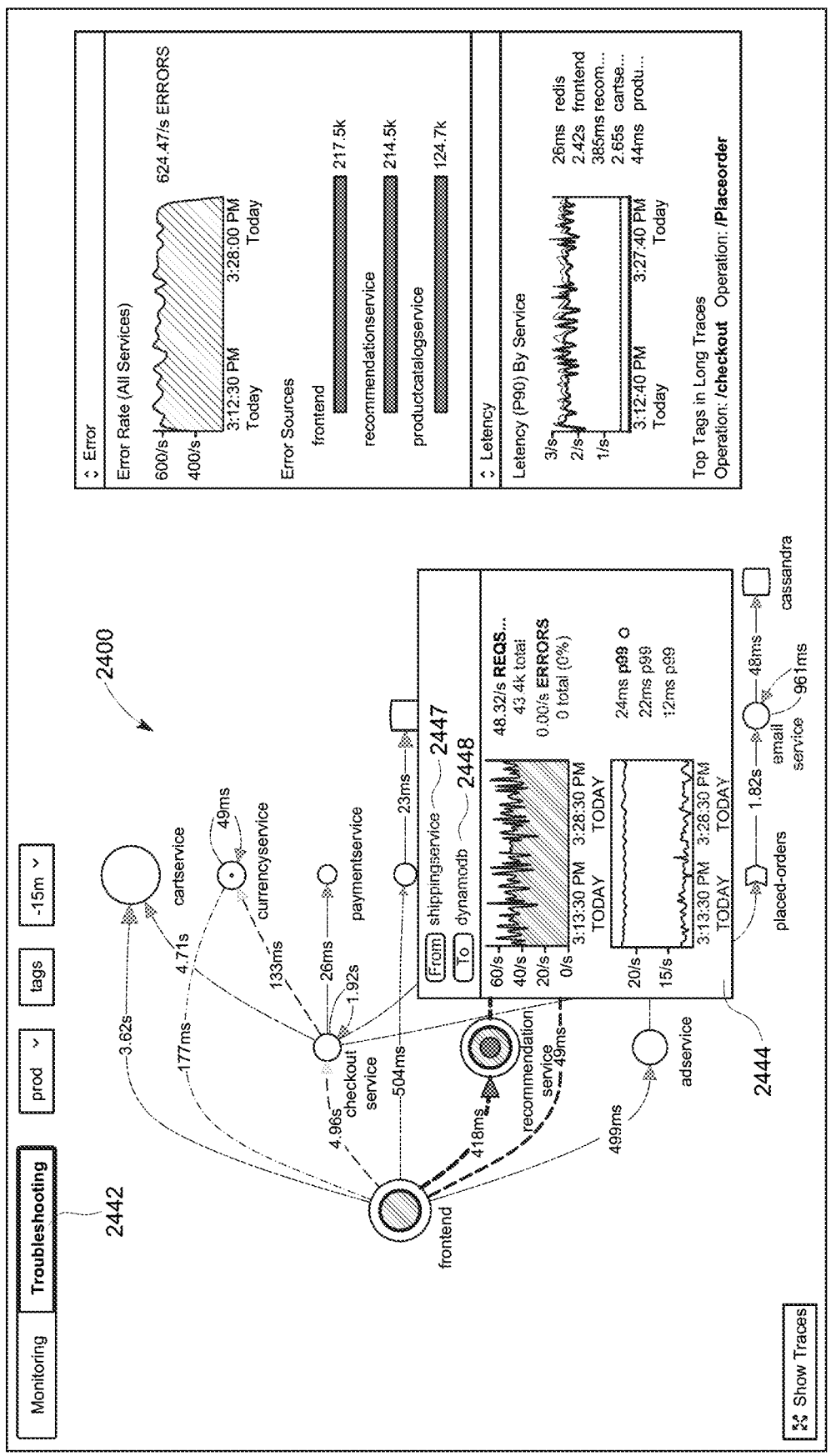
FIG. 24 is an exemplary on-screen GUI illustrating a troubleshooting mode comprising a dependency graph on which alerts may be annotated, in accordance with embodiments of the present invention.

FIG. 24 is an exemplary on-screen GUI 2400 illustrating a troubleshooting mode comprising a dependency graph on which alerts may be annotated, in accordance with embodiments of the present invention. In one embodiment, a user may be able to navigate to a troubleshooting view 2442 that will provide further details regarding the various endpoints and dependencies in the application. In an embodiment, the troubleshooting interface may be based on data from the metric events data set. The troubleshooting interface may allow a user to filter the nodes and edges by a number of dimensions (as illustrated in FIG. 13). Further, the user may be able to select an edge that may be associated with an offending endpoint and review various metrics pertaining to the edge in a pop-up window 2444. For example, an alert may be associated with an error relating to a call from the shippingservice 2447 to the dynamodb 2448. The user may be able to review the statistics associated with the call to glean further information related to the alert.

In an embodiment, if an alert is triggered, details regarding the alert (not shown) may automatically be annotated on a service graph 2400 under the Troubleshooting view 2442. Using the dimensions and metadata associated with the alert, the user would then be able to engage in a more rigorous investigation in troubleshooting mode with additional resolution provided by the metric events modality.

In an embodiment, metadata associated with an alert may be used to identify additional dimensions associated with the alert using a higher fidelity data set, e.g., the metric events data set. For example, additional dimensions pertaining to an offending service or operation that is associated with the alert may be identified using the metric events data set. These additional dimensions may then be tracked (e.g., by a user and/or automatically based on a recurrence over one or more time periods) to conduct a more in-depth investigation of the alert. For example, the additional dimensions may be incorporated into a span identity (using the key ValueMap field in an extended span identity) and metrics pertaining to the additional dimensions may be computed and/or streamed as part of the metric time series data.

Figure 25:
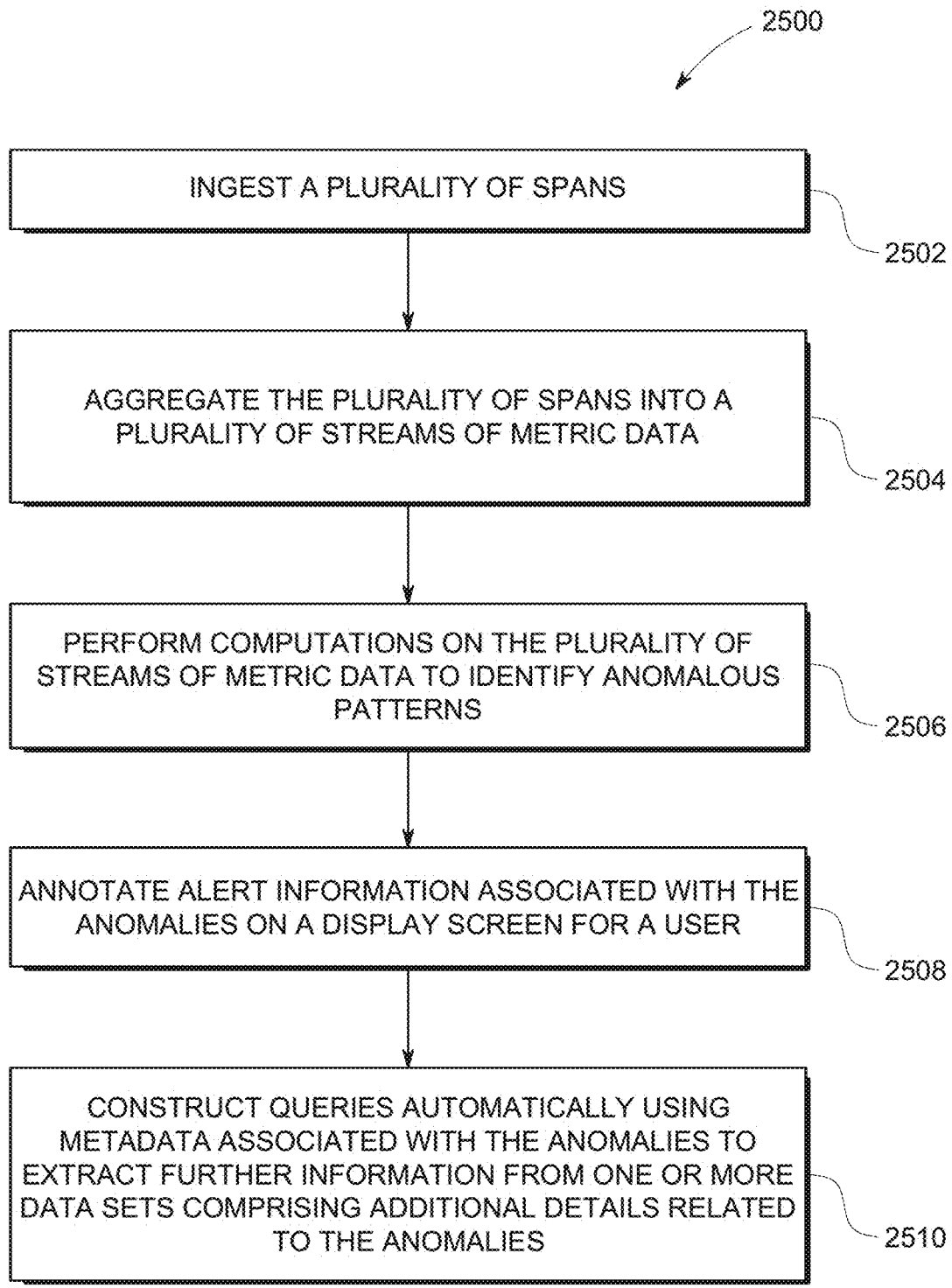
FIG. 25 presents a flowchart illustrating a computer implemented process to create a trace error signature starting with a root cause error span, in accordance with embodiments of the present invention.

FIG. 25 presents a flowchart illustrating a computer implemented process to diagnose anomalous patterns in metrics data, in accordance with embodiments of the present invention. Blocks 2502-2506 describe exemplary steps comprising the process 2500 depicted in FIG. 13, in accordance with the various embodiments herein described. In one embodiment, the process 2500 is implemented at least in part as computer-executable instructions stored in a computer-readable medium and executed in one or more processing devices.

At block 2502, a plurality of spans associated with a microservices-based application are automatically ingested for a given time duration. The monitoring platform is able to ingest all the incoming spans without sampling.

At block 2504, the plurality of spans are automatically aggregated into a plurality of streams of metric data.

At block 2506, computations are performed on the plurality of streams of metric data to identify anomalous patterns. For example, a threshold comparison may be performed for an error rate metric associated with a given service. The alert may be generated when the error rate is above a threshold. According to embodiments, other more complex alerts may be configured as well. For example, an alert may be generated when an error rate is in violation of manually defined rules (e.g., greater than 10% over a duration of 5 minutes, or the like), or when there is a growth in error rate (e.g., error rate over the last 5 minutes is more than twice the error rate of the preceding hour).

At block 2508, alert information is annotated on a display screen. For example, the alert may be annotated on a service graph clearly indicating the nodes and edges associated with the error.

At block 2510, metadata and dimensions associated with the alert may be used to automatically populate and execute queries to extract further information from one or more additional data sets associated with different modalities of analysis, e.g., metric events and/or full-fidelity.

The disclosed system addresses a problem in traditional data analysis of microservices-based software tied to computer technology, namely, the technical problem of detecting and identifying alerts pertaining to application performance. The disclosed system solves this technical problem by providing a solution also rooted in computer technology, namely, by providing for one or more detectors to trigger alerts related to an endpoint or service in a microservices-based application in response to anomalous behavior pertaining to error, latency or request rates. The disclosed subject technology further provides improvements to the functioning of the computer itself, and in particular to the computational speed of the computer, by efficiently converting span and trace data into metric time series and using the metric time series data to identify anomalous behaviors within an application in real-time.

While the principles of the invention have been described above in connection with specific apparatus, it is to be clearly understood that this description is made only by way of example and not as a limitation on the scope of the invention. Further, the foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method of generating metrics data associated with a microservices-based application, the method comprising:
    ingesting a plurality of spans associated with one or more applications executing in a distributed computing environment;
    mapping each span of the plurality of spans to a span identity that corresponds to a type of span;
    grouping the plurality of spans based on the span identity associated with each span of the plurality of spans;
    computing metrics associated with the span identity by aggregating information extracted from spans associated with the span identity;
    generating, based on the metrics, a stream of metric data associated with the span identity;
    generating an alert signal based on values associated with the stream of metric data satisfying a condition; and
    responsive to generating the alert signal, extending the span identity with user-configured tags to extract information regarding an operation associated with the span identity.

2. The method of claim 1, wherein each of the plurality of spans includes a plurality of attributes and one or more user-configured tags.

3. The method of claim 1, wherein the condition corresponds to at least one value of the stream of metric data exceeding a predetermined threshold.

4. The method of claim 2, wherein the plurality of attributes includes:
    an operation name,
    a service name,
    a kind tag,
    an error flag, or
    a flag indicating if the span is part of a service mesh.

5. The method of claim 1, wherein the metrics computed are selected from one or more of a minimum span duration, a median span duration, a maximum span duration, a p90 latency value, a p99 latency value, and a count of spans associated with the span identity.

6. The method of claim 1, wherein an analytic engine computes the metrics periodically for a given number of time-periods, and wherein the analytic engine resets the metrics at an end of each time-period.

7. The method of claim 6, wherein the analytic engine resides in a cloud network.

8. The method of claim 1, wherein the step of computing metrics further comprises:
    generating a fixed size bin histogram for the span identity;
    inserting values associated with each span corresponding to the span identity in respective bins of the fixed size bin histogram; and
    computing the metrics by tracking counts associated with each bin in the fixed size bin histogram.

9. The method of claim 1, further comprising:
    determining whether the span identity is associated with a cross-service call; and
    responsive to a determination that the span identity is associated with a cross-service call, extending the span identity with user-configured tags to extract information regarding the cross-service call.

10. The method of claim 1, further comprising:
    rendering, in a user interface, an application topology graph depicting metrics corresponding to a plurality of services associated with one or more applications executing in the distributed computing environment.

11. A non-transitory computer-readable medium having computer-readable program code embodied therein for causing a computer system to perform a method of generating metrics data associated with a microservices-based application, the method comprising:
    ingesting a plurality of spans associated with one or more applications executing in a distributed computing environment;
    mapping each span of the plurality of spans to a span identity that corresponds to a type of span;
    grouping the plurality of spans based on the span identity associated with each span of the plurality of spans;
    computing metrics associated with the span identity by aggregating information extracted from spans associated with the span identity;
    generating, based on the metrics, a stream of metric data associated with the span identity;
    generating an alert signal based on values associated with the stream of metric data satisfying a condition; and
    responsive to generating the alert signal, extending the span identity with user-configured tags to extract information regarding an operation associated with the span identity.

12. The non-transitory computer-readable medium of claim 11, wherein each of the plurality of spans includes a plurality of attributes and one or more user-configured tags.

13. The non-transitory computer-readable medium of claim 11, wherein the condition corresponds to at least one value of the stream of metric data exceeding a predetermined threshold.

14. The non-transitory computer-readable medium of claim 11, wherein the metrics computed are selected from one or more of a minimum span duration, a median span duration, a maximum span duration, a p90 latency value, a p99 latency value, and a count of spans associated with the span identity.

15. The non-transitory computer-readable medium of claim 11, wherein an analytic engine computes the metrics periodically for a given number of time-periods, and wherein the analytic engine resets the metrics at an end of each time-period.

16. The non-transitory computer-readable medium of claim 11, wherein the step of computing metrics further comprises:

generating a fixed size bin histogram for the span identity;

inserting values associated with each span corresponding to the span identity in respective bins of the fixed size bin histogram; and computing the metrics by tracking counts associated with each bin in the fixed size bin histogram.

17. A system for performing a method of generating metrics data associated with a microservices-based application, the system comprising:

a processing device communicatively coupled with a memory and configured to:

ingest a plurality of spans associated with one or more applications executing in a distributed computing environment;

map each span of the plurality of spans to a span identity that corresponds to a type of span;

group the plurality of spans based on the span identity associated with each span of the plurality of spans;

compute metrics associated with the span identity by aggregating information extracted from spans associated with the span identity;

generate, based on the metrics, a stream of metric data associated with the span identity;

generate an alert signal based on values associated with the stream of metric data satisfying a condition; and extend the span identity with user-configured tags to extract information regarding an operation associated with the span identity in response to the alert signal being generated.

18. The system of claim 17, wherein the metrics computed are selected from one or more of a minimum span duration, a median span duration, a maximum span duration, a p90 latency value, a p99 latency value, and a count of spans associated with the span identity.

* * * * *